(12) United States Patent
Kimura

(10) Patent No.: US 10,412,374 B2
(45) Date of Patent: Sep. 10, 2019

(54) IMAGE PROCESSING APPARATUS AND IMAGE PROCESSING METHOD FOR IMAGING AN IMAGE BY UTILIZATION OF A PSEUDO IMAGE

(71) Applicant: SONY CORPORATION, Tokyo (JP)

(72) Inventor: Seiji Kimura, Chiba (JP)

(73) Assignee: SONY CORPORATION, Tokyo (JP)

( * ) Notice: Subject to any disclaimer, the term of this patent is extended or adjusted under 35 U.S.C. 154(b) by 127 days.

(21) Appl. No.: 15/300,346

(22) PCT Filed: Mar. 27, 2015

(86) PCT No.: PCT/JP2015/059586
§ 371 (c)(1),
(2) Date: Sep. 29, 2016

(87) PCT Pub. No.: WO2015/156149
PCT Pub. Date: Oct. 15, 2015

(65) Prior Publication Data
US 2017/0150130 A1  May 25, 2017

(30) Foreign Application Priority Data

Apr. 10, 2014  (JP) .................................. 2014-081070

(51) Int. Cl.
*H04N 5/262* (2006.01)
*H04N 13/302* (2018.01)
*H04N 13/271* (2018.01)

(52) U.S. Cl.
CPC ......... *H04N 13/302* (2018.05); *H04N 5/2628* (2013.01); *H04N 13/271* (2018.05); *H04N 2213/006* (2013.01)

(58) Field of Classification Search
None
See application file for complete search history.

(56) References Cited

U.S. PATENT DOCUMENTS

| 2015/0153559 A1* | 6/2015 | Sato | G02B 21/367 |
| | | | 348/79 |
| 2015/0379720 A1* | 12/2015 | Herraez | H04N 13/026 |
| | | | 348/43 |
| 2016/0028948 A1* | 1/2016 | Omori | H04N 5/23229 |
| | | | 348/239 |

FOREIGN PATENT DOCUMENTS

| JP | 08-242469 A | 9/1996 |
| JP | 2007-128009 A | 5/2007 |

(Continued)

OTHER PUBLICATIONS

Amit Aides et al., "Multiscale Ultrawide Foveated Video Extrapolation", IEEE, 2011, pp. 8.

(Continued)

*Primary Examiner* — Michael J Hess
(74) *Attorney, Agent, or Firm* — Chip Law Group

(57) ABSTRACT

The present disclosure relates to an image processing apparatus and an image processing method capable of changing an imaging method of an image by using a depth image in a pseudo manner. A pseudo image generation unit generates, as a pseudo image, a predicted value of a captured image of a subject captured by a predetermined imaging method from an image on the basis of a value of a parameter determined in accordance with a characteristic of the image, and a depth image indicating a position of the subject in the input image in a depth direction. The present disclosure is applicable to an image processing apparatus which generates a pseudo image corresponding to a predicted value of a captured image of a subject captured by a predetermined imaging method from an input image, for example.

20 Claims, 40 Drawing Sheets

(56) References Cited

FOREIGN PATENT DOCUMENTS

| | | |
|---|---|---|
| JP | 2007-264456 A | 10/2007 |
| JP | 2008-233765 A | 10/2008 |
| JP | 2008-242048 A | 10/2008 |
| JP | 2009-162899 A | 7/2009 |
| JP | 2010-175885 A | 8/2010 |
| JP | 2013-254338 A | 12/2013 |

OTHER PUBLICATIONS

Shai Avidan et al., "Seam Carving for Content-Aware Image Resizing", ACM Transactions on Graphics, vol. 26, No. 3, Article 10, Publication date: Jul. 2007, pp. 10.

Aides, et al., "Multiscale Ultrawide Foveated Video Extrapolation", Computational Photography (ICCP), IEEE International Conference, Apr. 2011, 08 pages.

Avidan, et al., "Seam Carving for Content-Aware Image Resizing", ACM Transactions on Graphics, vol. 26, No. 3, Article 10, Jul. 2007, 09 pages.

* cited by examiner

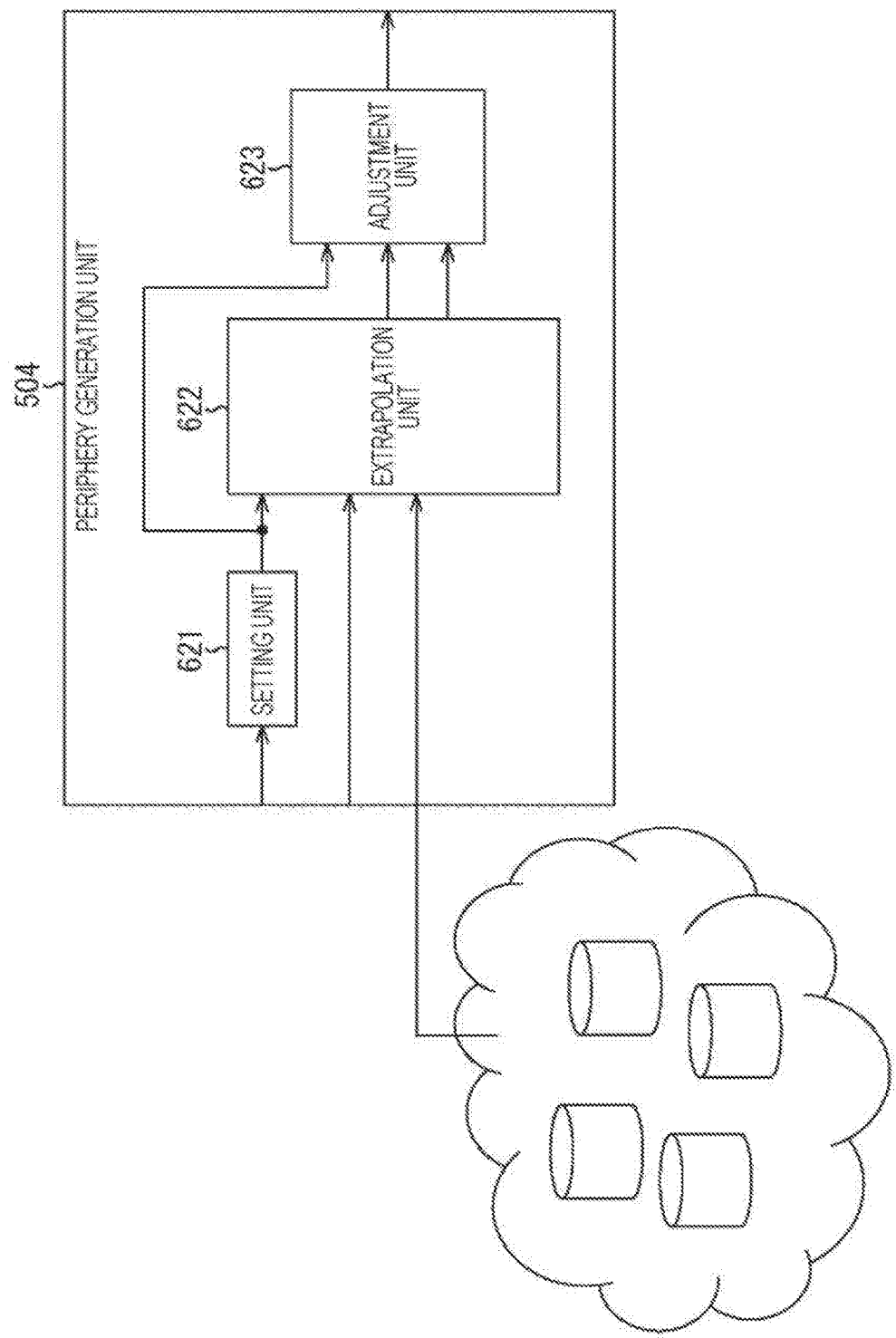

FIG. 46

| EMBODIMENT | GENERATED IMAGE | GENERATION METHOD | NECESSITY OF DEPTH IMAGE | EFFECT | VISIBILITY EFFECT | | | | |
|---|---|---|---|---|---|---|---|---|---|
| | | | | | SENSE OF PRESENCE/IMMERSION | SENSE OF REALITY | READABILITY | SENSE OF DEPTH | IMPRESSIVENESS OF SCENE |
| 1 | PSEUDO TRACK IMAGE | SHIFT VIRTUAL VIEWPOINT POSITION IN HORIZONTAL/VERTICAL DIRECTION | NECESSARY | PRODUCE MOTION PARALLAX IN TRACK IMAGING | ○ | | ○ | ○ | |
| 1 | PSEUDO DOLLY-IN IMAGE | SHIFT VIRTUAL VIEW DISTANCE FORWARD | NECESSARY | PRODUCE MOTION PARALLAX IN DOLLY-IN IMAGING | ○ | | ○ | ○ | |
| 1 | PSEUDO DOLLY-OUT IMAGE | SHIFT VIRTUAL VIEW DISTANCE BACKWARD | NECESSARY | PRODUCE MOTION PARALLAX IN DOLLY-IN IMAGING | ○ | | ○ | ○ | |
| 3 | WIDE-FIELD IMAGE HAVING SAME IMAGING ANGLE OF VIEW AND VIEWING ANGLE OF VIEW < VIEWING ANGLE OF VIEW | SCALE (REDUCE) INPUT IMAGE TO EQUALIZE VIEWING ANGLE OF VIEW AND IMAGING ANGLE OF VIEW | UNNECESSARY | VIEWER VIEWS SCENE AS VIEWED BY PERSON TAKING IMAGE | ○ | ○ | | | |
| 3 | WIDE-FIELD IMAGE HAVING SAME IMAGING ANGLE OF VIEW AND VIEWING ANGLE OF VIEW > VIEWING ANGLE OF VIEW | SCALE (REDUCE) INPUT IMAGE TO EQUALIZE VIEWING ANGLE OF VIEW AND IMAGING ANGLE OF VIEW | UNNECESSARY | VIEWER VIEWS SCENE AS VIEWED BY PERSON TAKING IMAGE | ○ | ○ | ○ | | |
| 2 | PSEUDO ANGLE EMPHASIS IMAGE | CHANGE VIRTUAL VIEWPOINT POSITION ON THE BASIS OF CAMERA ANGLE AT IMAGING OF INPUT IMAGE | NECESSARY | INCREASE IMPRESSION OF COMPOSITION INTENDED BY PERSON TAKING IMAGE | | | | | ○ |
| 1 | PSEUDO ZOOM-IN IMAGE | INCREASE SCALING RATIO OF INPUT IMAGE TO SMOOTH FRONT PART AND INNER PART OF SIGNIFICANT AREA | NECESSARY | REALIZE NARROW IMAGING ANGLE OF VIEW AND SMALL DEPTH OF FIELD IN ZOOM-IN IMAGING | | | ○ | ○ | |
| 1 | PSEUDO ZOOM-OUT IMAGE | DECREASE SCALING RATIO OF INPUT IMAGE FOR DEBLUR | NECESSARY | REALIZE WIDE IMAGING ANGLE OF VIEW AND LARGE DEPTH OF FIELD IN ZOOM-IN IMAGING | | | ○ | | |
| 1 | PSEUDO PANNING/TILT IMAGE | CHANGE ANGLE OF VISUAL LINE DIRECTION | UNNECESSARY | REALIZE IMAGE IN PANNING/TILT IMAGING | | | ○ | | | ized
IMAGE PROCESSING APPARATUS AND IMAGE PROCESSING METHOD FOR IMAGING AN IMAGE BY UTILIZATION OF A PSEUDO IMAGE

CROSS REFERENCE TO RELATED APPLICATIONS

This application is a U.S. National Phase of International Patent Application No. PCT/JP2015/059586 filed on Mar. 27, 2015, which claims priority benefit of Japanese Patent Application No. JP 2014-081070 filed in the Japan Patent Office on Apr. 10, 2014. Each of the above-referenced applications is hereby incorporated herein by reference in its entirety.

TECHNICAL FIELD

The present disclosure relates to an image processing apparatus and an image processing method, and more particularly to an image processing apparatus and an image processing method capable of changing an imaging method in a pseudo manner by using a depth image.

BACKGROUND ART

A flat panel display has been increasing in size in recent years. For a fixed visual distance, a sense of presence (immersion) improves as the size of the flat panel display increases by an effect of viewing a wide-field image. Note that, in the present specification, a sense of presence refers to a sense produced in a viewer viewing an image as if he or she were present in the world shown in the image.

In addition, at present, practical use of a display with high-resolution, such as 4 K resolution and 8 K resolution, is also about to start. The high-resolution display realizes image expression close to a real object, and therefore improves a sense of reality. Note that, in the present specification, a sense of reality refers to a sense produced in a viewer viewing an image as if an object shown in the image were present before the viewer.

It is considered that an image displayed on a high-resolution and large-sized display often has resolution equal to or lower than resolution of the display. For example, an image displayed on a 4 k resolution display often has 2 k resolution.

In this case, the resolution of the image to be displayed is up-converted to the resolution of the display by using a linear or non-linear scaling technology incorporated in the display, for example. The non-linear scaling technology is described in Patent Documents 1 through 4 and Non-Patent Documents 1 and 2, for example.

CITATION LIST

Patent Document

Patent Document 1: Japanese Patent Application Laid-Open No. 2007-264456
Patent Document 2: Japanese Patent Application Laid-Open No. 2008-242048
Patent Document 3: Japanese Patent Application Laid-Open No. 2008-233765
Patent Document 4: Japanese Patent Application Laid-Open No. 2009-162899

Non-Patent Document

Non-Patent Document 1: "Seam Carving for Content-Aware Image Resizing", Avidan et al, SIGGRAPH 2007

Non-Patent Document 2: "Multi-scale ultrawide foveated video extrapolation", A. Adies, T. Avraham, and Y. Schechner. Israel Institute of Technology In ICCP, 2011

SUMMARY OF THE INVENTION

Problems to be Solved by the Invention

No investigation has been made about an idea of changing an imaging method of an image in a pseudo manner by using a depth image constituted by pixel values of respective pixels indicating a position of a subject in the image in a depth direction.

The present disclosure developed in consideration of the circumstances described above changes an imaging method of an image in a pseudo manner by using a depth image.

Solutions to Problems

An image processing apparatus according to a first aspect of the present disclosure is an image processing apparatus including a pseudo image generation unit that generates, as a pseudo image, a predicted value of a captured image of a subject captured by a predetermined imaging method from an image on the basis of a value of a parameter determined in accordance with a characteristic of the image, and a depth image indicating a position of the subject in the image in a depth direction.

An image processing method according to a first aspect of the present disclosure corresponds to the image processing apparatus of the first aspect of the present disclosure.

According to the first aspect of the present disclosure, a predicted value of a captured image of a subject captured by a predetermined imaging method from an image is generated as a pseudo image on the basis of a value of a parameter determined in accordance with a characteristic of the image, and a depth image indicating a position of the subject in the image in a depth direction.

An image processing apparatus according to a second aspect of the present disclosure is an image processing apparatus including: an imaging angle of view estimation unit that estimates an imaging angle of view of an image on the basis of the image, and a depth image indicating a position of a subject in the image in a depth direction; and a generation unit that generates, as a pseudo image from the image, a predicted value of a captured image captured at the same angle of view as a viewing angle of view of a pseudo image, on the basis of the imaging angle of view estimated by the imaging angle of view estimation unit, and the viewing angle of view.

An image processing method according to a second aspect of the present disclosure corresponds to the image processing apparatus of the second aspect of the present disclosure.

According to the second aspect of the present disclosure, an imaging angle of view of an image is estimated on the basis of the image, and a depth image indicating a position of a subject in the image in a depth direction, and a predicted value of a captured image captured at the same angle of view as a viewing angle of view of a pseudo image is generated as a pseudo image from the image on the basis of the estimated imaging angle of view and the viewing angle of view.

Note that the image processing apparatuses according to the first and second aspects may be realized by a computer executing programs.

In addition, the programs executed by the computer for realizing the image processing apparatuses of the first and second aspects may be transmitted to the computer via a transmission medium, or may be recorded in a recording medium and incorporated into the computer in the form of the recording medium.

Effects of the Invention

According to the first and second aspects of the present disclosure, image formation is achievable. In addition, according to the first aspect of the present disclosure, an imaging method of an image is changeable in a pseudo manner by using a depth image.

Note that advantages to be offered are not limited to these advantages, but may be any of advantages described in the present disclosure.

BRIEF DESCRIPTION OF DRAWINGS

FIG. 43 is a block diagram illustrating a configuration example of a periphery generation unit in FIG. 32.

FIG. 46 is a view showing advantageous effects offered by the respective image processing apparatuses.

MODE FOR CARRYING OUT THE INVENTION

Embodiments for carrying out the present disclosure (hereinafter referred to as embodiments) are described hereinbelow. Note that the respective embodiments are described in the following order.

1. First embodiment: image processing apparatus (FIGS. 1 through 25)

2. Second embodiment: image processing apparatus (FIGS. 26 through 31)

3. Third embodiment: image processing apparatus (FIGS. 32 through 45)

4. Advantageous effects of the first through third embodiments (FIG. 46)

Figure 47:
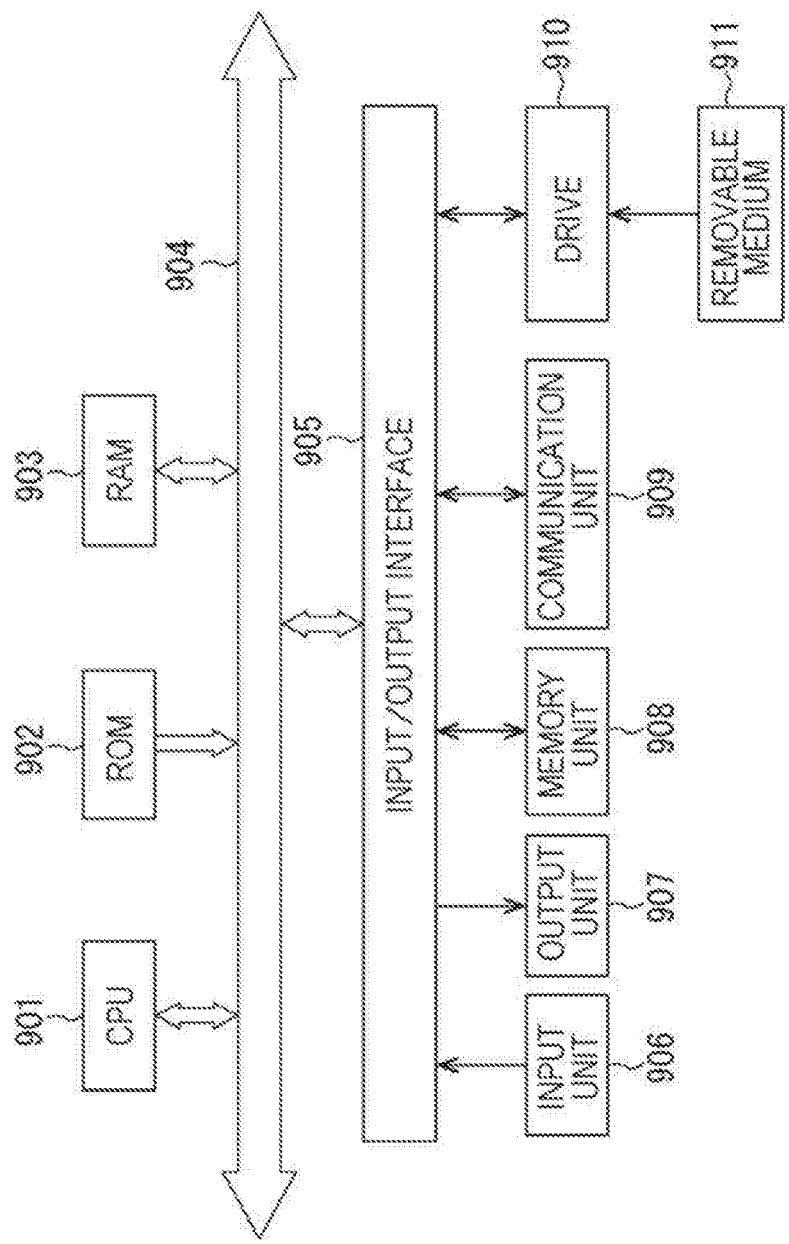
FIG. 47 is a block diagram illustrating a configuration example of hardware of a computer.

5. Fourth embodiment: computer (FIG. 47)

First Embodiment (Configuration Example of Image Processing Apparatus in First Embodiment)

Figure 1:
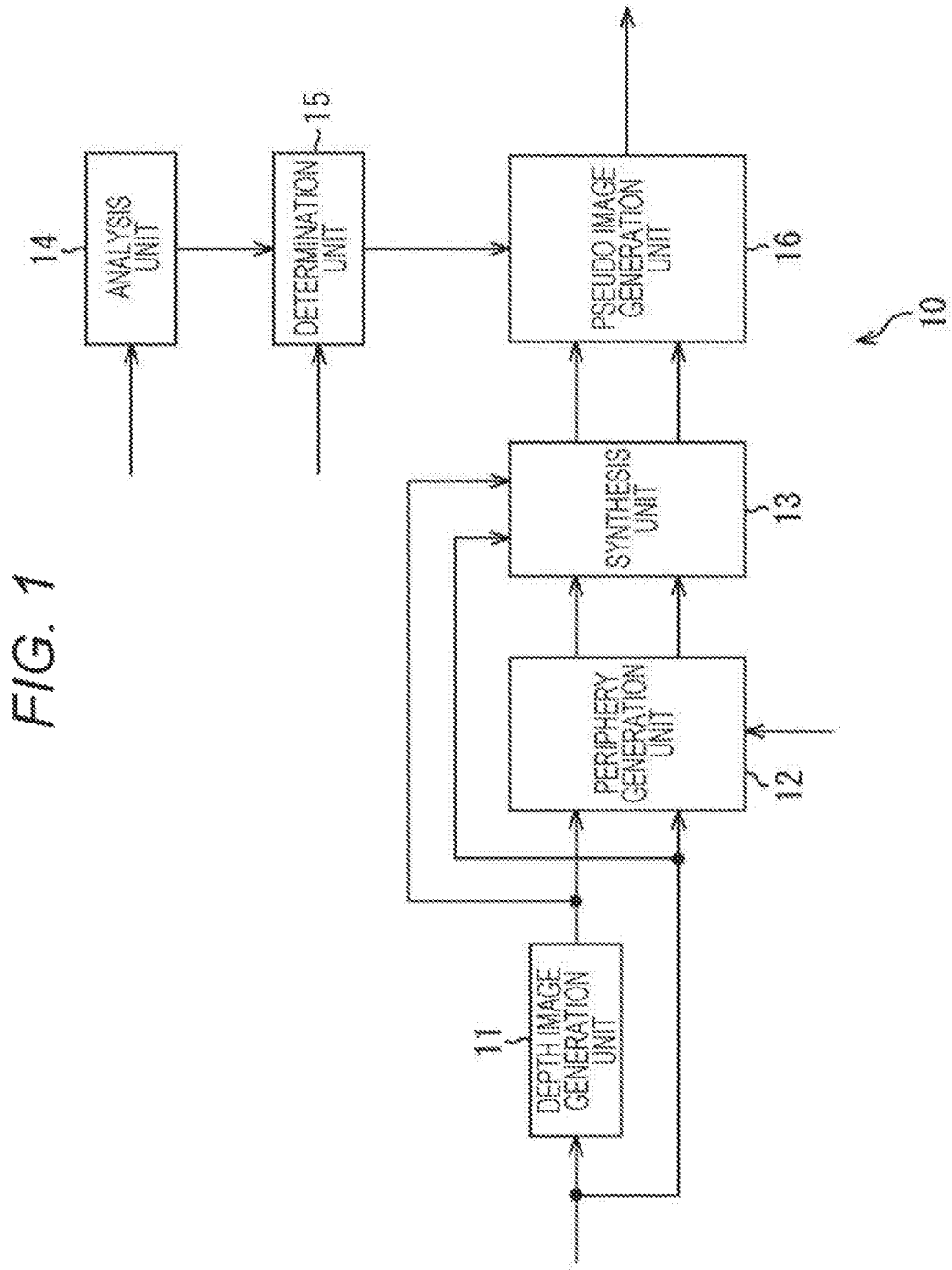
FIG. 1 is a block diagram illustrating a configuration example of an image processing apparatus according to a first embodiment of the present disclosure.

FIG. 1 is a block diagram illustrating a configuration example of an image processing apparatus according to a first embodiment of the present disclosure.

An image processing apparatus 10 illustrated in FIG. 1 is constituted by a depth image generation unit 11, a periphery generation unit 12, a synthesis unit 13, an analysis unit 14, a determination unit 15, and a pseudo image generation unit 16. The image processing apparatus 10 generates a pseudo image from an input image received from the outside by using an imaging method changed in a pseudo manner from an imaging method of the input image.

More specifically, the depth image generation unit 11 of the image processing apparatus 10 generates a depth image from an input image, and supplies the depth image to the periphery generation unit 12 and the synthesis unit 13. The depth image is generated by a method described in Japanese Patent Application Laid-Open No. 2013-172214, for example.

The periphery generation unit 12 receives interpolation area information from the outside. This information indicates an area for extrapolation determined beforehand. The periphery generation unit 12 extrapolates an image of a peripheral area of the input image (hereinafter referred to as peripheral image) by using the input image on the basis of the interpolation area information. In addition, the periphery generation unit 12 extrapolates a depth image of a peripheral area of the depth image supplied from the depth image generation unit 11 (hereinafter referred to as peripheral depth image) by using the depth image on the basis of the interpolation area information. The periphery generation unit 12 supplies the peripheral image and the peripheral depth image to the synthesis unit 13.

The synthesis unit 13 synthesizes the peripheral image supplied from the periphery generation unit 12 and the input image into a synthesis image. In addition, the synthesis unit 13 synthesizes the peripheral depth image supplied from the periphery generation unit 12 and the depth image supplied from the depth image generation unit 11 into a depth image of a synthesis image (hereinafter referred to as synthesis depth image). The synthesis unit 13 supplies the synthesis image and the synthesis depth image to the pseudo image generation unit 16.

The analysis unit 14 extracts a predetermined area from the input image as characteristics of the input image on the basis of information about the input image. The analysis unit 14 generates a significance map indicating levels of significance of respective pixels constituting the input image by using pixel values on the basis of the extracted area, and supplies the generated significance map to the determination unit 15.

The determination unit 15 determines a final significance map on the basis of an attribute signal received from the outside to indicate an attribute of the input image, and the significance map supplied from the analysis unit 14. The determination unit 15 determines values of parameters on the basis of the final significance map such that a significant area falls within a central field of vision of a viewer viewing a pseudo image, and supplies the determined values of the parameters to the pseudo image generation unit 16.

Note that the central field of vision of the viewer in this context refers to an area within a screen viewed at an angle ranging from −30 degrees to +30 degrees around the center of a recommended view position (such as a position 1.5 times higher than the height of the screen), for example. The view position as the reference of the central field of vision may be a view position set by the viewer, an actual view position of the viewer measured by a not-shown camera or sensor, or other positions instead of the recommended view position.

The pseudo image generation unit 16 generates a pseudo image from the synthesis image supplied from the synthesis unit 13 on the basis of the synthesis depth image received from the synthesis unit 13 and the values of the parameters received from the determination unit 15. The pseudo image corresponds to a predicted value of a captured image of a subject in a synthesis image generated from an input image actually captured, which captured image is generated by using an imaging method different from the imaging method of the input image. The pseudo image generation unit 16 outputs the generated pseudo image to a not-shown external display.

Note that the parameters are determined in both the horizontal direction and the vertical direction. For simplifying the explanation, it is assumed that only the parameters in the horizontal direction are determined in the following description. The parameters in the vertical directions are determined in a manner similar to the determination of the parameters in the horizontal direction.

(Configuration Example of Periphery Generation Unit)

Figure 2:
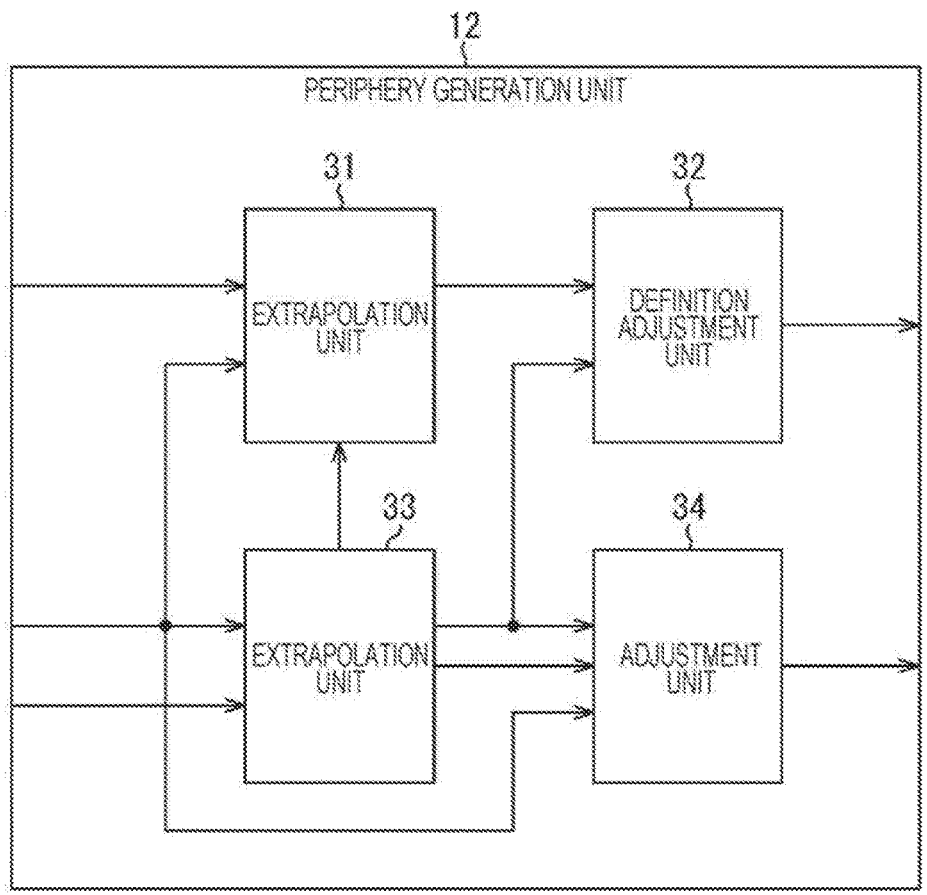
FIG. 2 is a block diagram illustrating a configuration example of a periphery generation unit in FIG. 1.

FIG. 2 is a block diagram illustrating a configuration example of the periphery generation unit 12 in FIG. 1.

The periphery generation unit 12 illustrated in FIG. 2 is constituted by an extrapolation unit 31, a definition adjustment unit 32, an extrapolation unit 33, and an adjustment unit 34.

The extrapolation unit 31 of the periphery generation unit 12 performs extrapolation on the basis of extrapolation information received from the extrapolation unit 33 and interpolation area information received from the outside in a manner identical to extrapolation executed on the basis of the input image by the extrapolation unit 33, while using the depth image supplied from the depth image generation unit 11 illustrated in FIG. 1.

Note that the extrapolation information is information about extrapolation of the input image performed by the extrapolation unit 33, and indicates an extrapolation system or the like employed by the extrapolation unit 33. Examples of the extrapolation system include a system described in Non-Patent Document 2, a hold system, a mirror system, and a parallel shift system. Alternatively, an extrapolation system using images of past or future frames, as described in "Display pixel caching", Clemens Birklbauer, et. al. SIGGRAPH '11 ACM SIGGRAPH 2011 Talks Article No. 45, may be adopted. The extrapolation unit 31 supplies a peripheral depth image generated as a result of extrapolation to the definition adjustment unit 32.

The definition adjustment unit 32 adjusts definition of the peripheral depth image supplied from the extrapolation unit 31 on the basis of extrapolation reliability indicating likelihood of an extrapolation result of the input image supplied from the extrapolation unit 33. More specifically, the definition adjustment unit 32 filters the peripheral depth image by using smoothing filter (such as Gaussian filter) having a tap number set on the basis of extrapolation reliability. The definition adjustment unit 32 supplies the adjusted peripheral depth image to the synthesis unit 13 illustrated in FIG. 1.

The extrapolation unit 33 generates the peripheral image by extrapolation using the input image on the basis of the interpolation area information received from the outside.

The extrapolation unit 33 supplies the peripheral image to the adjustment unit 34. In addition, the extrapolation unit 33 further generates the extrapolation information, and supplies the generated extrapolation information to the extrapolation unit 31. Furthermore, the extrapolation unit 33 further generates the extrapolation reliability. For example, the extrapolation unit 33 indicates accuracy of matching of extrapolation by using a value ranging from 0 to 1 to show extrapolation reliability. The extrapolation unit 33 supplies the generated extrapolation reliability to the definition adjustment unit 32 and the adjustment unit 34.

The adjustment unit 34 adjusts the peripheral image supplied from the extrapolation unit 33 on the basis of the extrapolation reliability supplied from the extrapolation unit 33 and the interpolation area information, and supplies the adjusted peripheral depth image to the synthesis unit 13 illustrated in FIG. 1.

(Description of Extrapolation System)

Figure 3:
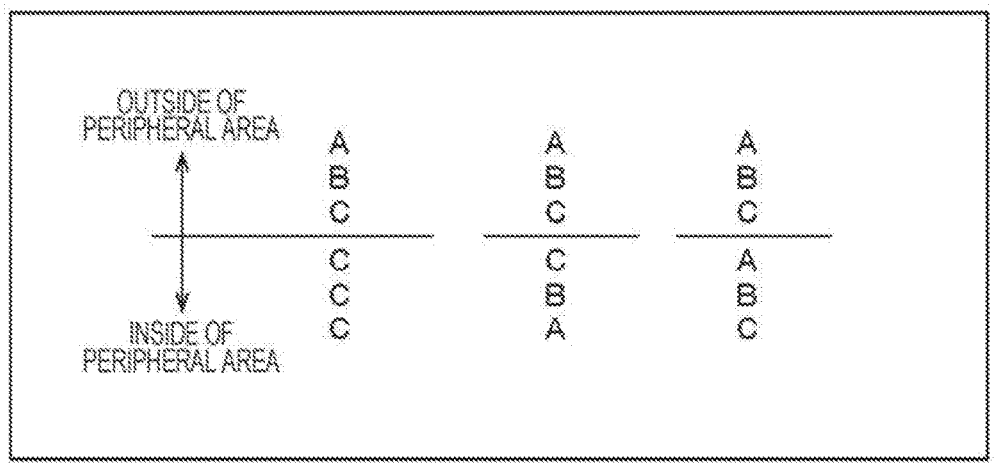
FIG. 3 is a view illustrating a hold system, a mirror system, and a parallel shift system of extrapolation.

FIG. 3 is a view illustrating the hold system, mirror system, and parallel shift system of extrapolation.

According to the hold system extrapolation employed by the extrapolation unit 33 as illustrated in the left part in FIG. 3, a pixel value C of a pixel located within an input image and adjacent to the innermost pixel within a peripheral area of the input image becomes the pixel value of the innermost pixel within the peripheral area of the input image and the pixel values of the pixels located outside the innermost pixel.

According to the mirror system extrapolation employed by the extrapolation unit 33 as illustrated in the central part in FIG. 3, the pixel values of the pixels within the peripheral area of the input image are determined such that the respective pixel values become symmetric with respect to the boundary between the innermost pixel within the peripheral area of the input image and the pixels within the input image.

According to the example illustrated in FIG. 3, the pixel value of the first pixel within the input image from the boundary between the innermost pixel within the peripheral area of the input image and the pixels within the input image is the pixel value C. Accordingly, the pixel value of the first pixel within the peripheral area of the input image from the boundary is determined as the pixel value C. Similarly, the pixel value of the second pixel within the peripheral area of the input image from the boundary is determined as a pixel value B on the basis of a state that the pixel value of the second pixel within the input image from the boundary is the pixel value B.

In addition, according to the parallel shift system extrapolation employed by the extrapolation unit 33 as illustrated in the right part in FIG. 3, pixel values of pixels in a predetermined range from the boundary between the innermost pixel within the peripheral area of the input image and the pixels within the input image are determined as the pixel values of the outermost pixel through the innermost pixel within the peripheral area of the input image.

According to the example illustrated in FIG. 3, the pixel value of the first pixel within the input image from the boundary between the innermost pixel within the peripheral area of the input image and the pixels within the input image is the pixel value C. Accordingly, the pixel value of the outermost pixel within the peripheral area of the input image is determined as the pixel value C. Similarly, the pixel value of the second pixel within the peripheral area of the input image from the outermost side is determined as the pixel value B on the basis of a state that the pixel value of the second pixel within the input image from the boundary is the pixel value B.

Note that while extrapolation of the respective systems for the input image has been discussed with reference to FIG. 3, extrapolation of the respective systems for the depth image is similarly performed.

(Description of Extrapolation Information)

Figure 4:
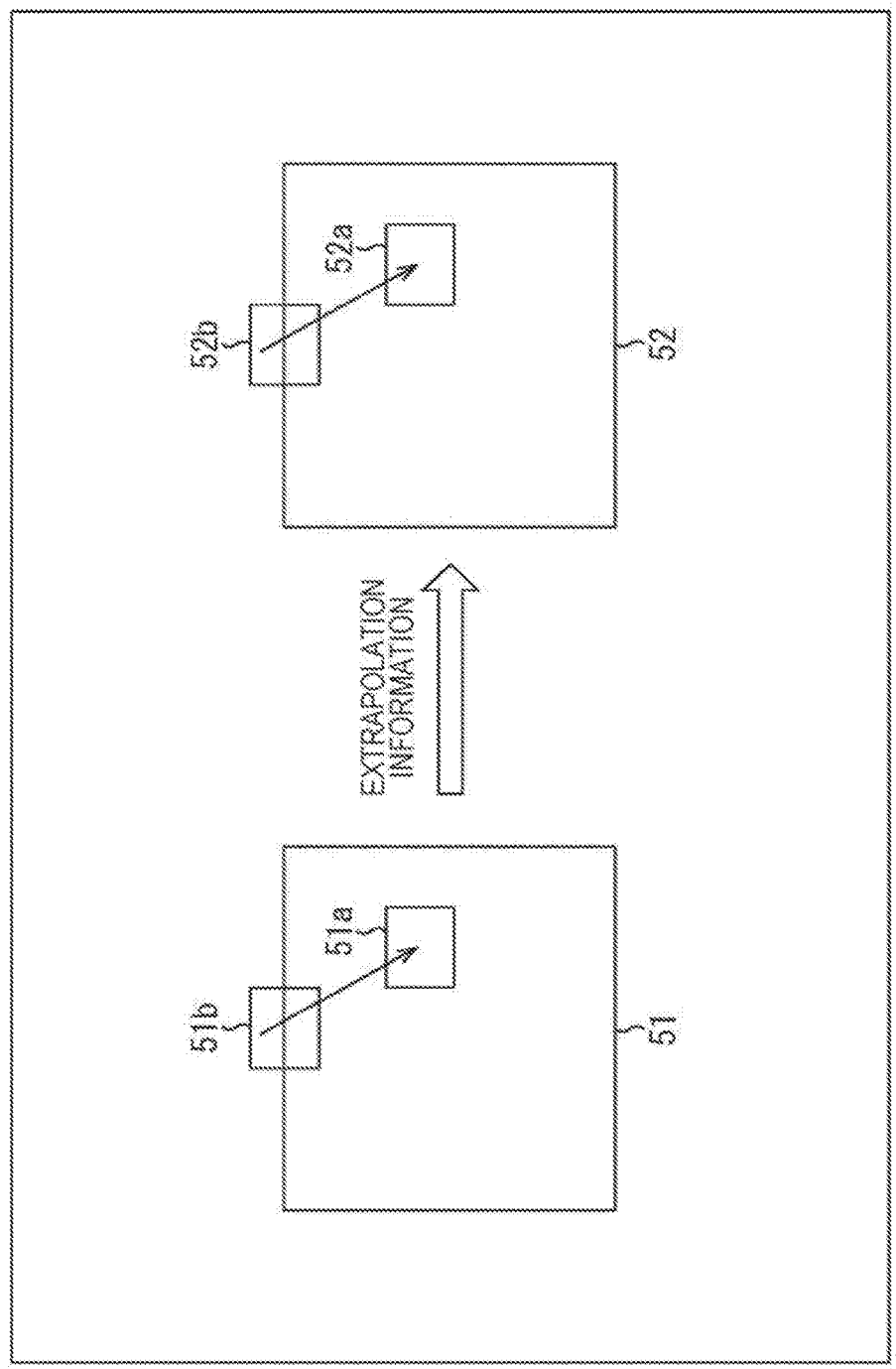
FIG. 4 is a view illustrating extrapolation information.

FIG. 4 is a view illustrating the extrapolation information.

When a matching system which predicts a pixel to be extrapolated in a peripheral area with reference to a pixel within an input image as described in Non-Patent Document 2 is adopted for the extrapolation system of an input image 51, the extrapolation unit 33 generates extrapolation information showing a matching system as illustrated in FIG. 4.

In this case, the extrapolation unit 31 performs extrapolation of a depth image 52 by using the matching system shown in the extrapolation information. More specifically, the extrapolation unit 31 predicts a pixel 52b to be extrapolated in the peripheral area with reference to a pixel 52a within the depth image 52.

Note that, in this process, the pixel 52b is predicted such that the spatial positional relationship between the pixel 52a corresponding to the reference source and the pixel 52b corresponding to the reference destination in the depth image becomes identical to the spatial positional relationship between a pixel 51a corresponding to the reference source and a pixel 51b corresponding to the reference destination in the input image. This prediction maintains consistency between the peripheral image and the peripheral depth image.

(Configuration Example of Adjustment Unit)

Figure 5:
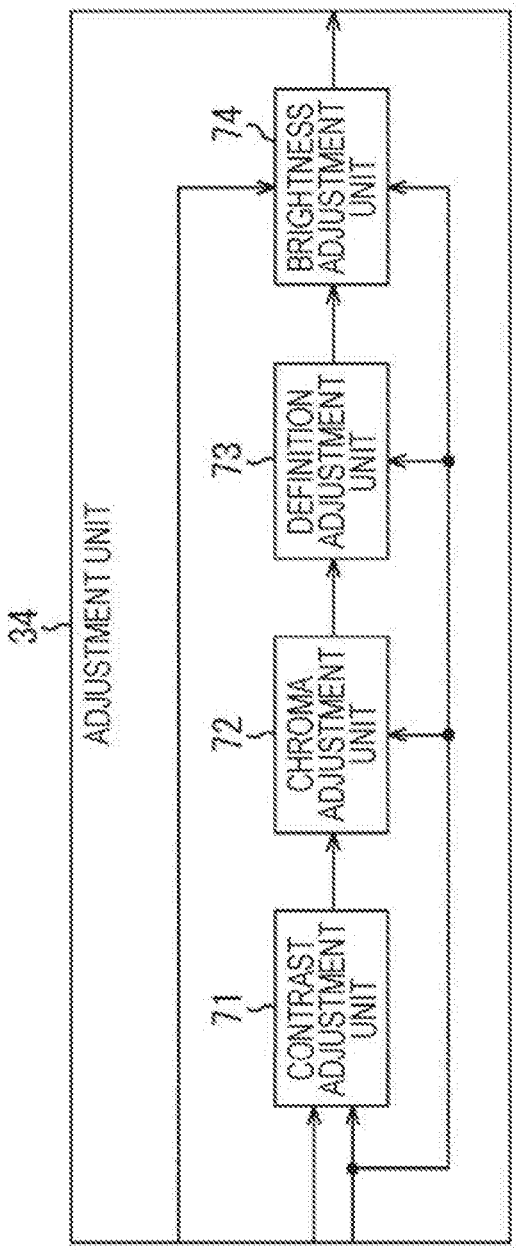
FIG. 5 is a block diagram illustrating a configuration example of an adjustment unit in FIG. 2.

FIG. 5 is a block diagram of a configuration example of the adjustment unit 34 in FIG. 2.

The adjustment unit 34 illustrated in FIG. 5 is constituted by a contrast adjustment unit 71, a chroma adjustment unit 72, a definition adjustment unit 73, and a brightness adjustment unit 74.

The contrast adjustment unit 71 of the adjustment unit 34 adjusts contrast by changing a dynamic range of the peripheral image supplied from the extrapolation unit 33 on the basis of the extrapolation reliability supplied from the extrapolation unit 33 illustrated in FIG. 2. More specifically, the contrast adjustment unit 71 obtains luminance components of respective pixels of the peripheral image after contrast adjustment by performing calculation for luminance components of the respective pixels of the peripheral image using following Mathematical Formula (1).

[Mathematical Formula 1]

$$LCnst\_Y = (EY - AVE\_Y) * CnstGain + AVE\_Y \quad (1)$$

In Mathematical Formula (1), LCnst_Y is a luminance component of a pixel of the peripheral image after contrast adjustment, while EY is a luminance component of a pixel of the peripheral image before contrast adjustment. In the Mathematical Formula (1), AVE Y is an average value of luminance components of the peripheral image before contrast adjustment, while CnstGain is a contrast gain set on the basis of extrapolation reliability.

The contrast adjustment unit 71 supplies an image constituted by the luminance components of the respective pixels of the peripheral image after contrast adjustment, and by chrominance components of the respective pixels of the peripheral image supplied from the extrapolation unit 33, to the chroma adjustment unit 72 as a peripheral image after contrast adjustment.

The chroma adjustment unit 72 adjusts chroma of the peripheral image supplied from the contrast adjustment unit 71 on the basis of the extrapolation reliability. More specifically, the chroma adjustment unit 72 adjusts chroma of the peripheral image by multiplying chroma components of the respective pixels of the peripheral image by a chroma gain set on the basis of the extrapolation reliability. The chroma adjustment unit 72 supplies the peripheral image after chroma adjustment to the definition adjustment unit 73.

The definition adjustment unit 73 adjusts definition of the peripheral image supplied from the chroma adjustment unit 72 on the basis of the extrapolation reliability. More specifically, the definition adjustment unit 73 filters the peripheral image by using smoothing filter (such as Gaussian filter) having a tap number set on the basis of the extrapolation reliability. The definition adjustment unit 73 supplies the filtered peripheral image to the brightness adjustment unit 74.

The brightness adjustment unit 74 adjusts brightness of the peripheral image supplied from the definition adjustment unit 73 on the basis of the extrapolation reliability and the interpolation area information. More specifically, the brightness adjustment unit 74 calculates luminance components of the respective pixels after brightness adjustment by performing calculation for luminance (or brightness) components of the respective pixels of the peripheral image using following Mathematical Formula (2).

[Mathematical Formula 2]

$$PY = SmthY - DarkOffsetPred - DarkOffsetDist \quad (2)$$

In Mathematical Formula (2), PY is a luminance component of a pixel after brightness adjustment, while SmthY is a luminance component of a pixel before brightness adjustment. In Mathematical Formula (2), DarkOffsetPred is an offset value set on the basis of extrapolation reliability. In addition, in Mathematical Formula (2), DarkOffsetDist is an offset value set on the basis of interpolation area information.

The brightness adjustment unit 74 supplies an image constituted by the luminance components of the respective pixels after brightness adjustment, and by the chrominance components of the respective pixels of the peripheral image supplied from the definition adjustment unit 73, to the synthesis unit 13 illustrated in FIG. 1 as a peripheral image after brightness adjustment.

(Example of Contrast Gain)

Figure 6:
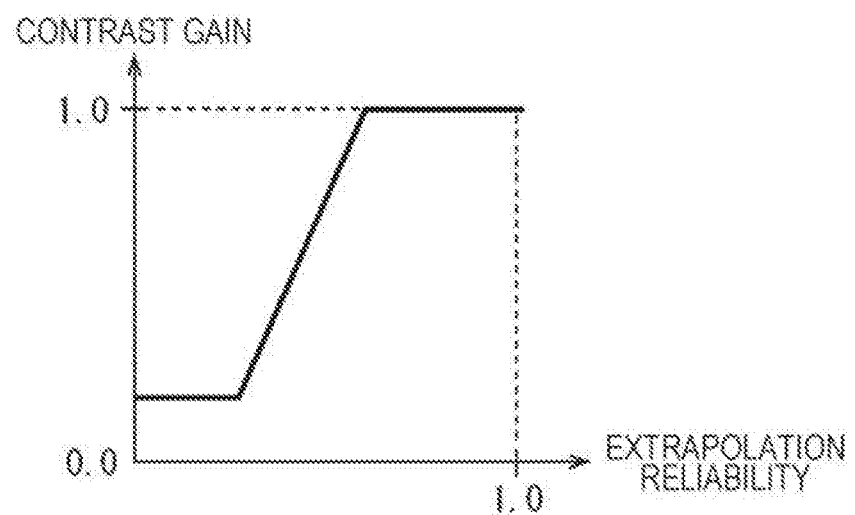
FIG. 6 is a view illustrating a contrast gain.

FIG. 6 is a view illustrating an example of a contrast gain.

As illustrated in FIG. 6, a contrast gain is a value larger than 0 and equal to or smaller than 1, so determined as to increase as extrapolation reliability increases. Accordingly, a contrast gain decreases at low extrapolation reliability, in which condition contrast of the peripheral image decreases. As a result, the peripheral image becomes inconspicuous.

(Example of Chroma Gain)

Figure 7:
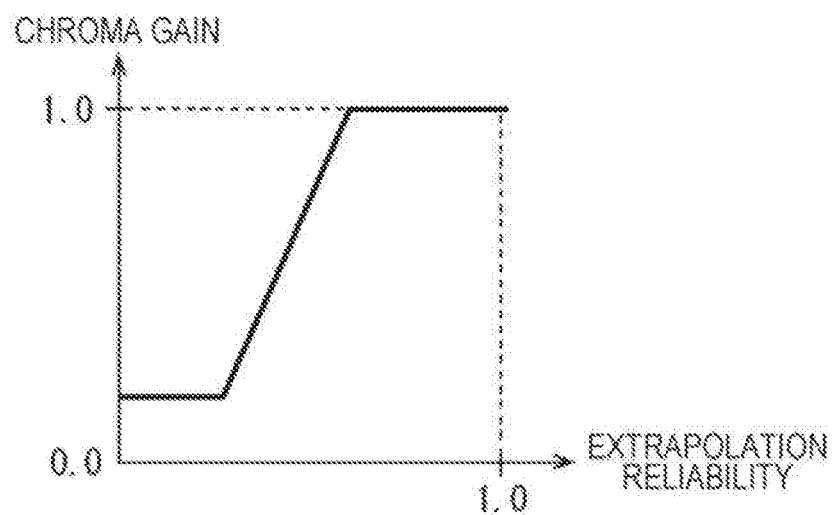
FIG. 7 is a view illustrating an example of a chroma gain.

FIG. 7 is a view illustrating an example of a chroma gain.

As illustrated in FIG. 7, a chroma gain is a value larger than 0 and equal to or smaller than 1, so determined as to increase as extrapolation reliability increases. Accordingly, a chroma gain decreases at low extrapolation reliability, in which condition chroma of the peripheral image decreases. As a result, the peripheral image becomes inconspicuous.

(Example of Tap Number of Smoothing Filter)

Figure 8:
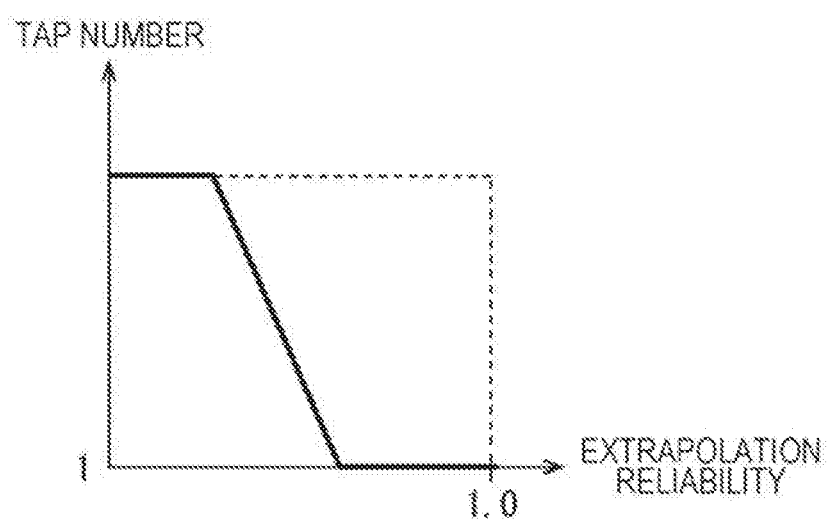
FIG. 8 is a view illustrating an example of a tap number of a smoothing filter included in a definition adjustment unit in FIG. 5.

FIG. 8 is a view illustrating an example of a tap number of a smoothing filter included in the definition adjustment unit 73 illustrated in FIG. 5.

As illustrated in FIG. 8, the tap number of the smoothing filter is a value equal to or larger than 1, so determined as to increase as extrapolation reliability decreases. Accordingly, the tap number of the smoothing filter increases at low extrapolation reliability, in which condition a blur increases in the peripheral image after filtering. As a result, the peripheral image becomes inconspicuous.

Note that while not shown in the figures, the tap number of the smoothing filter of the definition adjustment unit 32 illustrated in FIG. 2 is a value equal to or larger than 1 so determined as to increase as extrapolation reliability decreases, similarly to the tap number illustrated in FIG. 8.

(Example of Offset Value for Brightness Adjustment)

Figure 9A:
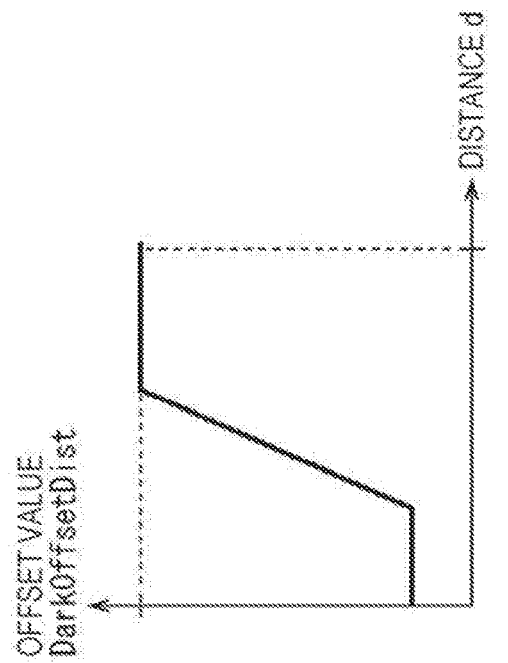
FIG. 9A and FIG. 9B are views illustrating an example of an offset value in brightness adjustment performed by a brightness adjustment unit in FIG. 5.
Figure 9B:
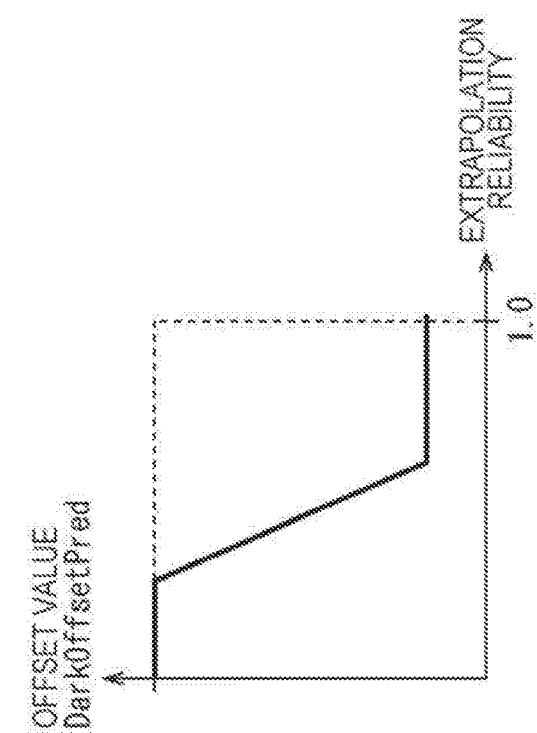

FIGS. 9A-9B are views illustrating an example of an offset value DarkOffsetPred and an offset value DarkOffsetDist used for brightness adjustment by the brightness adjustment unit 74 in FIG. 5.

As illustrated in FIG. 9A, the offset value DarkOffsetPred is so determined as to decrease as extrapolation reliability increases. On the other hand, as illustrated in FIG. 9B, the offset value DarkOffsetDist is so determined as to increase as a distance of a corresponding pixel from the inside of the peripheral area increases.

Figure 10:
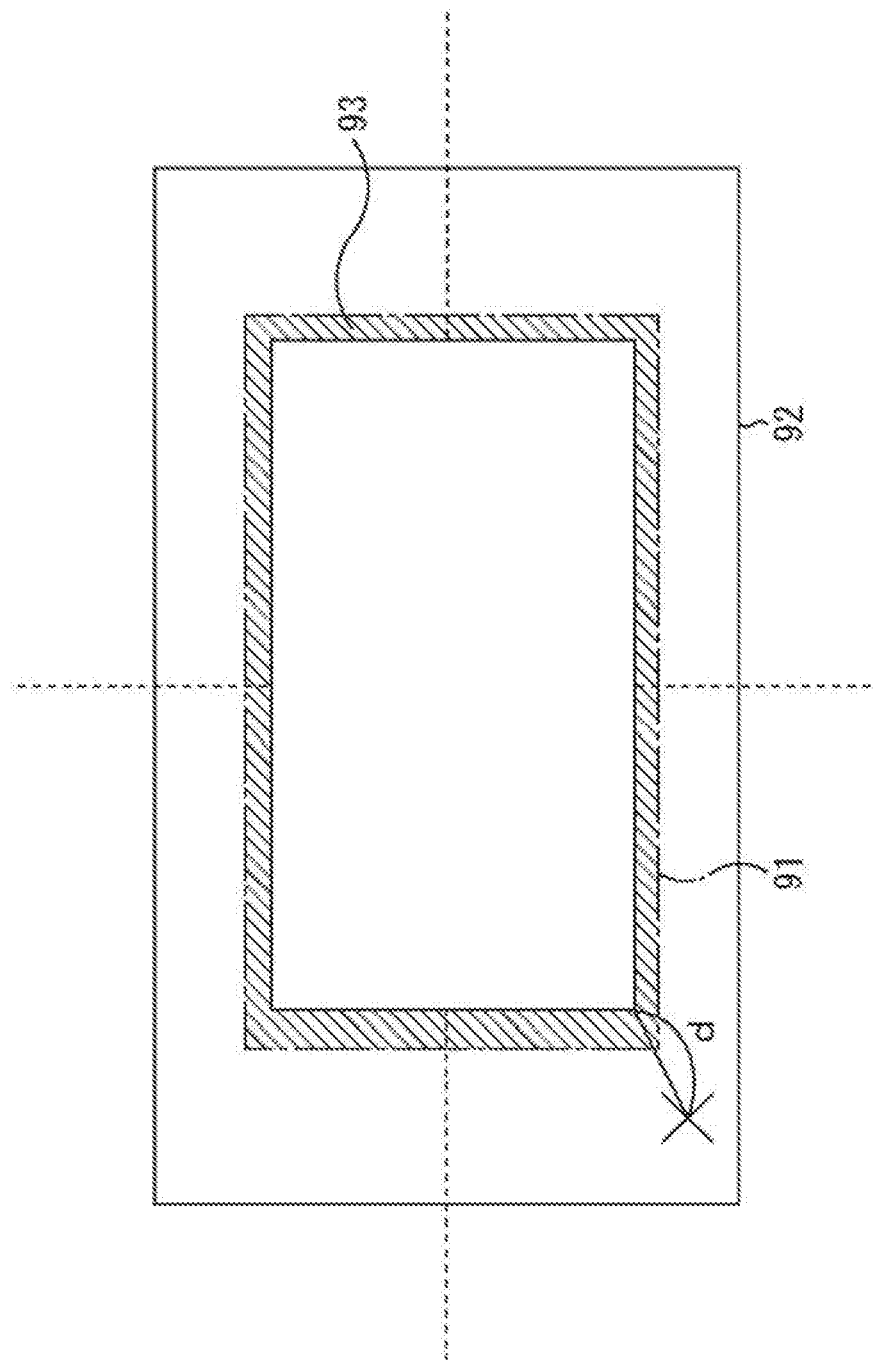
FIG. 10 is a view showing a distance from an inside of a peripheral area.

In other words, as illustrated in FIG. 10, an overlap area 93 overlapping with an input image 91 is present inside a peripheral area 92 of the input image 91. The offset value DarkOffsetDist is so determined as to increase as a distance d of a corresponding pixel from the inside of the peripheral area 92, i.e., from the inside of the overlap area 93 increases.

According to this structure, the offset value DarkOffsetPred increases at low extrapolation reliability, in which condition the peripheral image becomes dark. As a result, the peripheral image becomes inconspicuous. In addition, the offset value DarkOffsetDist increases as the distance d increases. In this case, a pixel located at an outer position becomes darker. Accordingly, artifact produced by extrapolation decreases.

(Description of Synthesis of Input Images)

Figure 11:
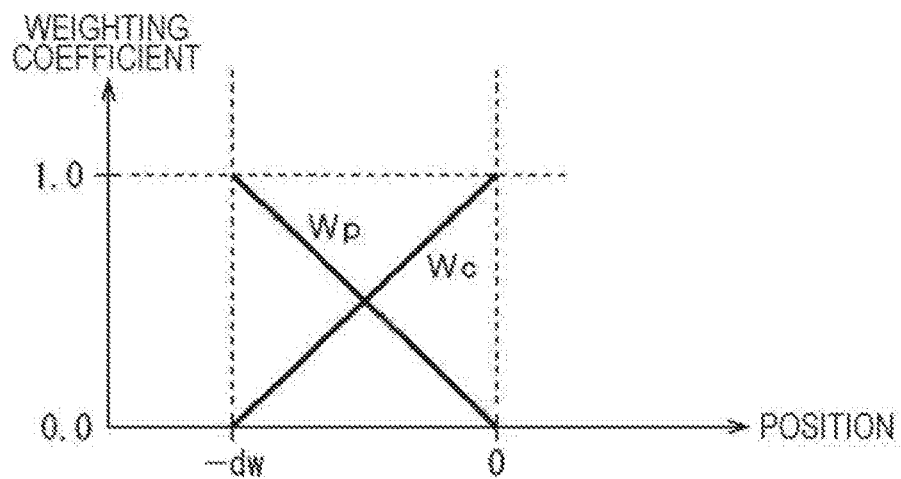
FIG. 11 is a view illustrating synthesis of input images performed by a synthesis unit in FIG. 1.

FIG. 11 is a view illustrating synthesis of input images performed by the synthesis unit 13 illustrated in FIG. 1.

The synthesis unit 13 generates a synthesis image of an area contained in the input image supplied from the periphery generation unit 12, and corresponding to an area other than an overlapping area with the peripheral area. In addition, the synthesis unit 13 further generates a synthesis image of an area contained in the peripheral image supplied from the periphery generation unit 12, and corresponding to an area other than an overlapping area with the input image.

Furthermore, the synthesis unit 13 also generates a synthesis image of the overlapping area of the input image, and the overlapping area of the peripheral image, synthesized for each pixel by using following Mathematical Formula (3).

[Mathematical Formula 3]

$$Blend = Wp \times Psig + Wc \times Csig \quad (3)$$

In Mathematical Formula (3), Blend is a pixel value of a pixel in the synthesis image of the overlapping area. In addition, in Mathematical Formula (3), Psig is a pixel value of a pixel in the overlapping area of the peripheral image, while Csig is a pixel value of a pixel in the overlapping area of the input image.

In addition, in Mathematical Formula (3), Wp and Wc are weighting coefficients based on the distance between the inside of the peripheral area of the input image and a pixel in the horizontal direction or the vertical direction. The sum of the weighting coefficients Wp and Wc is 1. More specifically, when the pixel corresponding to the pixel value Blend is a pixel within the overlapping area present on the left and right sides of the input image, the weighting coefficients Wp and Wc are weighting coefficients determined based on the distance in the horizontal direction. On the other hand, when the pixel corresponding to the pixel value Blend is a pixel within the overlapping area present above and below the input image, the weighting coefficients Wp and Wc are weighting coefficients determined based on the distance in the vertical direction.

In addition, when the position in the innermost position in the peripheral area of the input image in the horizontal direction (or vertical direction) is 0, the weighting coefficient Wp of a pixel at a position −dw corresponding to the outermost position of the overlapping area in the horizontal direction (or vertical direction) becomes 1 as illustrated in FIG. 11. The weighting coefficient Wp decreases as the position of the corresponding pixel in the horizontal direction (or vertical direction) comes closer to 0 corresponding to the innermost position in the overlapping area in the horizontal direction (or vertical direction). When the position of the corresponding pixel reaches 0, the weighting coefficient Wp becomes 0.

On the other hand, the weighting direction Wc of a pixel at a position −dw in the horizontal direction (or vertical direction) becomes 0 as illustrated in FIG. 11. The weighting coefficient Wc increases as the position of the corresponding pixel comes closer to 0. When the position of the corresponding pixel reaches 0, the weighting coefficient Wc becomes 1.

Note that synthesis of the depth images is performed similarly to the synthesis of the input images discussed with reference to FIG. 11.

(Configuration Example of Analysis Unit)

Figure 12:
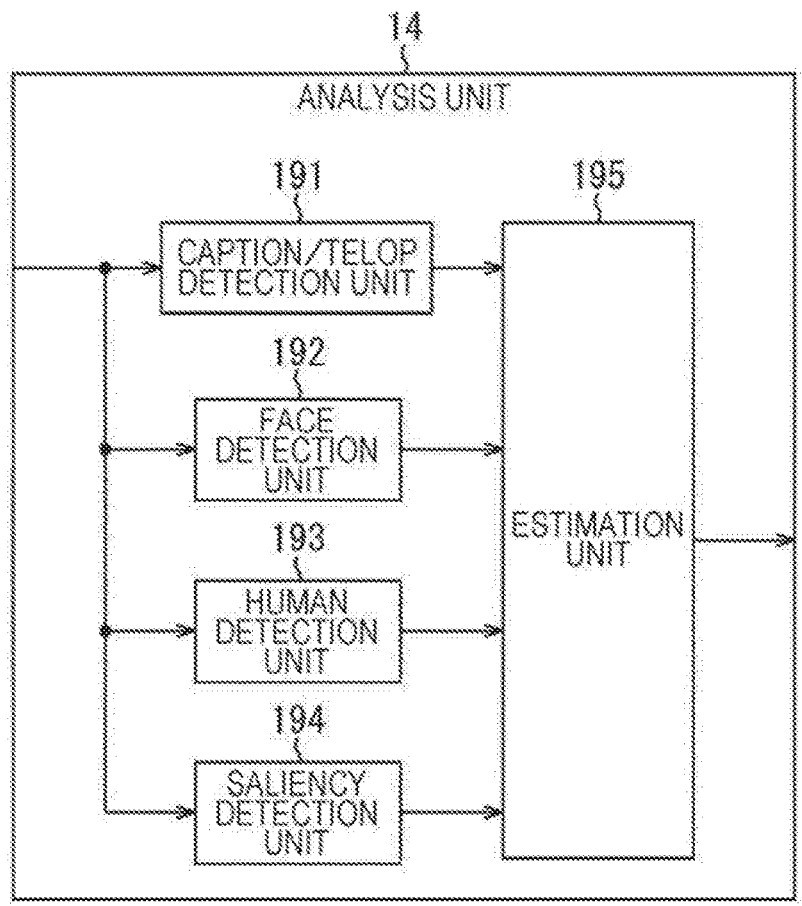
FIG. 12 is a block diagram illustrating a configuration example of an analysis unit in FIG. 1.

FIG. 12 is a block diagram of a configuration example of the analysis unit 14 illustrated in FIG. 1.

The analysis unit 14 illustrated in FIG. 12 is constituted by a caption/telop detection unit 191, a face detection unit 192, a human detection unit 193, a saliency detection unit 194, and an estimation unit 195.

The caption/telop detection unit 191 of the analysis unit 14 detects a caption/telop area corresponding to an area containing a caption or a telop of the input image on the basis of On Screen Display (OSD) information about the input image, for example. The caption/telop detection area may be detected by using a method described in "A comprehensive method for multilingual video text detection", Lyu, M. R.: Jiqiang Song; Min Cai: localization, and extraction. IEEE Transactions on Circuits and Systems for Video Technology 15(2), 243-255(2005), for example.

The caption/telop detection unit 191 generates a caption/telop map indicating the position, size, and likelihood of the detected caption/telop area. The caption/telop map is an image indicating the likelihood that the respective pixels constituting the input image are contained in the caption/telop area by using pixel values ranging from 0 to 255. It is assumed herein that likelihood of the caption/telop area increases as the pixel value of the caption/telop map increases. The caption/telop detection unit 191 supplies the generated caption/telop map to the estimation unit 195.

The face detection unit 192 detects a face area from the input image. When the input image is an image captured during visual communication, for example, the face detection unit 192 detects a face area on the basis of position information at respective windows.

The face detection unit 192 subsequently generates a face map indicating the position, size, and likelihood of the detected face area. The face map is an image indicating the likelihood that the respective pixels constituting the input image are contained in the face area by using pixel values ranging from 0 to 255. It is assumed herein that the likelihood of the face area increases as the pixel value of the face map increases. The face detection unit 192 supplies the generated face map to the estimation unit 195.

The human detection unit 193 detects a human area from the input image. When the input image is an image captured by a monitoring camera, for example, the human detection unit 193 detects a human area on the basis of information about a tracking target supplied from the monitoring camera.

The human detection unit 193 generates a human map indicating the position, size, and likelihood of the detected human area. The human map is an image indicating the likelihood that the respective pixels constituting the input image are contained in the human area by using pixel values ranging from 0 to 255. It is assumed herein that the likelihood of the human area increases as the pixel value of the human map increases. The human detection unit 193 supplies the generated human map to the estimation unit 195.

The saliency (visual attraction) detection unit 194 detects an area of a subject easily attracting attention of a person from the input image as a main subject area with the designation by a viewer, for example. The subject area is detected by a method described in Japanese Patent Application Laid-Open No. 2010-262506, for example. The saliency detection unit 194 generates a subject map indicating the position, size, and likelihood of the detected subject area.

The subject map is an image indicating the likelihood that the respective pixels constituting the input image are contained in the subject area by using pixel values ranging from 0 to 255. It is assumed herein that the likelihood of the subject area increases as the pixel value of the subject map increases. The saliency detection unit 194 supplies the generated subject map to the estimation unit 195.

The estimation unit 195 generates a significance map on the basis of the caption/telop map received from the caption/telop detection unit 191, the face map received from the face detection unit 192, the human map received from the human detection unit 193, and the subject map received from the saliency detection unit 194. The estimation unit 195 supplies the generated significance map to the determination unit 15 illustrated in FIG. 1.

(Description of Generation of Significance Map)

Figure 13:
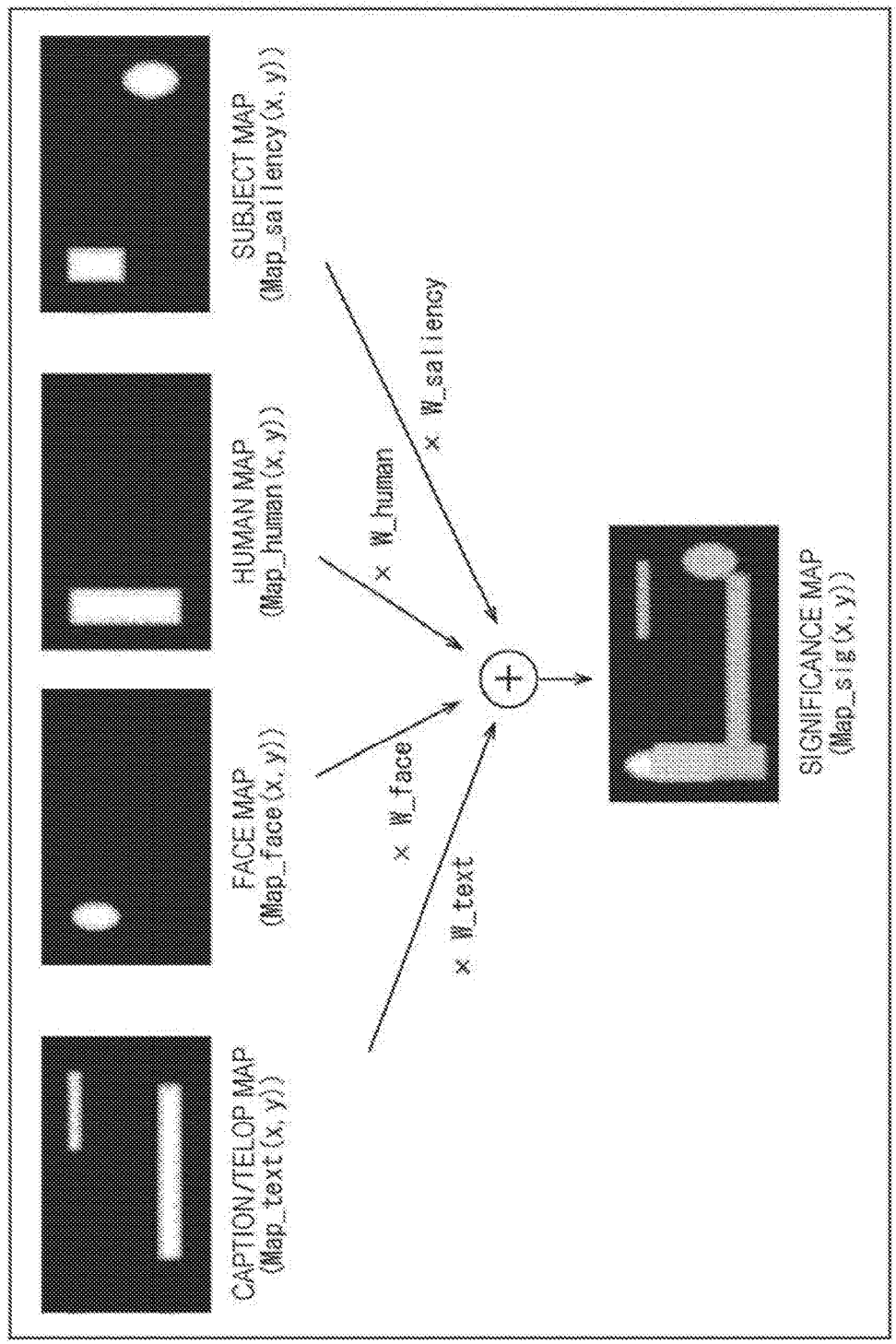
FIG. 13 is a view illustrating generation of a significance map from an estimation unit in FIG. 12.

FIG. 13 is a view illustrating generation of the significance map by the estimation unit 195 illustrated in FIG. 12.

As illustrated in FIG. 13, the estimation unit 195 calculates a weighted average of the pixel value of the caption/telop map, the pixel value of the face map, the pixel value of the human map, and the pixel value of the subject map for each pixel by using following Mathematical Formula (4), and sets the calculated weighted average to a pixel value of the significance map.

[Mathematical Formula 4]

$$\text{Map\_sig}(x,y) = W\_\text{text} * \text{Map\_text}(x,y) + W\_\text{face} * \text{Map\_face}(x,y) + W\_\text{human} * \text{Map\_human}(x,y) + W\_\text{sailency} * \text{Map\_sailency}(x,y) \quad (4)$$

In Mathematical Formula (4), Map_sig(x, y) is a pixel value of a pixel at a position (x, y) of the significance map. In addition, in Mathematical Formula (4), W_text, W_face, W_human, and W_sailency are weighting coefficients. The sum of these weighting coefficients is 1. In Mathematical Formula (4), Map_text(x, y) is a pixel value of a pixel at a position (x, y) of the caption/telop map, while Map_face(x, y) is a pixel value of a pixel at a position (x, y) of the face map. In Mathematical Formula (4), Map_human(x, y) is a pixel value of a pixel at a position (x, y) of the human map, while Map_sailency (x, y) is a pixel value of a pixel at a position (x, y) of the subject map.

While the weighted average is set to the pixel value of the significance map in this example, the pixel value of the significance map may be the maximum value in the pixel value of the caption/telop map, the pixel value of the face map, the pixel value of the human map, and the pixel value of the subject map. In addition, the weighted value may be normalized such that the dynamic range lies in the range from 0 to 255 before being set to the pixel value of the significance map.

(Configuration Example of Determination Unit)

Figure 14:
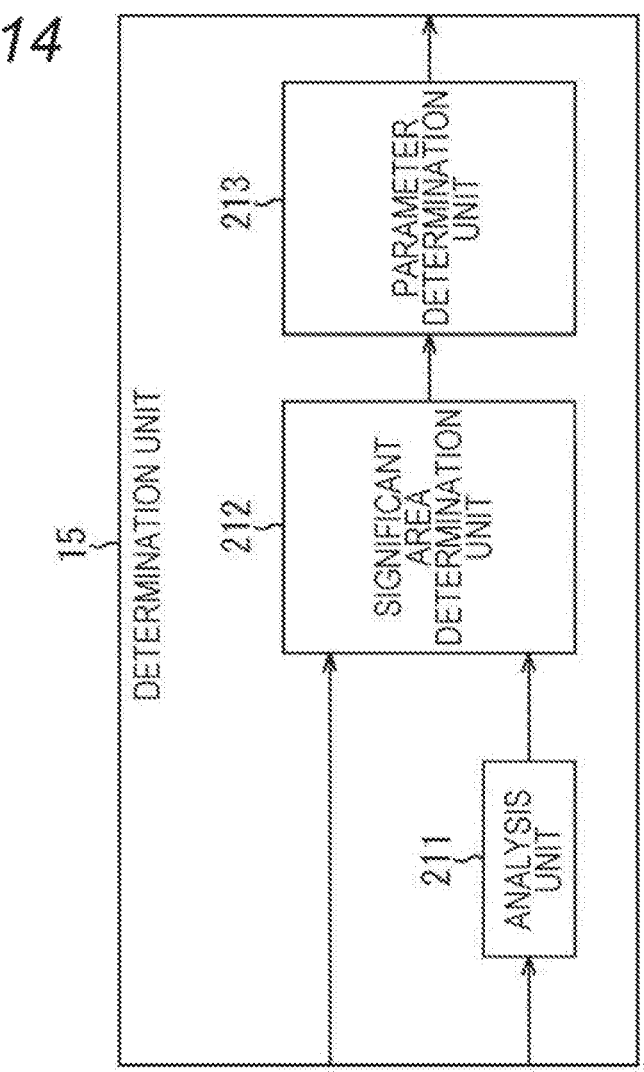
FIG. 14 is a block diagram illustrating a configuration example of a determination unit in FIG. 1.

FIG. 14 is a block diagram illustrating a configuration example of the determination unit 15 in FIG. 1.

The determination unit 15 illustrated in FIG. 14 is constituted by an analysis unit 211, a significant area determination unit 212, and a parameter determination unit 213.

The analysis unit 211 of the determination unit 15 generates a significance map on the basis of program category information contained in Electronic Program Guide (EPG) input as an attribute signal from the outside, for example.

More specifically, it is highly likely that captions or telops are contained in images of a news program, a variety show, and a talk show. It is also possible to estimate the area containing display of the captions or telops. Accordingly, when the program category information indicates a news program, a variety show, or a talk show, the analysis unit 211 detects the area likely to display captions or telops, and determines the detected area as a highly significant area. Subsequently, the analysis unit 211 generates a significance map indicating that the pixels contained in the significant area are significant pixels.

On the other hand, conditions such as an imaging method and an imaging angle have been determined beforehand in sport programs. For example, a tennis match is imaged at such an angle that players are present at positions divided into an upper part and a lower part of a screen. Accordingly, when the program category information indicates a tennis match, the analysis unit 211 detects the upper part and the lower part of the screen as highly significant areas, and generates a significance map indicating that the pixels within the respective significant areas are significant.

Note that the significance map generated by the analysis unit 211 is an image representing the significance of each pixel by a pixel value ranging from 0 to 255. In this example, a larger pixel value indicates higher significance. The analysis unit 211 supplies the generated significance map to the significant area determination unit 212.

The significant area determination unit 212 determines a final significance map on the basis of the significance map supplied from the estimation unit 195 illustrated in FIG. 12, and the significance map supplied from the analysis unit 211 by using following Mathematical Formula (5).

[Mathematical Formula 5]

$$BlendSigMap(x,y) = W \times Map\_sig(x,y) + (1.0 - W) \times MetaSigMap(x,y) \quad (5)$$

In Mathematical Formula (5), BlendSigMap(x, y) is a pixel value of a pixel at a position (x, y) in the final significance map. In Mathematical Formula (5), W is a weighting coefficient determined in a range from 0 to 1. In Mathematical Formula (5), Map_sig(x, y) is a pixel value of a pixel at a position (x, y) in the significance map supplied from the estimation unit 195, while MetaSigMap(x, y) is a pixel value of a pixel at a position (x, y) in the significance map supplied from the analysis unit 211.

The significant area determination unit 212 binarizes the final significance map to generate a binary map. Note that, in this case, the significant area determination unit 212 may use median filter or morphological filter for isolated pixel replacement as necessary.

The significant area determination unit 212 detects pixels having a pixel value 1 in the binary map, i.e., a rectangular area bounded on white pixels as a significant area, and supplies significant area information indicating this significant area to the parameter determination unit 213 as final significant area information.

The parameter determination unit 213 determines parameters on the basis of the finial significant area information supplied from the significant area determination unit 212 such that the significant area of the input image falls within the central field of vision of the viewer. The parameter determination unit 213 supplies the determined parameters to the pseudo image generation unit 16 illustrated in FIG. 1.

(Example of Binary Map)

Figure 15:
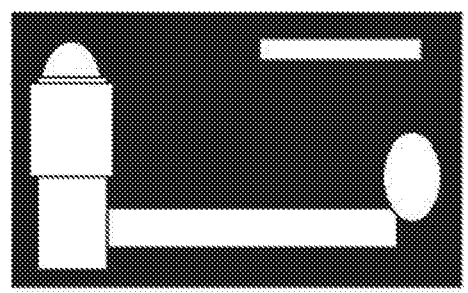
FIG. 15 is a view illustrating an example of a binary map.

FIG. 15 is a view illustrating an example of a binary map.

The significant area determination unit 212 binarizes respective pixel values of the final significance map by setting pixel values exceeding a threshold to 1, and setting pixel values not exceeding the threshold to 0. The final significance map illustrated in FIG. 13 becomes a binary map illustrated in FIG. 15 after binarization.

(Example of Significant Area)

Figure 16:
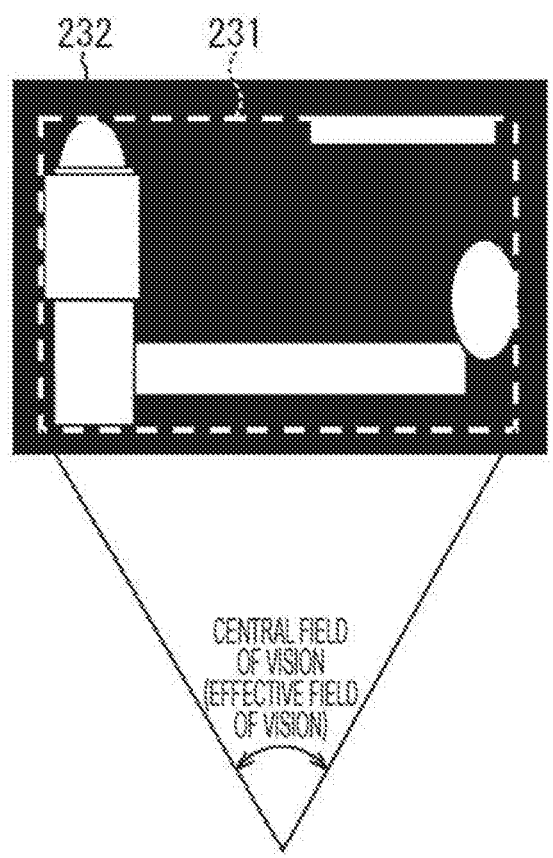
FIG. 16 is a view illustrating an example of a significant area detected on the basis of the binary map in FIG. 15.

FIG. 16 is a view illustrating an example of the significant area detected from the binary map illustrated in FIG. 15.

As illustrated in FIG. 16, a rectangular area 231 bounded on a white area of pixels having the pixel value 1 is detected as a significant area from the binary map illustrated in FIG. 15. Thereafter, parameters are determined such that the rectangular area 231 within an input image 232 falls within the central field of vision of the viewer as illustrated in FIG. 16.

(Relationship Between Three-Dimensional Position of Subject and Two-Dimensional Position of Subject on Image)

Figure 17:
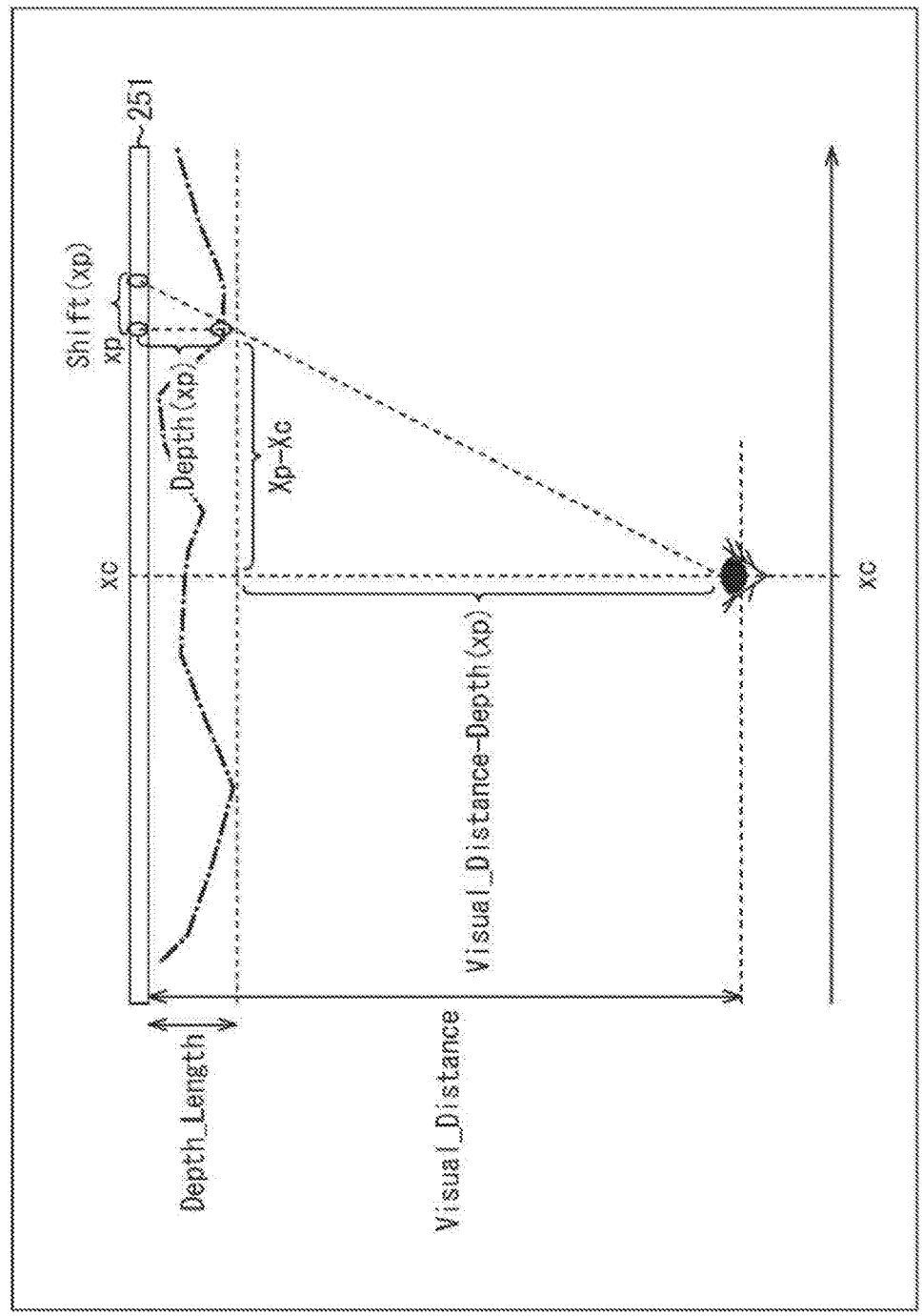
FIG. 17 is a view showing a relationship between a three-dimensional position of a subject and a two-dimensional position of the subject on an image.

FIG. 17 is a view illustrating a relationship between a three-dimensional position of a subject and a two-dimensional position of the subject on an image.

FIG. 17 is a view illustrating the viewer and the display showing an image as viewed from above. In addition, in the figure, an alternate long and short dash line indicates physical positions of a subject in the image in the depth direction.

According to the example illustrated in FIG. 17, the positions of the subject in the horizontal direction are all located in front of the display surface of a display 251 in the depth direction as indicated by the alternate long and short dash line. However, the relationship between the display surface of the display 251 and the positions of the subject in the depth direction is not limited to this relationship shown herein. The positions of the subject in the horizontal direction may be all located on the inner side of the display surface of the display 251 in the depth direction, or may be located both on the inner side and on the front side of the display 251.

Assuming that a position of a pixel of an image on the display 251 in the horizontal direction is a position xp, the position of the subject corresponding to this pixel in the depth direction is defined by following Mathematical Formula (6) on the basis of the pixel value of the pixel at the position xp in the depth image.

[Mathematical Formula 6]

$$Depth(xp) = (depth(xp)/255) \times Depth\_Length \quad (6)$$

In Mathematical Formula (6), Depth(xp) is a position of the subject corresponding to the pixel at the position xp in the depth direction. In addition, in Mathematical Formula (6), depth(xp) is a pixel value of the pixel at the position xp in the depth image, and determined in a range from 0 to 255. In addition, in Mathematical Formula (6), Depth_Length is a dynamic range of the physical position of the subject in the depth direction indicated by the alternate long and short dash line in FIG. 17.

In addition, the image shows transformation of the three-dimensional position of the subject into a two-dimensional position of the subject on the image by perspective transformation. Accordingly, the subject present in the three-dimensional space is reproduced in the image in such a state that the three-dimensional structure of the subject is reflected in the two-dimensional image (large image for close object, and small image for far object).

Accordingly, a difference between the position xp and the display position of the subject at the position Depth(xp) in the depth direction displayed on the display 251 in the horizontal direction (shift amount by projection) is calculated by following Mathematical Formula 7).

[Mathematical Formula 7]

$$\text{Shift} p(xp) = \text{Depth}(xp) * (xp - xc)/(\text{Visual\_Distance} - \text{Depth}(xp)) \quad (7)$$

In Mathematical Formula (7), Shiftp(xp) is a difference between the position xp and the display position of the image of the subject at the position Depth(xp) in the depth direction displayed on the display 251 in the horizontal direction. In Mathematical Formula (7), xc is a position (coordinate of position) of a virtual viewpoint corresponding to a viewpoint of the image on the display 251 in the horizontal direction. Note that, in this case, xp and xc are values decreasing in the leftward direction, for example. In addition, Visual_Distance is a distance between the virtual viewpoint and the display 251, i.e., a virtual view distance.

According to Mathematical Formulae (6) and (7), the display position of the image in the horizontal direction is changeable by changing the virtual view distance and the position of the virtual viewpoint in the horizontal direction. Accordingly, the parameter determination unit 213 determines the virtual view distance of a pseudo image and the position of the virtual viewpoint of the pseudo image in the horizontal direction as parameters such that the significant area of the input image falls within the central field of vision of the viewer.

When the virtual view distance changes, an impression of proximity to the subject (impression of distance from subject in front-rear direction) changes. When the position of the virtual viewpoint in the horizontal direction changes, a visual line direction changes.

(First Example of Parameter Determination Method)

Figure 18:
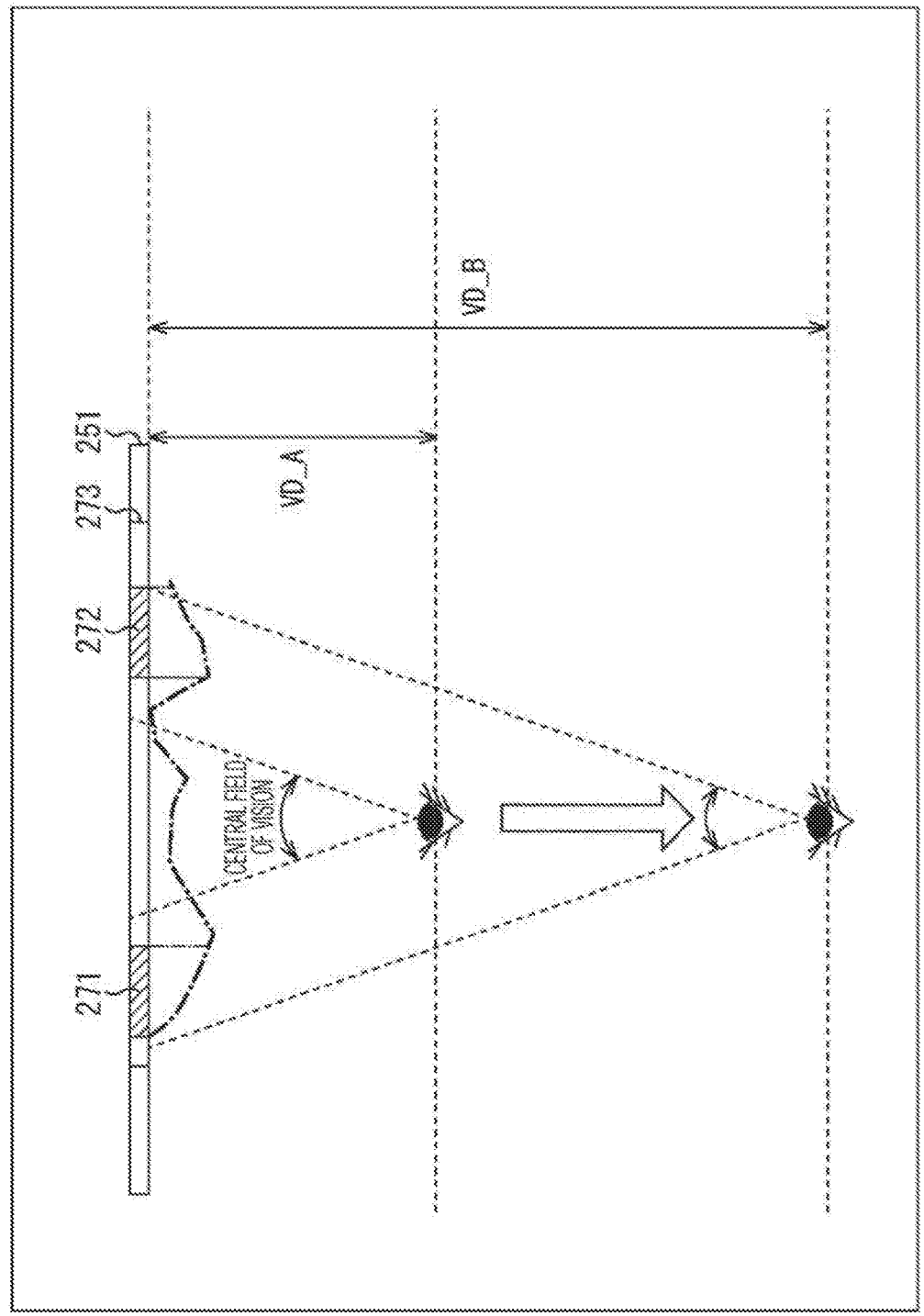
FIG. 18 is a view illustrating a first example of a parameter determination method.

FIG. 18 is a view illustrating a first example of a parameter determination method.

FIG. 18 is a view illustrating the viewer and the display showing an image as viewed from above. In addition, an alternate long and short dash line in the figure indicates physical positions of a subject in an input image in the depth direction. These assumptions are applicable to FIGS. 19, 20, and 23 through 25 described below.

When significant areas 271 and 272 are present at ends of an input image 273, the respective significant areas 271 and 272 are positioned out of the central field of vision at a relatively short virtual view distance VD_A as illustrated in FIG. 18, for example. However, at a virtual view distance VD_B longer than the virtual view distance VD_A, the weight areas 271 and 272 falls within the central field of vision.

Accordingly, the parameter determination unit 213 sets the virtual view distance as a parameter to the virtual view distance VD_B to position the significant areas 271 and 272 within the central field of vision. As a result, visibility of a significant area in a pseudo image improves. Note that, in the present specification, visibility refers to a level of visibility of an image or easiness in grasping contents of an image.

The pseudo image generation unit 16 may immediately change the virtual view distance to the distance VD_B, or gradually change the virtual view distance from a default value shorter than the virtual view distance VD_B to the virtual view distance VD_B. For gradually changing the virtual view distance, the pseudo image generation unit 16 may generate, as a pseudo image, an image having motion parallax captured by dolly-out imaging of a subject in a synthesis image (imaging while retracting camera from subject) on the basis of the changed virtual view distance and a synthesis depth image. This method emphasizes a sense of depth of the pseudo image.

(Second Example of Parameter Determination Method)

Figure 19:
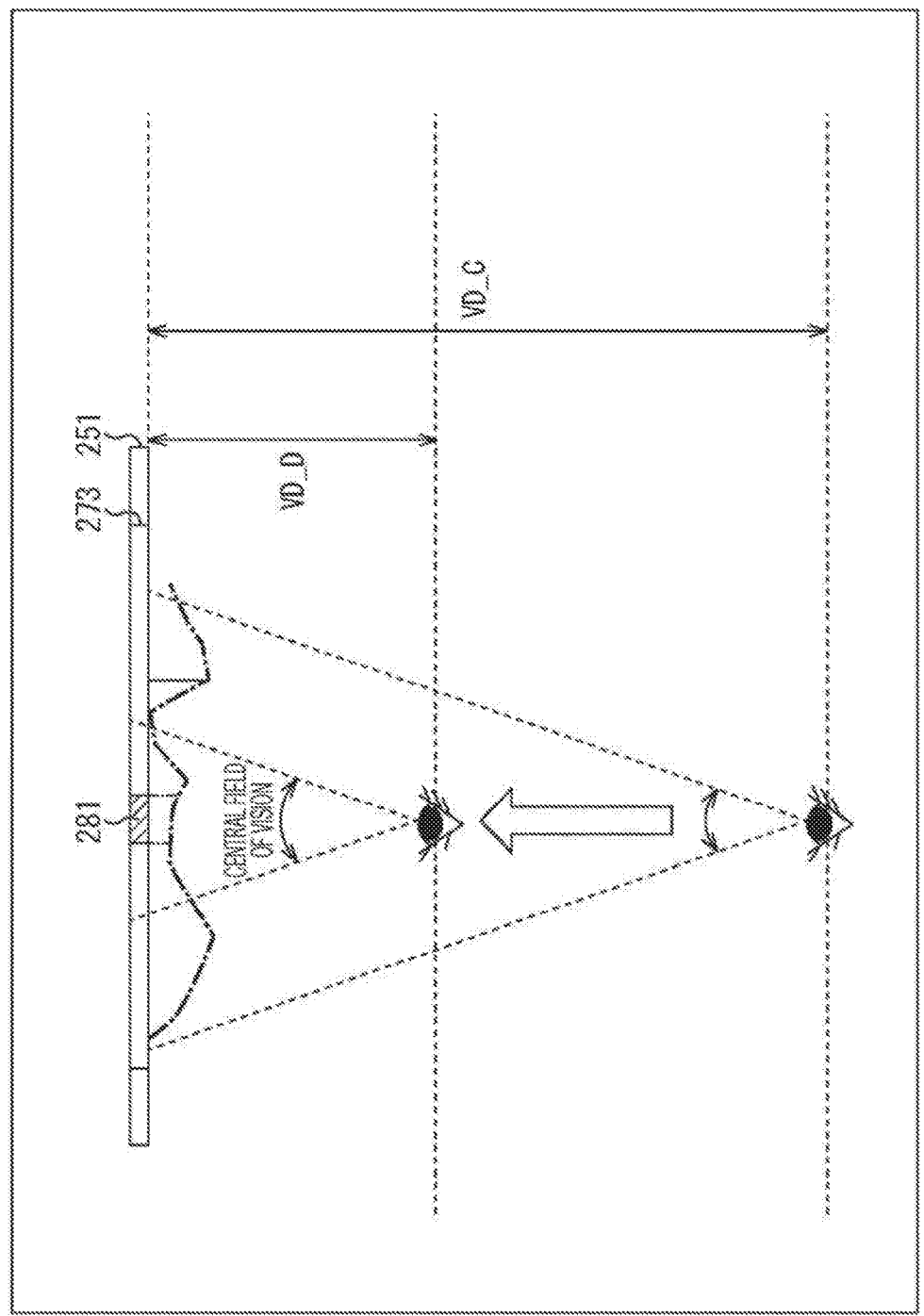
FIG. 19 is a view illustrating a second example of the parameter determination method.

FIG. 19 is a view illustrating a second example of the parameter determination method.

When a significant area 281 of the input image 273 is relatively small as illustrated in FIG. 19, an occupation ratio of the significant area 281 within the central field of vision becomes considerably small at a relatively large virtual view distance VD_C, for example. In this case, the significant area 281 is difficult to recognize. However, at a virtual view distance VD_D smaller than the virtual view distance VD_C, for example, the occupation ratio of the significant area 281 within the central field of vision increases. As a result, visibility of the significant area 281 improves.

Accordingly, the parameter determination unit 213 sets the virtual view distance as a parameter to the virtual view distance VD_D such that the significant area 281 falls within the central field of vision and has at least an occupation ratio of a threshold in the central field of vision. As a result, visibility of a significant area in a pseudo image improves.

When an input image is captured at a wide angle on the assumption that the input image is viewed with a wide view on a large-sized display, for example, a significant area becomes small and difficult to recognize.

On the other hand, when an image is viewed on a large-sized display having high resolution such as 4 K resolution and 8 K resolution, the viewer does not notice pixel structure even at a short distance from the display due to a small display size of pixels. For example, the viewer does not notice pixel structure of the display even at a short distance of 1.5 times longer than the height of the screen of a 4 K-resolution large-sized display, or at a short distance of 0.75 times longer than the height of the screen of an 8 K-resolution large-sized display. Accordingly, the viewer is allowed to view an image at a position close to the display.

Accordingly, when an input image captured at a wide angle is viewed by the viewer from a position close to the display, the virtual view distance as a parameter is reduced. In this case, a pseudo image having a large significant area is generated and displayed. As a result, visibility of the significant area improves.

The pseudo image generation unit 16 may immediately change the virtual view distance to the virtual view distance VD_D, or gradually change the virtual view distance from a default value larger than the virtual view distance VD_D to the virtual view distance VD_D. For gradually changing the virtual view distance, the pseudo image generation unit 16 may generate, as a pseudo image, an image having motion parallax captured by dolly-in imaging of a subject in a synthesis image (imaging while advancing camera from subject) on the basis of the value of the changed virtual view distance and a synthesis depth image. This method emphases a sense of depth of the pseudo image.

(Third Example of Parameter Determination Method)

Figure 20:
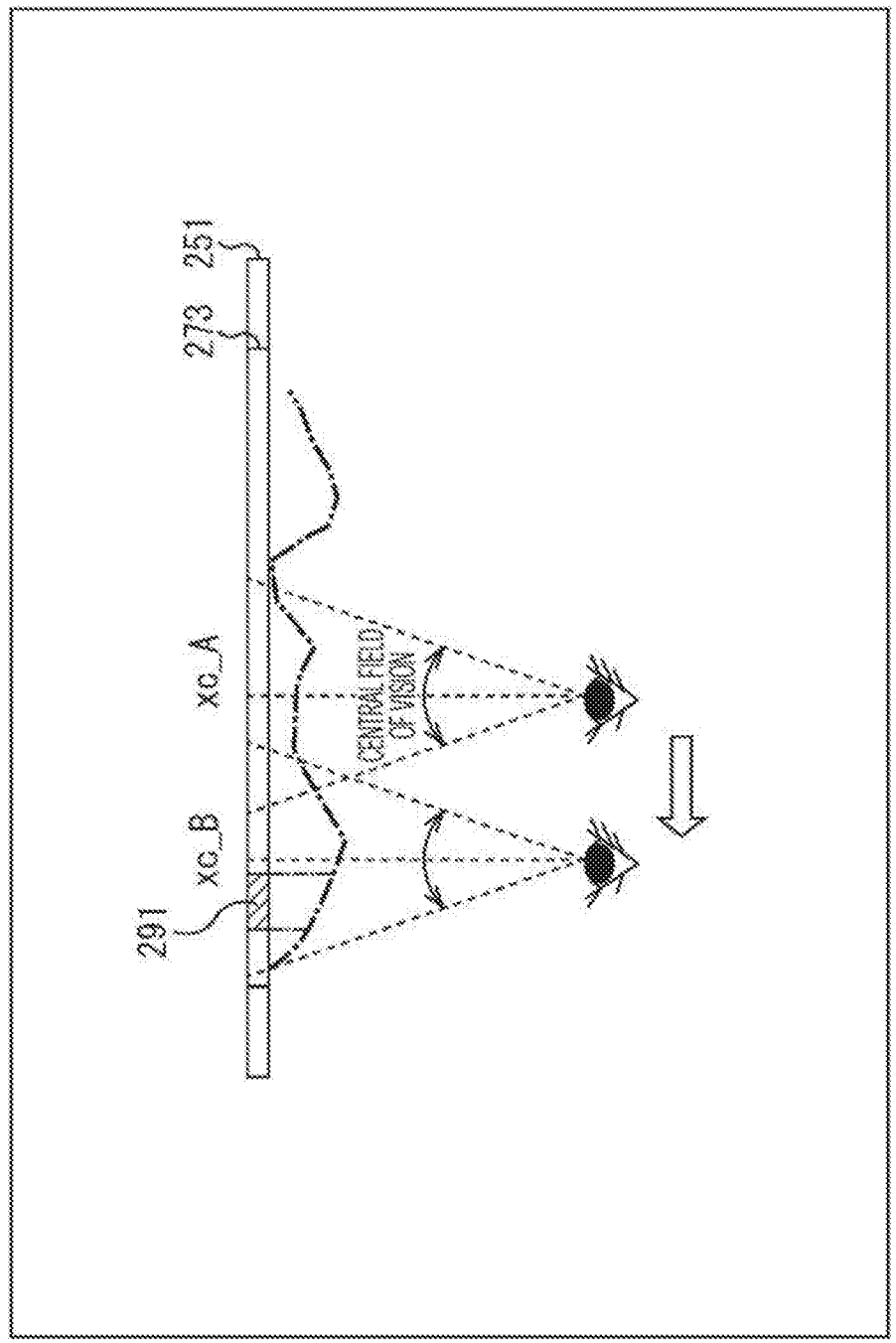
FIG. 20 is a view illustrating a third example of the parameter determination method.

FIG. 20 is a view illustrating a third example of the parameter determination method.

When a significant area 291 is present at an end of the input image 273, the significant area 291 lies out of the central field of vision on the assumption that the virtual viewpoint in the horizontal direction is located at a position xc_A in the vicinity of the center as illustrated in FIG. 20, for example. However, when the virtual viewpoint in the horizontal direction is located at a position xc_B relatively close to the significant area 291, for example, the significant area 291 falls within the central field of vision.

Accordingly, the parameter determination unit 213 sets the position of the virtual viewpoint in the horizontal direction as a parameter to the position xc_B such that the significant area 291 falls within the central field of vision. As a result, visibility of a significant area in a pseudo image improves.

The pseudo image generation unit 16 may immediately change the position of the virtual viewpoint in the horizontal direction to the position xc_B, or gradually change the virtual viewpoint from a default value larger than the position of the virtual viewpoint xc_B in the horizontal direction to the virtual viewpoint xc_B. For gradually changing the position of the virtual viewpoint in the horizontal direction, the pseudo image generation unit 16 may generate, as a pseudo image, an image having motion parallax captured by track imaging of a subject in a synthesis image (imaging while shifting camera in parallel with subject) on the basis of the value of the changed position and a synthesis depth image. This method emphases a sense of depth of the pseudo image.

(Configuration Example of Pseudo Image Generation Unit)

Figure 21:
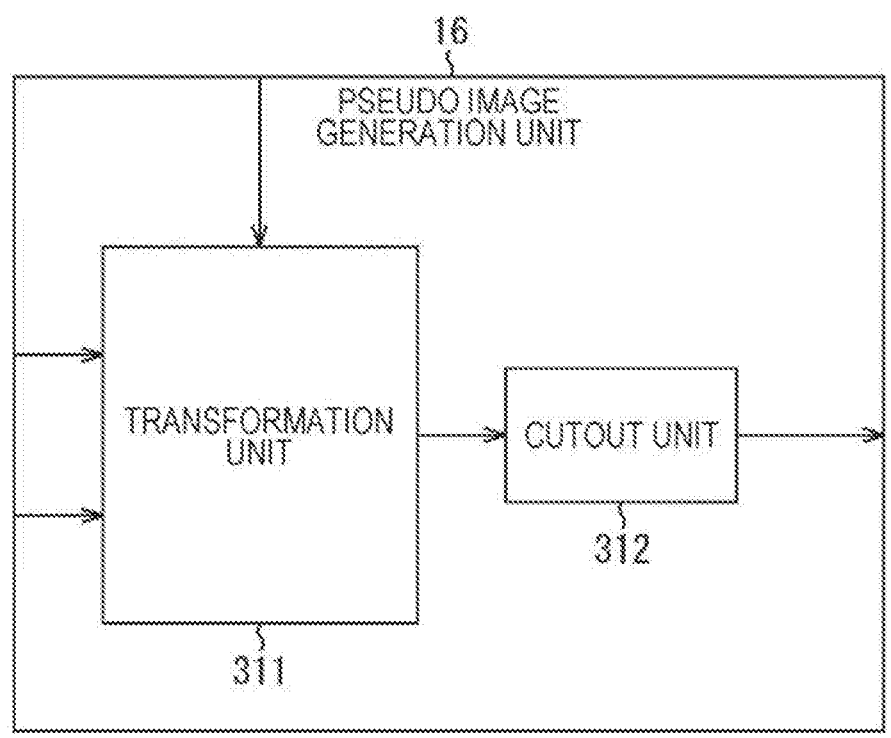
FIG. 21 is a block diagram illustrating a configuration example of a pseudo image generation unit in FIG. 1.

FIG. 21 is a block diagram illustrating a configuration example of the pseudo image generation unit 16 illustrated in FIG. 1.

The pseudo image generation unit 16 illustrated in FIG. 21 is constituted by a transformation unit 311 and a cutout unit 312.

The transformation unit 311 generates a pseudo image on the basis of a perspective transformation model by using a synthesis image and a synthesis depth image supplied from the synthesis unit 13, and parameters supplied from the determination unit 15.

More specifically, the transformation unit 311 obtains a position Depth(xp) in the depth direction by using Mathematical Formula (6) discussed above on the basis of the pixel value depth(xp) as the pixel value of the synthesis depth image. Note that, in this case, Depth_Length may be a fixed value determined beforehand, or a variable value variable in accordance with an instruction from the viewer or the like. A sense of depth (impression of protrusions and recesses) of the pseudo image is changeable in accordance with Depth_Length.

In addition, the transformation unit 311 further obtains a difference Shiftp(xp) by using Mathematical Formula (7) discussed above on the basis of the position Depth(xp) in the depth direction, and the virtual view distance and the position of the virtual viewpoint in the horizontal direction as parameters. Note that the parameters may be either one of the virtual view distance and the position of the virtual viewpoint in the horizontal direction, or may be both. When only the virtual view distance is used as a parameter, a fixed value determined beforehand is used as the position of the virtual viewpoint in the horizontal direction. In addition, when only the position of the virtual viewpoint in the horizontal direction is used as a parameter, a fixed value determined beforehand is used as the virtual view distance.

Furthermore, the transformation unit 311 further generates a pseudo image by shifting the pixel value of the pixel at the position xp in the synthesis image by the difference Shiftp(xp), and positioning (rendering) the shifted pixel value. Note that pixels at positions to which pixel values are not given are interpolated by using pixel values of adjacent pixels, for example. The transformation unit 311 supplies the pseudo image to the cutout unit 312.

The cutout unit 312 trims (deletes) the pseudo image supplied from the transformation unit 311 as necessary to set resolution of the pseudo image to predetermined resolution, and outputs the trimmed pseudo image.

(Explanation of Process by Image Processing Apparatus)

Figure 22:
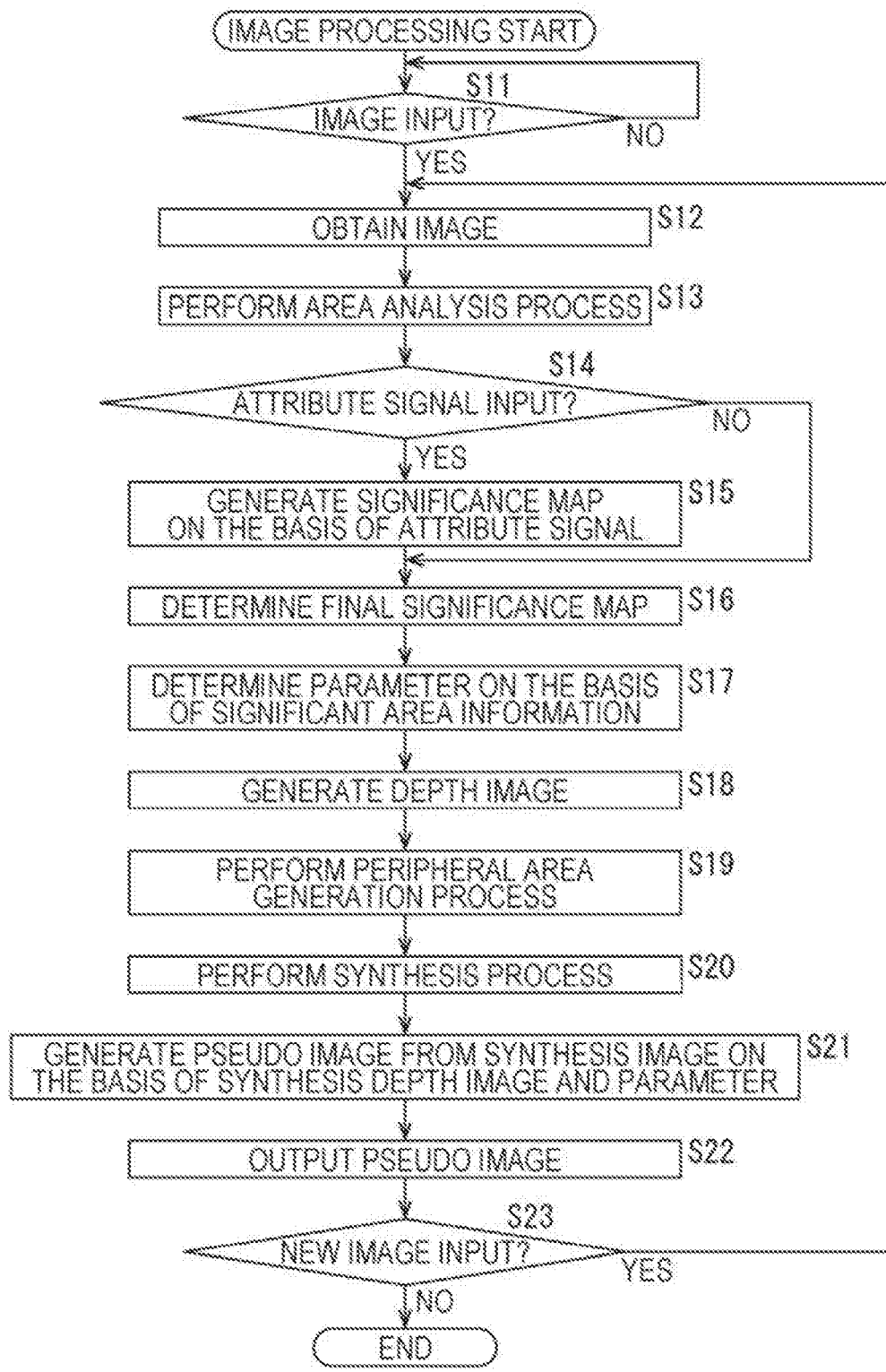
FIG. 22 is a flowchart showing a process performed by the image processing apparatus in FIG. 1.

FIG. 22 is a flowchart showing a process performed by the image processing apparatus 10 illustrated in FIG. 1.

In step S11 in FIG. 22, the image processing apparatus 10 determines whether or not an image has been input from the outside. Note that an image may be input either in units of a frame, or in units of a plurality of frames.

When it is determined in step S11 that no image has been input from the outside, the process remains in a standby state until receiving input of an image from the outside.

When it is determined in step S11 that an image has been input from the outside, the image processing apparatus 10 obtains the image as an input image in step S12.

In step S13, the analysis unit 14 detects a caption/telop area, a face area, a human area, and a subject area from the input image to perform an area analysis process for generating a significance map. The analysis unit 14 supplies the generated significance map to the determination unit 15.

In step S14, the determination unit 15 determines whether or not an attribute signal has been input from the outside. When it is determined in step S14 that an attribute signal has been input from the outside, the process proceeds to step S15.

In step S15, the analysis unit 211 of the determination unit 15 (FIG. 14) generates a significance map on the basis of program category information input as the attribute signal from the outside, whereafter the process proceeds to step S16.

On the other hand, when it is determined in step S14 that no attribute signal has been input from the outside, the process proceeds to step S16.

In step S16, the significant area determination unit 212 determines a final significance map on the basis of the significance map received from the analysis unit 14 and the significance map generated by the analysis unit 211. The significant area determination unit 212 generates significant area information on the basis of the final significance map, and supplies the significant area information to the parameter determination unit 213.

In step S17, the parameter determination unit 213 determines parameters on the basis of the significant area information such that a significant area of the input image falls within the central field of vision of the viewer, and supplies the determined parameters to the pseudo image generation unit 16.

In step S18, the depth image generation unit 11 generates a depth image from the input image, and supplies the generated depth image to the periphery generation unit 12 and the synthesis unit 13.

In step S19, the periphery generation unit 12 performs extrapolation on the basis of interpolation area information input from the outside by using the input image and the depth image to perform a peripheral area generation process for generating a peripheral image and a peripheral depth image. The periphery generation unit 12 supplies the peripheral image and the peripheral depth image to the synthesis unit 13.

In step S20, the synthesis unit 13 perform a synthesis process for synthesizing the peripheral image supplied from the periphery generation unit 12 and the input image, and synthesizing the peripheral depth image supplied from the periphery generation unit 12 and the depth image. The synthesis unit 13 supplies a synthesis image and a synthesis depth image obtained by the synthesis to the pseudo image generation unit 16.

In step S21, the pseudo image generation unit 16 generates a pseudo image from the synthesis image supplied from the synthesis unit 13 on the basis of the synthesis depth image received from the synthesis unit 13 and the parameters received from the determination unit 15. In step S22, the pseudo image generation unit 16 outputs the generated pseudo image.

In step S23, the image processing apparatus 10 determines whether or not a new image has been input. When it is determined in step S23 that a new image has been input, the process returns to step S12, and repeats processing in steps S12 through S23 until input of a new image stops.

When it is determined in step S23 that no new image has been input, the process ends.

As described above, the image processing apparatus 10 generates a pseudo image from an input image on the basis of values of parameters corresponding to characteristics of the input image, and on the basis of a depth image. Accordingly, the image processing apparatus 10 is capable of changing an imaging method of an input image in a pseudo manner by using the depth image.

Note that a model used for generation of a pseudo image may be a model other than the perspective transformation model discussed above. A parameter determination method employed in this case is hereinafter described.

(Fourth Example of Parameter Determination Method)

Figure 23:
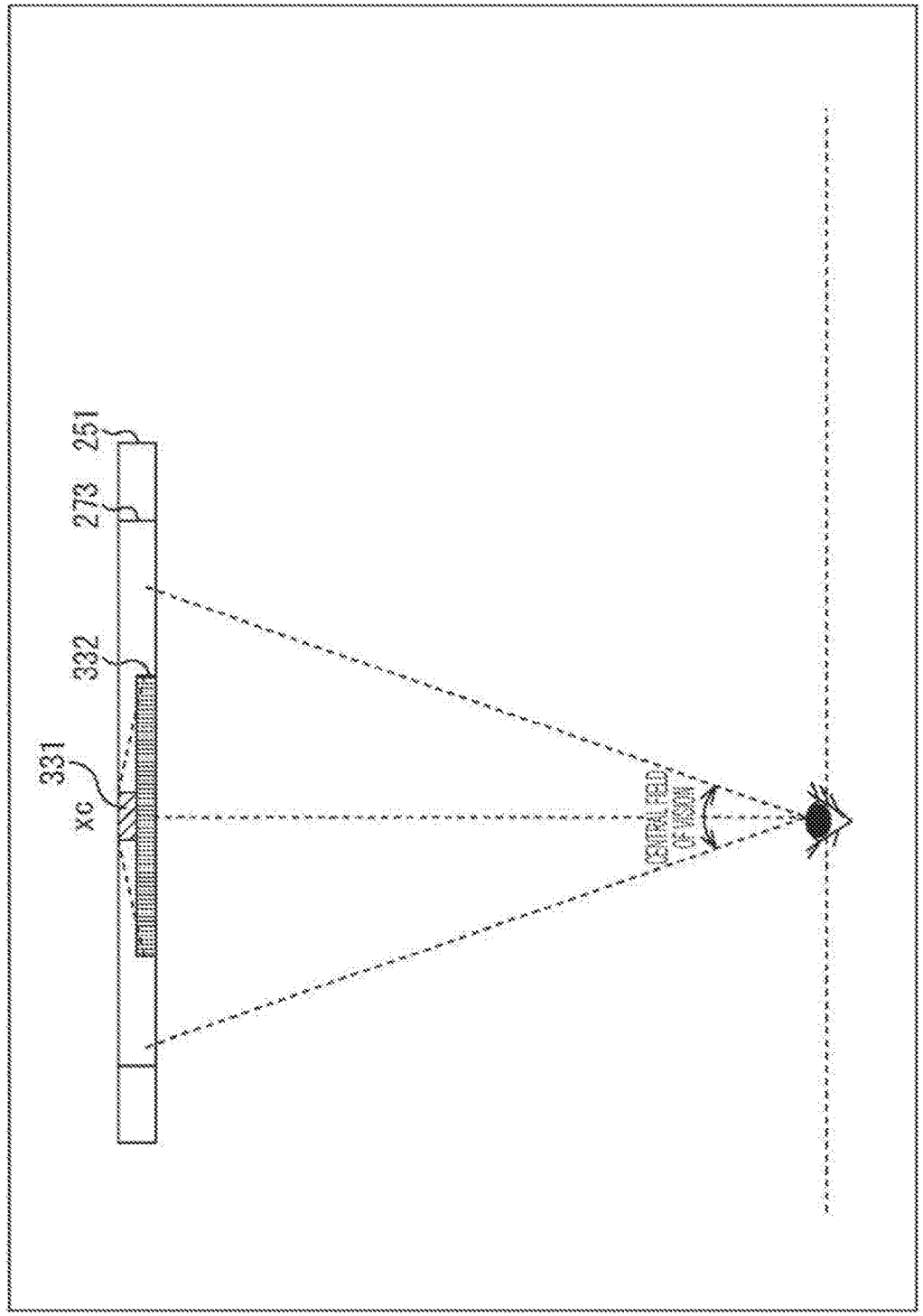
FIG. 23 is a view illustrating a fourth example of the parameter determination method.
Figure 24:
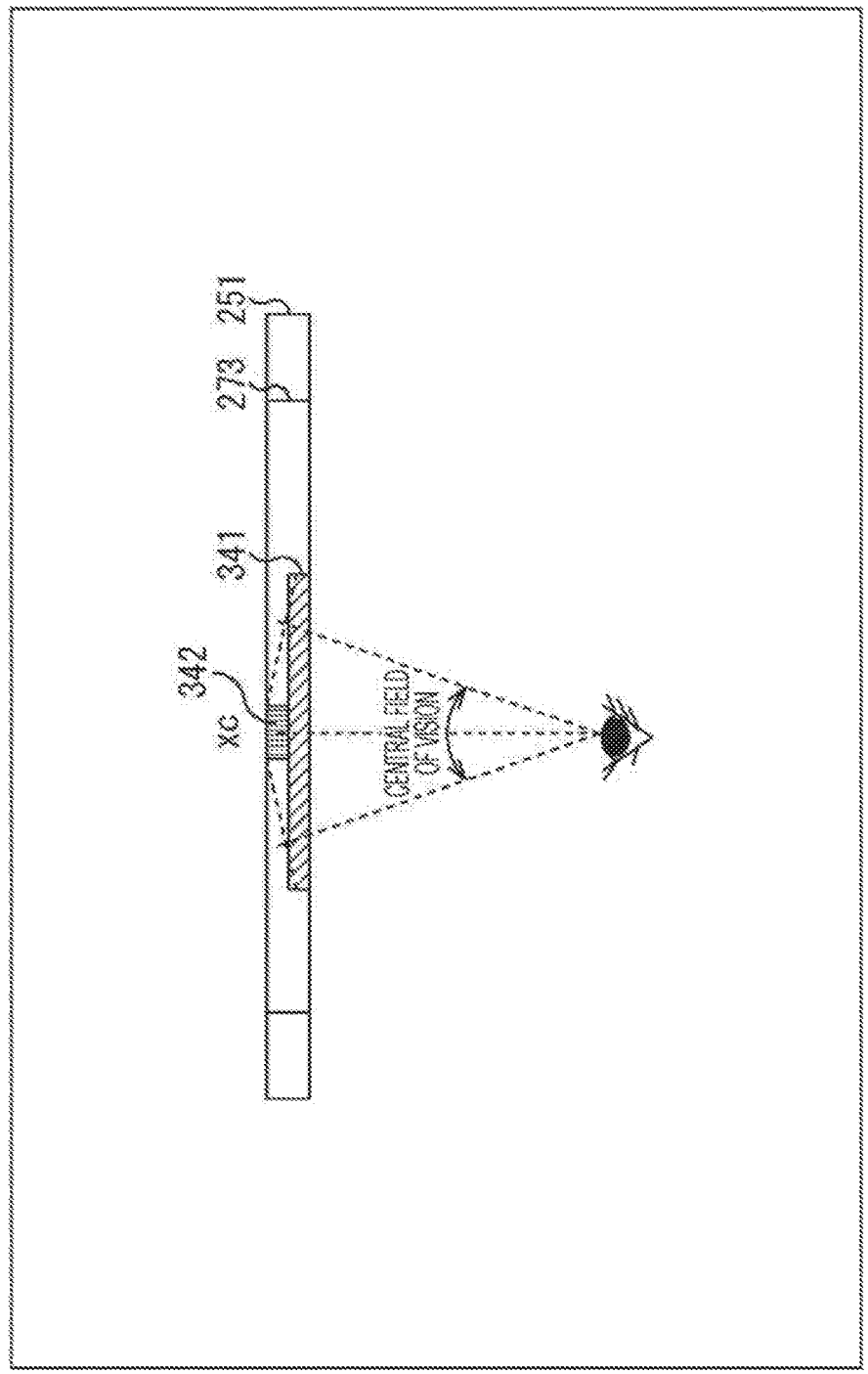
FIG. 24 is a view illustrating the fourth example of the parameter determination method.

FIGS. 23 and 24 are views illustrating a fourth example of the parameter determination method.

According to the example illustrated in FIGS. 23 and 24, a pseudo image is generated on the basis of a scaling model expressed by following Mathematical Formula (8).

[Mathematical Formula 8]

$$\text{Shifts}(xp) = (Zpara - 1) * (xp - xc) \quad (8)$$

In Mathematical Formula (8), Shifts(xp) is a difference between the position xp and a display position of an image of a subject at the position Depth(xp) in the depth direction displayed on the display 251 in the horizontal direction (shift amount by scaling). In addition, in Mathematical Formula (8), Zpara is a scaling ratio of an input image. Furthermore, in Mathematical Formula (8), xc is a position (coordinate of position) of a virtual viewpoint on the display 251 in the horizontal direction.

According to Mathematical Formula (8), the display position of the input image in the horizontal direction is changeable by changing the scaling ratio. Accordingly, when a pseudo image is generated on the basis of a scaling model, the parameter determination unit 213 determines the scaling ratio as a parameter such that a significant area of the input image falls within the central field of vision of the viewer.

When a significant area 331 of the input image 273 is relatively small as illustrated in FIG. 23, an occupation ratio of the significant area 331 within the central field of vision becomes considerably small, in which condition the significant area 331 is difficult to recognize. However, the input image 273 is enlarged at a scaling ratio larger than 1, the significant area 331 after scaling becomes a significant area 332 which has a larger occupation ratio of the significant area within the central field of vision. As a result, visibility of the significant area improves.

Accordingly, the parameter determination unit 213 sets the scaling ratio as a parameter to a value larger than 1 such that the significant area 331 falls within the central field of vision and has at least an occupation ratio of a threshold in the central field of vision. As a result, a synthesis image becomes larger, whereby the significant area 331 within the pseudo image enlarges to become the significant area 332. Visibility of the significant area improves in this condition.

Note that, according to the example illustrated in FIG. 23, the significant area 332 is shown in front of the significant area 331 for easy understanding in the figure. In a practical situation, however, the significant area 331 and the significant area 332 are located at the same position in the depth direction.

The pseudo image generation unit 16 may immediately change the scaling ratio to the value of the parameter, or gradually change the scaling ratio from 1 to the value of the parameter. For gradually changing the scaling ratio, the pseudo image generation unit 16 may generate, as a pseudo image, a predicted value of an image captured by zoom-in (telephoto) imaging of a subject in a synthesis image on the basis of the changed scaling ratio and a synthesis depth image.

When a significant area 341 of the input image 273 is relatively large as illustrated in FIG. 24, the occupation ratio of the significant area 341 within the central field of vision becomes considerably large, in which condition the significant area 341 protrudes from the central field of vision. However, the significant area 341 of the input image 273 reduced at a scaling ratio smaller than 1 becomes a significant area 342 which falls within the central field of vision. As a result, visibility of the significant area improves.

Accordingly, the parameter determination unit 213 sets the scaling ratio as a parameter to a value smaller than 1 such that the significant area 341 falls within the central field of vision and has at least an occupation ratio of a threshold in the central field of vision. As a result, the synthesis image becomes smaller, whereby the significant area 341 within the pseudo image is reduced to the significant area 342. Accordingly, visibility of the significant area improves.

Note that, according to the example illustrated in FIG. 24, the significant area 342 is shown in front of the significant area 341 for easy understanding in the figure. In a practical situation, however, the significant area 341 and the significant area 342 are located at the same position in the depth direction.

The pseudo image generation unit 16 may immediately change the scaling ratio to the value of the parameter, or gradually change the scaling ratio from 1 to the value of the parameter. For gradually changing the scaling ratio, the pseudo image generation unit 16 may generate, as a pseudo image, a predicted value of an image captured by zoom-out (wide) imaging of a subject in a synthesis image on the basis of the changed scaling ratio and a synthesis depth image.

In case of the structure which generates a pseudo image on the basis of a scaling model as described above, the pseudo image generation unit 16 additionally includes an adjustment unit between the transformation unit 311 and the cutout unit 312. The adjustment unit adjusts a depth of field of the pseudo image by using a pseudo image supplied from the transformation unit 311, a synthesis depth image output from the synthesis unit 13, and parameters supplied from the determination unit 15.

More specifically, the adjustment unit performs a smoothing process for pixel values located in areas on the front side and the inner side of a significant area of the pseudo image when a scaling ratio as a parameter is larger than 1. As a result, a depth of a subject in the pseudo image decreases with the significant area in focus. In this case, defocusing occurs in areas other than the significant area.

In addition, when the scaling ratio as a parameter is smaller than 1, the adjustment unit performs a deblur process such as a super-resolution process and a high-band emphasis process for blur areas out of focus. As a result, the depth of the subject of the pseudo image increases. The pseudo image after adjustment of the depth of field by the adjustment unit is supplied to the cutout unit 312.

(Fifth Example of Parameter Determination Method)

Figure 25A:
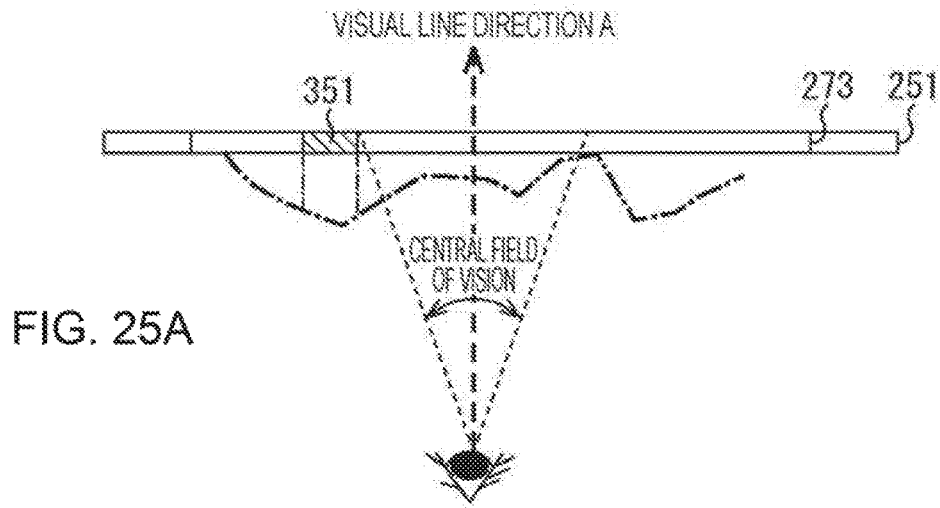
FIG. 25A and FIG. 25B are views illustrating a fifth example of the parameter determination method.
Figure 25B:
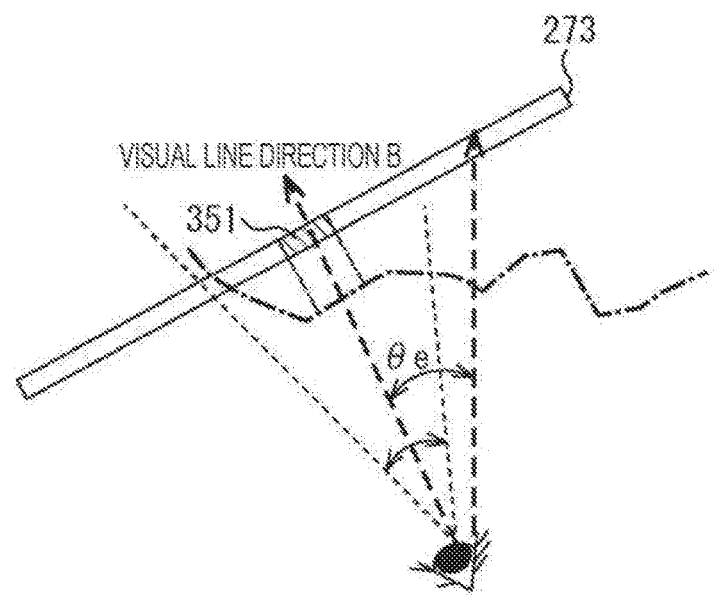

FIGS. 25A-25B are views illustrating a fifth example of the parameter determination method.

According to the example illustrated in FIGS. 25A-25B, a pseudo image is generated on the basis of a perspective transformation model generated in consideration of a visual line direction. In case of the perspective transformation model in consideration of the visual line direction, the position Depth(xp) in the depth direction indicated by an alternate long and short dash line illustrated in FIGS. 25A-25B are calculated by using Mathematical Formula (6) discussed above.

Thereafter, a three-dimensional position of a subject at the position Depth(xp) in the depth direction is transformed into a two-dimensional position by perspective transformation with a center axis located on the visual line direction to calculate a difference between the position xp and the display position of the subject at the position Depth(xp) in the depth direction displayed on the display 251 in the horizontal direction. More specifically, this difference is calculated by using the position Depth(xp) in the depth direction, the position xp, the position of a virtual viewpoint in the horizontal direction, a virtual view distance, and an angle θe in the visual line direction.

Note that the angle θe in the visual line direction in this context is an angle formed by the visual line direction and a line connecting the virtual viewpoint and the center of the display 251 on the assumption that the positions of the virtual viewpoint in the horizontal direction and in the vertical direction coincide with the center of the display 251.

According to the perspective transformation model in consideration of the visual line direction, the display position of the input image in the horizontal direction is changeable by changing the angle θe in the visual line direction. Accordingly, the parameter determination unit 213 determines the angle θe in the visual line direction as a parameter such that the significant area of the input image falls within the central field of vision of the viewer.

When a significant area 351 is present at an end of the input image 273 as illustrated in FIG. 25A, the significant area 351 is positioned out of the central field of vision at the angle θe set to 0 in the visual line direction, for example.

However, when the angle θe is larger than 0 in the visual line direction, for example, the position of the significant area 351 within the input image 273 shifts to a position close to the center, in which condition the significant area 351 falls within the central field of vision.

Accordingly, the parameter determination unit 213 sets the angle θe in the visual line direction as a parameter to a value larger than 0 such that the significant area 351 falls within the central field of vision. As a result, visibility of a significant area in a pseudo image improves.

The pseudo image generation unit 16 may immediately change the angle θe in the visual line direction to the value of the parameter, or gradually change the angle θe in the visual line direction from 0 to the value of the parameter. For gradually changing the angle θe in the visual line direction, the pseudo image generation unit 16 may generate, as a pseudo image, a predicted value of an image captured by panning (tilt) imaging of a subject in a synthesis image (imaging while horizontally (vertically) rotating camera to subject) on the basis of the changed angle θe in the visual line direction and a synthesis depth image.

Second Embodiment (Configuration Example of Image Processing Apparatus in Second Embodiment)

Figure 26:
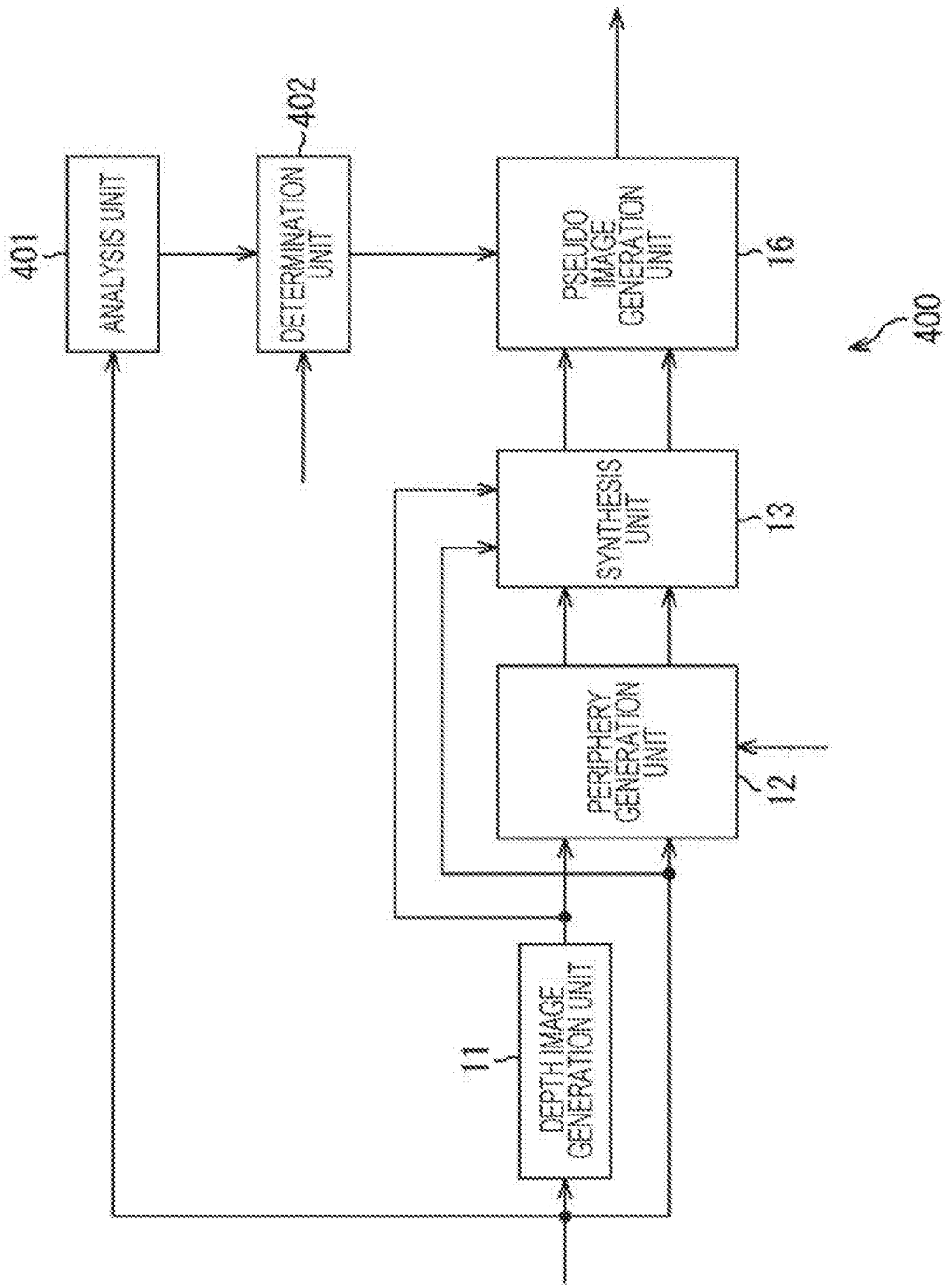
FIG. 26 is a block diagram illustrating a configuration example of an image processing apparatus according to a second embodiment of the present disclosure.

FIG. 26 is a block diagram illustrating a configuration example of an image processing apparatus according to a second embodiment of the present disclosure.

In the configuration illustrated in FIG. 26, parts similar to the corresponding parts in FIG. 1 have been given similar reference numbers. Similar explanation of these parts is omitted where appropriate.

A configuration of an image processing apparatus 400 illustrated in FIG. 26 is different from the configuration of the image processing apparatus 10 illustrated in FIG. 1 in that an analysis unit 401 is provided in place of the analysis unit 14, and that a determination unit 402 is provided in place of the determination unit 15. The image processing apparatus 400 determines parameters not on the basis of significant area information, but on the basis of a camera angle at the time of imaging of an input image.

The analysis unit 401 estimates a camera angle at the time of imaging on the basis of the input image. The analysis unit 401 supplies camera angle image estimation information indicating the estimated camera angle to the determination unit 402.

The determination unit 402 determines camera angle information indicating a final estimated value of the camera angle on the basis of sensor information detected by a build-in sensor and received from a camera having captured the input image, and the camera angle image estimation information supplied from the analysis unit 401. The determination unit 402 determines parameters on the basis of the camera angle information, and supplies the determined parameters to the pseudo image generation unit 16.

Note that the parameters are determined both in the horizontal direction and the vertical direction. However, it is assumed hereinbelow that only the parameters in the vertical direction are determined for easy understanding of the explanation. The parameters in the horizontal direction are determined in a manner similar to determination of the parameters in the vertical direction.

(Configuration Example of Analysis Unit)

Figure 27:
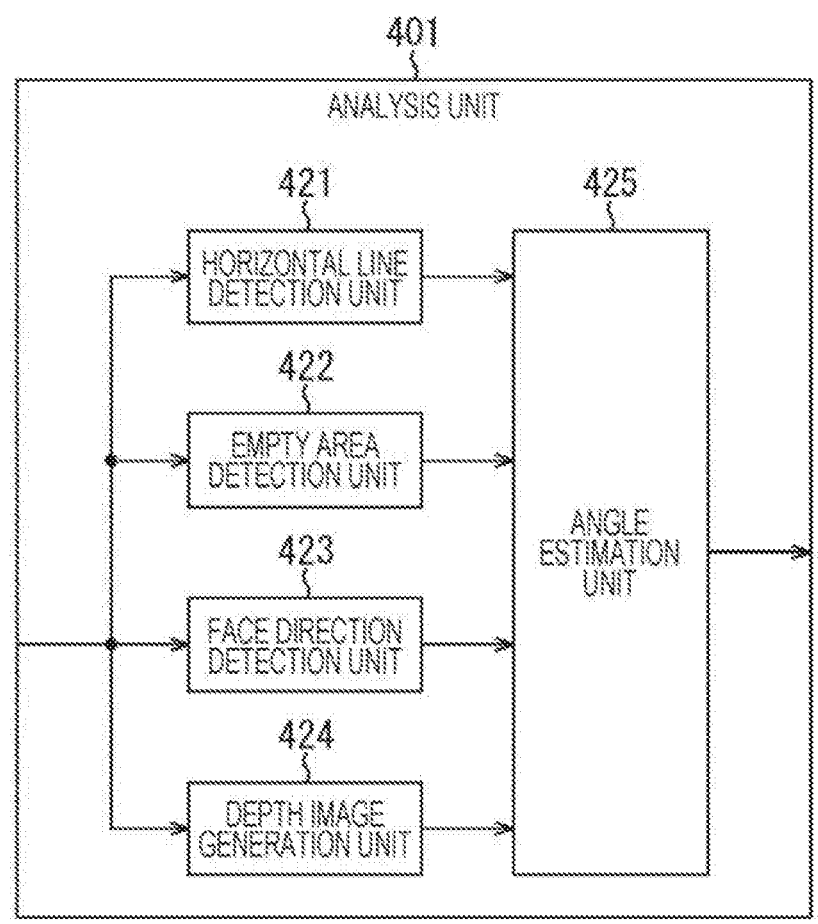
FIG. 27 is a block diagram illustrating a configuration example of an analysis unit in FIG. 26.

FIG. 27 is a block diagram illustrating a configuration example of the analysis unit 401 in FIG. 26.

The analysis unit 401 illustrated in FIG. 26 is constituted by a horizontal line detection unit 421, an empty area detection unit 422, a face direction detection unit 423, a depth image generation unit 424, and an angle estimation unit 425.

The horizontal line detection unit 421 of the analysis unit 401 detects a horizontal line from an input image, and supplies the position of the horizontal line to the angle estimation unit 425. The empty area detection unit 422 detects an empty portion from the input image, and supplies the area of the empty portion to the angle estimation unit 425. The face direction detection unit 423 detects a face direction from the input image, and supplies the detected face direction to the angle estimation unit 425.

The depth image generation unit 424 generates a depth image from the input image. The depth image is generated by a method using information about positions of a vanishing point and a vanishing line or the like, for example. This method is described in "Low complexity 3D depth map generation for stereo applications", Cheng-An Chien, ICCE2011, for example. The depth image generation unit 424 supplies, to the angle estimation unit 425 as vanishing information, the information about the positions of the vanishing point and the vanishing line or the like used at the time of generation of the depth image.

The angle estimation unit 425 generates camera angle image estimation information on the basis of the position of the horizontal line received from the horizontal line detection unit 421, the area of the empty portion received from the empty area detection unit 422, the face direction received from the face direction detection unit 423, and the vanishing information received from the depth image generation unit 424, and supplies the generated camera angle image estimation information to the determination unit 402 illustrated in FIG. 26.

(Configuration Example of Angle Estimation Unit)

Figure 28:
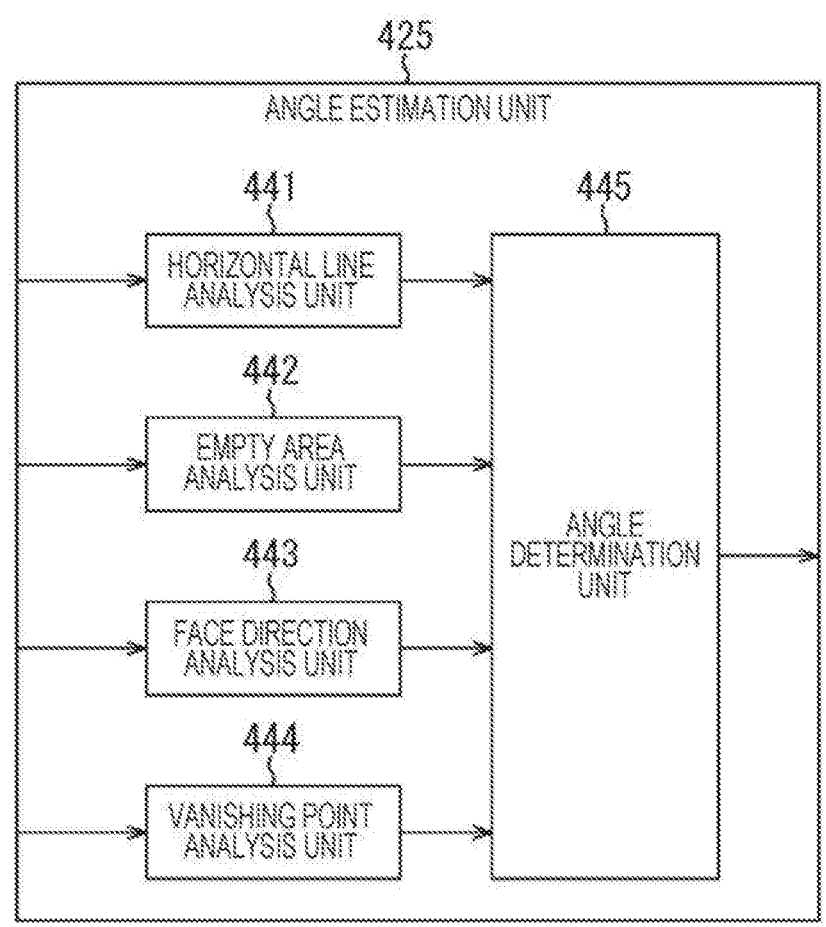
FIG. 28 is a block diagram illustrating a configuration example of an angle estimation unit in FIG. 27.

FIG. 28 is a block diagram illustrating a configuration example of the angle estimation unit 425 illustrated in FIG. 27.

The angle estimation unit 425 illustrated in FIG. 28 is constituted by a horizontal line analysis unit 441, an empty area analysis unit 442, a face direction analysis unit 443, a vanishing point analysis unit 444, and an angle determination unit 445.

The horizontal line analysis unit 441 of the angle estimation unit 425 determines a camera angle of an input image as an angle closer to an angle of tilt imaging as the position of the horizontal line received from the horizontal line detection unit 421 shifts downward in the screen. In this case, the horizontal line analysis unit 441 sets the position of the virtual viewpoint on the display in the vertical direction to a lower position.

On the other hand, the horizontal line analysis unit 441 determines the camera angle of the input image as an angle closer to an angle of high-angle imaging as the position of the horizontal line shifts upward in the screen. In this case, the horizontal line analysis unit 441 sets the position of the virtual viewpoint on the display in the vertical direction to an upper position. The horizontal line analysis unit 441 supplies horizontal line base virtual viewpoint information indicating the position of the set virtual viewpoint on the display in the vertical direction to the angle determination unit 445.

The empty area analysis unit 442 determines the camera angle of the input image as an angle closer to an angle of tilt imaging as the area of the empty portion supplied from the empty area detection unit 422 increases. In this case, the empty area analysis unit 442 sets the position of the virtual viewpoint on the display in the vertical direction to a lower position.

On the other hand, the empty area analysis unit 442 determines the camera angle of the input image as an angle closer to an angle of high-angle imaging as the area of the empty portion decreases. In this case, the empty area analysis unit 442 sets the position of the virtual viewpoint on the display in the vertical direction to an upper position. The empty area analysis unit 442 supplies empty area base virtual viewpoint information indicating the position of the set virtual viewpoint on the display in the vertical direction to the angle determination unit 445.

The face direction analysis unit 443 determines the camera angle of the input image as an angle closer to an angle of tilt imaging as the face direction supplied from the face direction detection unit 423 comes closer to the upward direction. In this case, the face direction analysis unit 443 sets the position of the virtual viewpoint on the display in the vertical direction to a lower position. On the other hand, the face direction analysis unit 443 determines the camera angle of the input image as an angle closer to an angle of high-angle imaging as the face direction comes closer to the downward direction. In this case, the face direction analysis unit 443 sets the position of the virtual viewpoint on the display in the vertical direction to an upper position. The face direction analysis unit 443 supplies face direction base virtual viewpoint information indicating the position of the set virtual viewpoint on the display in the vertical direction to the angle determination unit 445.

The vanishing point analysis unit 444 determines the camera angle of the input image as an angle closer to an angle of tilt imaging as the number of vanishing points on the lower side decreases on the basis of vanishing information supplied from the depth image generation unit 424. In this case, the vanishing point analysis unit 444 sets the position of the virtual viewpoint on the display in the vertical direction to a lower position. On the other hand, the vanishing point analysis unit 444 determines the camera angle of the input image as an angle closer to an angle of high-angle imaging as the number of vanishing points on the upper side decreases. In this case, the vanishing point analysis unit 444 sets the position of the virtual viewpoint on the display in the vertical direction to an upper position. The face direction analysis unit 443 supplies vanishing point base virtual viewpoint information indicating the position of the set virtual viewpoint on the display in the vertical direction to the angle determination unit 445.

The angle determination unit 445 calculates an estimated value of the position of a final virtual viewpoint on the display corresponding to the input image by using following Mathematical Formula (9) on the basis of the horizontal line base virtual viewpoint information, the empty area base virtual viewpoint information, the face direction base virtual viewpoint information, and the vanishing point base virtual viewpoint information.

[Mathematical Formula 9]

$$All\_xc = Wg \times G\_xc + Ws \times S\_xc + Wh \times H\_xc + Wv \times V\_xc$$

wherein $$Wg + Ws + Wh + Wv = 1.0 \qquad (9)$$

In Mathematical Formula (9), All_xc is an estimated value of the position of the final viewpoint on the display in the vertical direction corresponding to the input image. In addition, in Mathematical Formula (9), Wg, Ws, Wh, and Wv are weighting coefficients determined on the basis of likelihoods of the horizontal line, the empty portion, the face direction, and the vanishing point and the vanishing line detected by the analysis unit 401, for example. These likelihoods are determined by the analysis unit 401, and supplied to the determination unit 402.

In addition, in Mathematical Formula (9), G_xc is a position (coordinate of position) indicated by the horizontal line base virtual viewpoint information, while S_xc is a position (coordinate of position) indicated by the empty area base virtual viewpoint information. In Mathematical Formula (9), H_xc is a position (coordinate of position) indicated by the face direction base virtual viewpoint information, while V_xc is a position (coordinate of position) indicated by the vanishing point base virtual viewpoint information.

According to Mathematical Formula (9), the position All_xc is a weighted average of the positions (coordinates of positions) indicated by the horizontal line base virtual viewpoint information, the empty area base virtual viewpoint information, the face direction base virtual viewpoint information, and the vanishing point base virtual view information. The angle determination unit 445 supplies information indicating an estimated value of the position of the final virtual viewpoint on the display in the vertical direction based on the input image to the determination unit 402 illustrated in FIG. 26 as camera angle image estimation information.

(Description of Determination of Position of Virtual Viewpoint on Display in Vertical Direction Based on Vanishing Information)

Figure 29B:
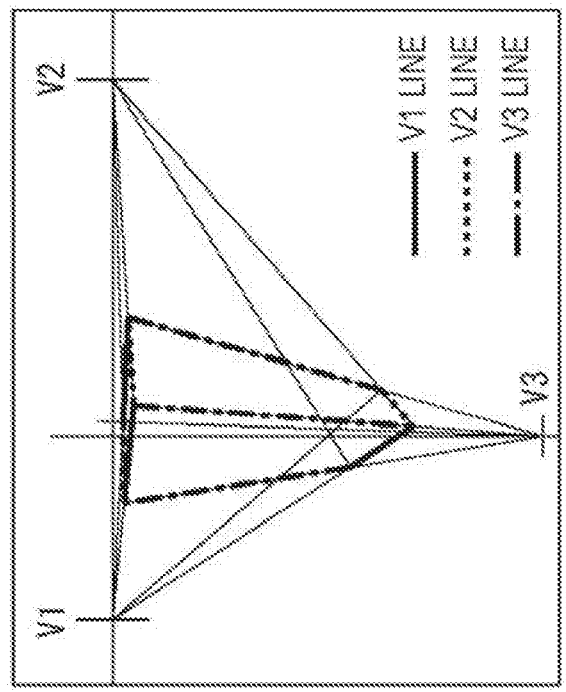
FIG. 29A and FIG. 29B are views illustrating determination of a position of a virtual viewpoint on a display in the vertical direction on the basis of vanishing information generated by a vanishing point analysis unit in FIG. 28.
Figure 29A:
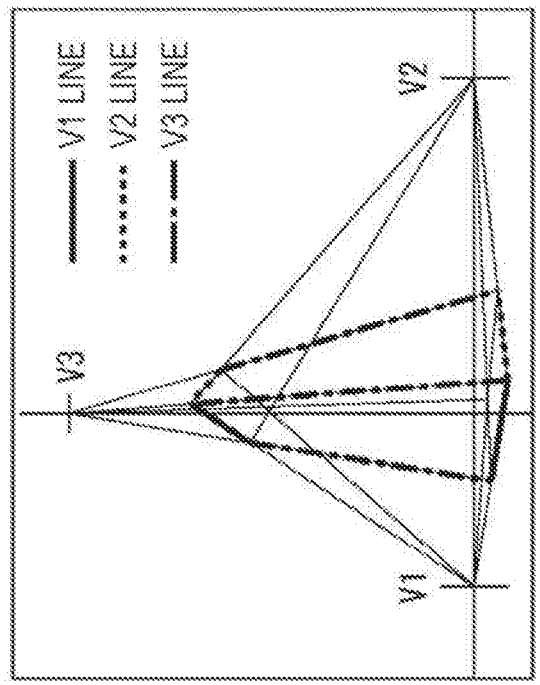

FIGS. 29A-29B are views illustrating determination of a position of a virtual viewpoint on the display in the vertical direction based on vanishing information supplied from the vanishing point analysis unit 444 illustrated in FIG. 28.

Note that, in FIGS. 29A-29B, V1 through V3 indicate positions of vanishing points within an input image.

According to a perspective composition in FIG. 29A, the positions V1 through V3 of the vanishing points are not present in a lower part of the input image. Accordingly, the vanishing point analysis unit 444 determines that the camera angle of the input image is an angle close to an angle of tilt imaging when the vanishing points indicated by the vanishing information are located at the positions V1 through V3 in FIG. 29A. In this case, the vanishing point analysis unit 444 sets the position of the virtual viewpoint on the display in the vertical direction to a lower position.

In addition, according to a perspective composition in FIG. 29B, the positions V1 through V3 of the vanishing points are not present in an upper part of the input image. Accordingly, the vanishing point analysis unit 444 determines that the camera angle of the input image is an angle close to an angle of high-angle imaging when the vanishing points indicated by the vanishing information are located at the positions V1 through V3 in FIG. 29B. In this case, the vanishing point analysis unit 444 sets the position of the virtual viewpoint on the display in the vertical direction to an upper position.

(Configuration Example of Determination Unit)

Figure 30:
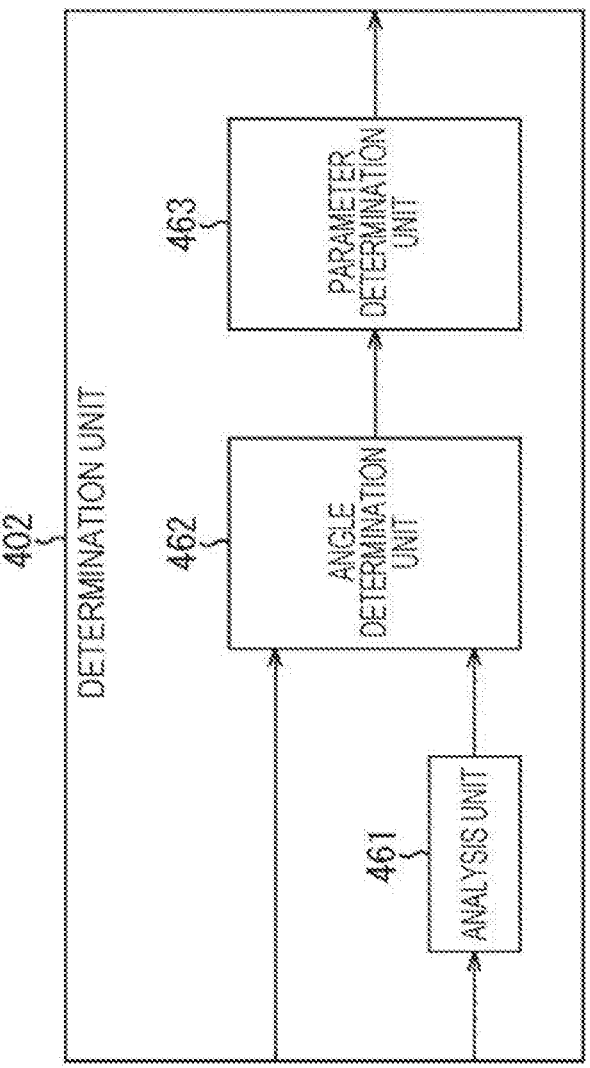
FIG. 30 is a block diagram illustrating a configuration example of a determination unit in FIG. 26.

FIG. 30 is a block diagram illustrating a configuration example of the determination unit 402 in FIG. 26.

The determination unit 402 illustrated in FIG. 30 is constituted by an analysis unit 461, an angle determination unit 462, and a parameter determination unit 463.

The analysis unit 461 of the determination unit 402 receives sensor information detected by a Global Positioning System (GPS), a gyro sensor or the like contained in a camera which captures an input image. The analysis unit 461 estimates the position of a virtual viewpoint on the display in the vertical direction as information indicating a camera angle on the basis of the received sensor information, and supplies camera angle sensor estimation information indicating the estimated position to the angle determination unit 462.

The angle determination unit 462 determines camera angle information by using following Mathematical Formula (10) on the basis of the camera angle image estimation information supplied from the angle determination unit 445 illustrated in FIG. 28, and the camera angle sensor estimation information supplied from the analysis unit 461.

[Mathematical Formula 10]

$$\text{Final}\_xc = W\_\text{all} \times \text{All}\_xc + (1.0 - W\_\text{all}) \times \text{Sensor}\_xc \quad (10)$$

In Mathematical Formula (10), Final_xc is a position indicated by the camera angle information. In addition, in Mathematical Formula (10), W_all is a weighting coefficient as a value determined in a range from 0 to 1. In Mathematical Formula (10), All_xc is a position indicated by the camera angle image estimation information, while Sensor_xc is a position indicated by the camera angle sensor estimation information. The angle determination unit 462 supplies the camera angle information to the parameter determination unit 463.

The parameter determination unit 463 supplies the position indicated by the camera angle information as a parameter to the pseudo image generation unit 16 illustrated in FIG. 26.

This parameter is used for generation of a pseudo image by the pseudo image generation unit 16. More specifically, the pseudo image generation unit 16 generates a difference between a position yp and a display position of an image of a subject at a position Depth(yp) in the depth direction displayed on the display in the vertical direction by using Mathematical Formulae (6) and (7) discussed above in which the direction is set to the vertical direction in place of the horizontal direction, on the assumption that the position of a pixel in the input image on the display in the vertical direction is the position yp. Thereafter, the pseudo image generation unit 16 positions pixel values of respective pixels in a synthesis image with shifts in accordance with the differences to generate, as a pseudo image, a predicted value of an image of a subject in the synthesis image captured at a position upper or lower than the imaging position of the input image.

(Explanation of Process by Image Processing Apparatus)

Figure 31:
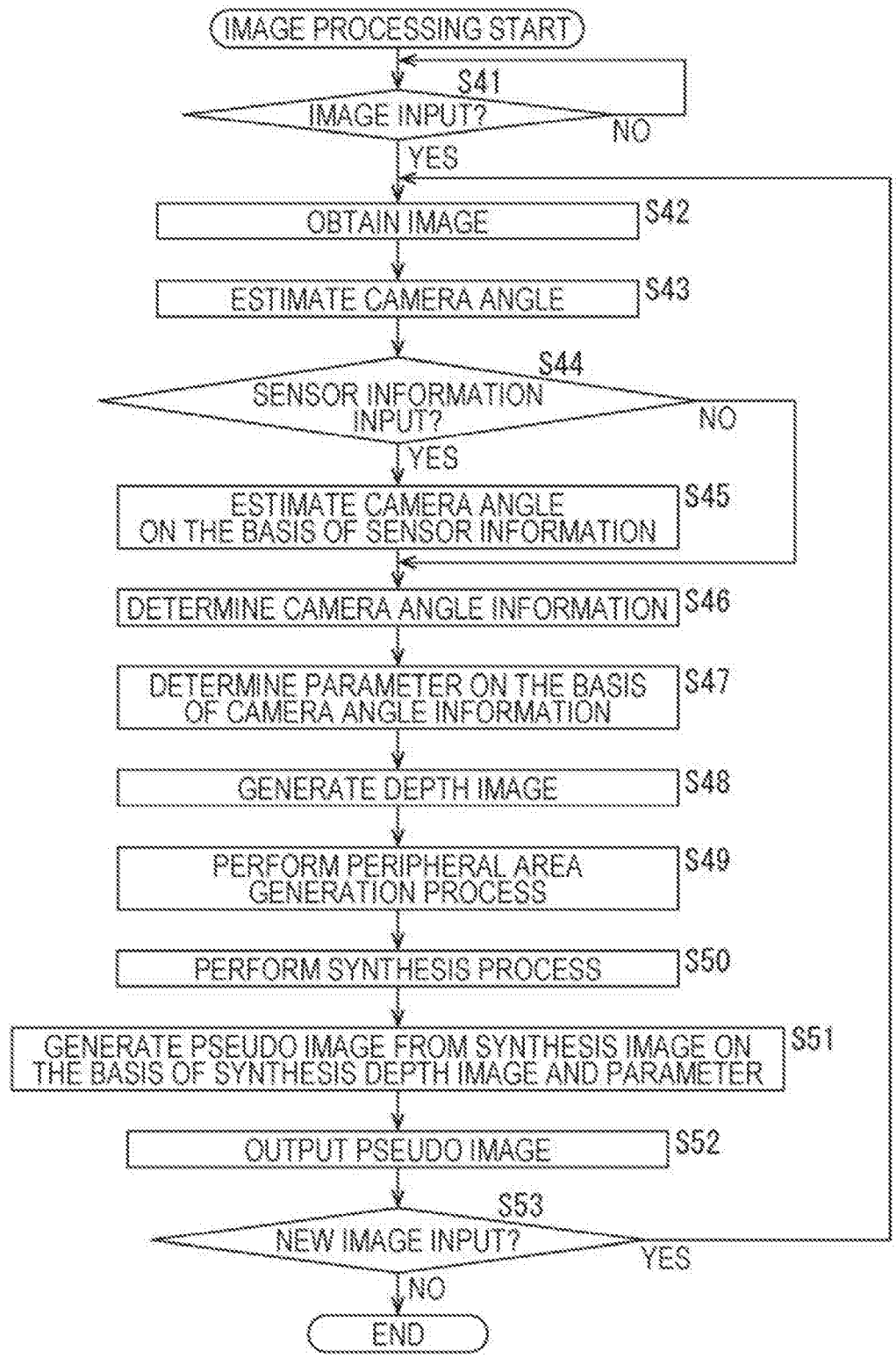
FIG. 31 is a flowchart showing a process performed by the image processing apparatus in FIG. 26.

FIG. 31 is a flowchart showing a process performed by the image processing apparatus 400 illustrated in FIG. 26.

Processing in steps S41 and S42 in FIG. 31 is similar to the processing in steps S11 and S12 in FIG. 22, and therefore is not repeatedly explained herein.

In step S43, the analysis unit 401 estimates a camera angle at the time of imaging of an input image on the basis of the input image. The analysis unit 401 supplies camera angle image estimation information indicating the estimated camera angle to the determination unit 402.

In step S44, the determination unit 402 determines whether or not sensor information has been input from the outside. When it is determined in step S44 that sensor information has been input from the outside, the process proceeds to step S45.

In step S45, the analysis unit 461 of the determination unit 402 (FIG. 30) estimates a camera angle on the basis of the sensor information input from the outside. The analysis unit 461 supplies camera angle sensor estimation information indicating the estimated camera angle to the angle determination unit 462, whereafter the process proceeds to step S46.

When it is determined in step S44 that no sensor information has been input from the outside, the process proceeds to step S46.

In step S46, the angle determination unit 462 determines camera angle information by using Mathematical Formula (10) discussed above on the basis of the camera angle image estimation information supplied form the analysis unit 401 and the camera angle sensor estimation information supplied from the analysis unit 461. The angle determination unit 462 supplies the camera angle information to the parameter determination unit 463.

In step S47, the parameter determination unit 463 determines the position indicated by the camera angle information as a parameter on the basis of the camera angle information supplied from the angle determination unit 462. The parameter determination unit 463 supplies the determined parameter to the pseudo image generation unit 16.

Processing from steps S48 to S53 is similar to the processing from step S18 to S23 in FIG. 22, and therefore is not repeatedly explained herein.

As described above, the image processing apparatus 400 generates a pseudo image by further shifting a virtual viewpoint of an input image from a central position on the basis of camera angle information about the input image. Accordingly, the composition of the camera angle is more emphasized than in the input image, wherefore the intention of a person taking the input image is more easily recognizable.

Third Embodiment (Configuration Example of Image Processing Apparatus in Third Embodiment)

Figure 32:
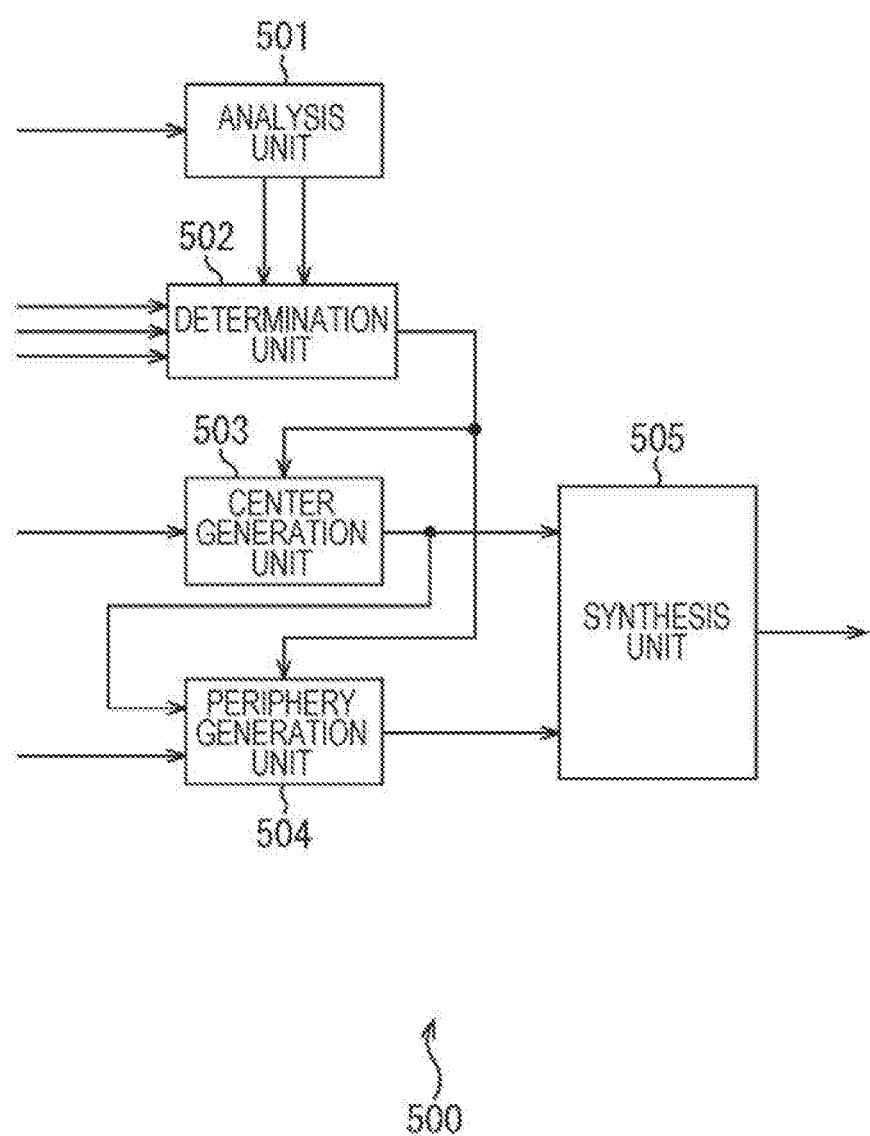
FIG. 32 is a block diagram illustrating a configuration example of an image processing apparatus according to a third embodiment of the present disclosure.

FIG. 32 is a block diagram illustrating a configuration example of an image processing apparatus according to a third embodiment of the present disclosure.

An image processing apparatus 500 illustrated in FIG. 32 is constituted by an analysis unit 501, a determination unit 502, a center generation unit 503, a periphery generation unit 504, and a synthesis unit 505. The image processing apparatus 500 obtains an image sized in correspondence with characteristics of an input image, positions the image in a predetermined area of a screen (hereinafter referred to as screen central area), and extrapolates a peripheral area around the screen central area (hereinafter referred to as screen peripheral area) to generate a wide-field image.

More specifically, the analysis unit 501 of the image processing apparatus 500 extracts a predetermined area from the input image as characteristics of the input image on the basis of information about the input image. The analysis unit 501 generates a significance map on the basis of the extracted predetermined area, and estimates an imaging angle of view. The analysis unit 501 supplies the significance map and the imaging angle of view to the determination unit 502.

The determination unit 502 determines a final significance map on the basis of a significance map attribute signal input from the outside, and the significance map supplied from the analysis unit 501. In addition, the determination unit 502 further determines a final imaging angle of view on the basis of an imaging angle of view attribute signal, and the imaging angle of view supplied from the analysis unit 501.

The determination unit 502 determines a screen central area on the basis of the final significance map, the imaging angle of view, and view environment information corresponding to information about a view environment input from the outside. The view environment information in this context includes an actual view distance set by an external sensor or user input, and indicating a distance between an actual viewpoint and a display showing a wide-field image, and the size of the display, for example. The determination unit 502 supplies screen central area information for specifying the position and the size of the screen central area to the center generation unit 503 and the periphery generation unit 504.

The center generation unit 503 scales the input image such that the size of the input image is equalized with the size of the screen central area specified on the basis of the screen central area information supplied from the determination unit 502 to generate an image of the screen central area. The center generation unit 503 supplies the generated image of the screen central area to the synthesis unit 505 and the periphery generation unit 504.

The periphery generation unit 504 determines a screen peripheral area which lies around the screen central area specified on the basis of the screen central area information, and has an inside portion overlapping with the screen central area on the basis of the screen central area information supplied from the determination unit 502. The periphery generation unit 504 extrapolates an image of the screen peripheral area by using the image of the screen central area supplied from the center generation unit 503 and an image input from the outside, and supplies the image of the screen peripheral area to the synthesis unit 505.

The synthesis unit 505 synthesizes the image of the screen central area received from the center generation unit 503 and the image of the screen peripheral area received from the periphery generation unit 504, and outputs a synthesis image thus generated as a wide-field image.

Note that the imaging angle of view is determined both in the horizontal direction and in the vertical direction. However, for easy understanding of the explanation, it is assumed herein that only the imaging angle of view in the horizontal direction is determined. The imaging angle of view in the vertical direction is determined in a manner similar to determination of the imaging angle of view in the horizontal direction.

(Configuration Example of Analysis Unit)

Figure 33:
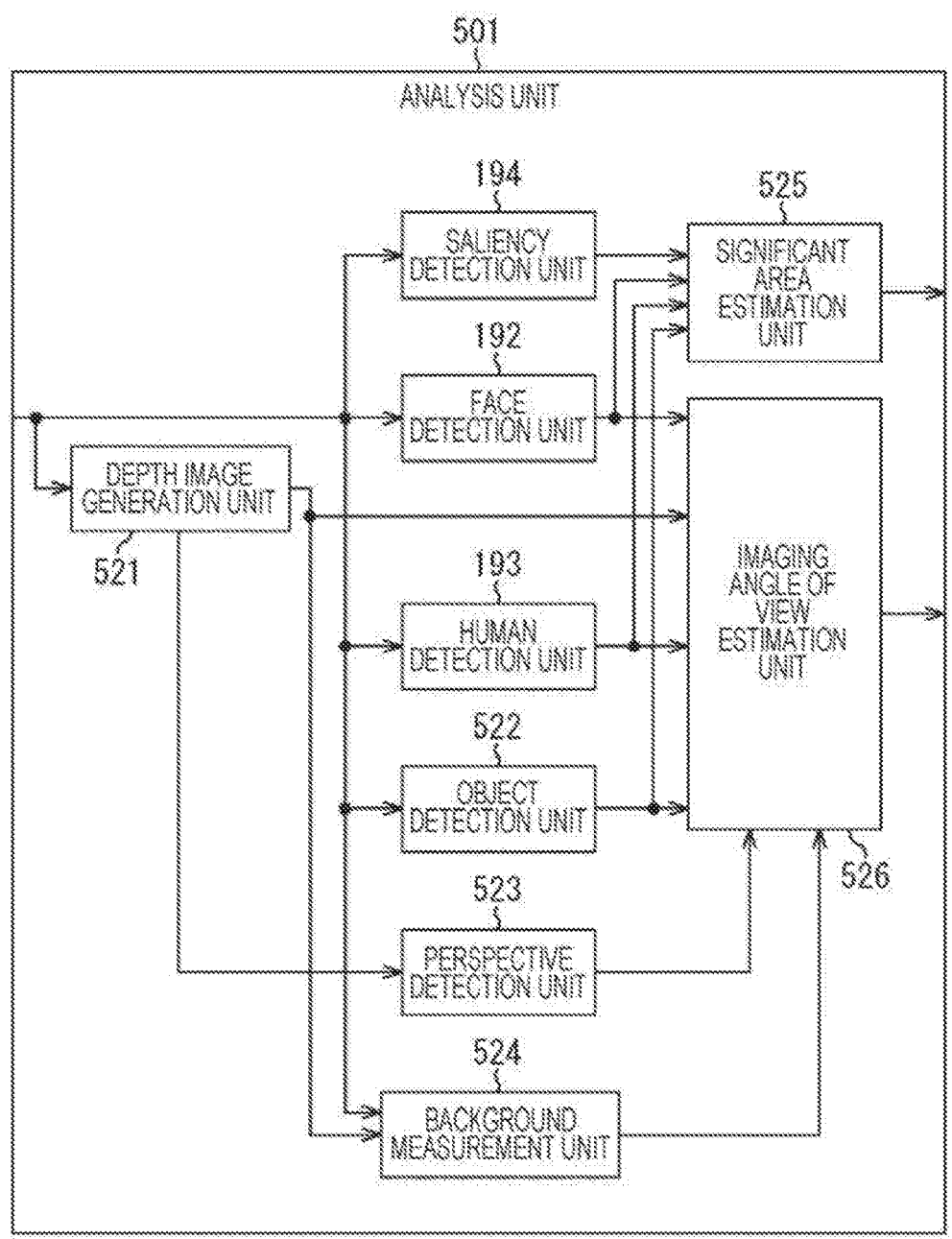
FIG. 33 is a block diagram illustrating a configuration example of an analysis unit in FIG. 32.

FIG. 33 is a block diagram illustrating a configuration example of the analysis unit 501 in FIG. 32.

In the configuration illustrated in FIG. 33, parts similar to the corresponding parts in FIG. 12 have been given similar reference numbers. Similar explanation of these parts is omitted where appropriate.

The analysis unit 501 illustrated in FIG. 32 is constituted by the face detection unit 192, the human detection unit 193, the saliency detection unit 194, a depth image generation unit 521, an object detection unit 522, a perspective detection unit 523, a background measurement unit 524, a significant area estimation unit 525, and an imaging angle of view estimation unit 526.

The depth image generation unit 521 generates a depth image from an input image by using a method which utilizes information about positions of vanishing points and vanishing lines or the like, and supplies the generated depth image to the background measurement unit 524 and the imaging angle of view estimation unit 526. In addition, the depth image generation unit 521 further supplies the information about positions of vanishing points and vanishing lines or the like to the perspective detection unit 523 as vanishing information.

The object detection unit 522 performs an object recognition process to extract various types of objects (objects) from the input image. The object detection unit 522 determines likelihoods of objects such that the likelihoods increase as size correlations between the respective objects become closer to assumed correlations between these objects.

For example, the object detection unit 522 sets relatively large values of likelihoods for a dog or cat and a human extracted as objects when the size of the dog or cat is smaller than the size of the human. On the other hand, the object detection unit 522 sets relatively large values of likelihoods for building, wood, or mountain and human extracted as objects when the size of the building, wood, or mountain is larger than the size of the human.

The object detection unit 522 generates an image containing pixel values of pixels indicating likelihoods of objects in a range from 0 to 255 as an object map for each object. It is assumed herein that the likelihoods of the objects increase as the pixel values on the object map increase. The object detection unit 522 supplies the generated object map to the significant area estimation unit 525 and the imaging angle of view estimation unit 526.

The perspective detection unit 523 generates perspective intensity on the basis of the vanishing information supplied from the depth image generation unit 521. More specifically, the perspective detection unit 523 classifies vanishing points and vanishing lines into types of one-point perspective, two-point perspective, and three-point perspective on the basis of the vanishing information. Thereafter, the perspective detection unit 523 determines perspective intensity for each type such that perspective intensity of a vanishing point located closer to the center of the screen becomes larger. In this case, vanishing points located away from the center of the screen, such as vanishing points located out of the screen have lower perspective intensity. The perspective detection unit 523 supplies the generated perspective intensity to the imaging angle of view estimation unit 526.

The background measurement unit 524 determines an area of pixels located on the inner side in the depth direction of the subject as a background area on the basis of the depth image supplied from the depth image generation unit 521. The background measurement unit 524 determines whether or not band distribution of the background area of the input image reaches a high band. For example, the background measurement unit 524 determines whether or not the background area of the input image indicates an image containing a relatively up-converted high-band signal. Details of this determination method are described in JP 5056242 B1, for example.

Note that the background measurement unit 524 may determine whether or not band distribution of the background area of the input image reaches a high band by determining whether or not a coefficient of a high band is contained by using frequency transform such as Fourier transform. The background measurement unit 524 generates a background portion definition signal which indicates a high-band level in the band distribution in accordance with the determination result, and supplies the background portion definition signal to the imaging angle of view estimation unit 526.

The significant area estimation unit 525 generates a significance map on the basis of the face map received from the face detection unit 192, the human map received from the human detection unit 193, the subject map received from the saliency detection unit 194, and the object map received from the object detection unit 522. The significance map is generated by a method similar to the generation method employed by the estimation unit 195 illustrated in FIG. 12 except for the point that the object map is used instead of the caption/telop map. The significant area estimation unit 525 supplies the generated significance map to the determination unit 502 illustrated in FIG. 32.

The imaging angle of view estimation unit 526 estimates an imaging angle of view by using the depth image, the face map, the human map, the object map, the perspective intensity, and the background portion definition signal. The imaging angle of view estimation unit 526 supplies the estimated imaging angle of view to the determination unit 502.

(Configuration Example of Imaging Angle of View Estimation Unit)

Figure 34:
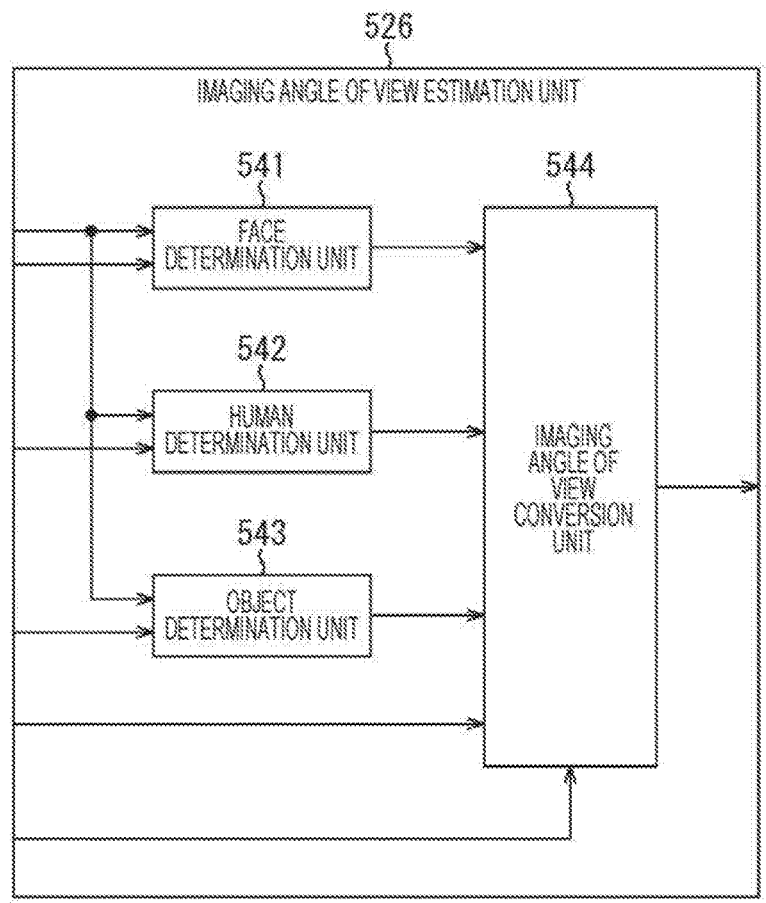
FIG. 34 is a block diagram illustrating a configuration example of an imaging angle of view estimation unit in FIG. 33.

FIG. 34 is a block diagram illustrating a configuration example of the imaging angle of view estimation unit 526 in FIG. 33.

The imaging angle of view estimation unit 526 illustrated in FIG. 34 is constituted by a face determination unit 541, a human determination unit 542, an object determination unit 543, and an imaging angle of view conversion unit 544.

The face determination unit 541 of the imaging angle of view estimation unit 526 extracts pixel values of a face area of a depth image supplied from the depth image generation unit 521 on the basis of the face map supplied from the face detection unit 192 illustrated in FIG. 33. The face determination unit 541 compares a threshold corresponding to the extracted pixel values of the face area of the depth image with the size of the face area to determine perspective intensity of the face area. The face determination unit 541 supplies the determined perspective intensity to the imaging angle of view conversion unit 544 as face base perspective intensity.

The human determination unit 542 extracts pixel values of a human area of the depth image supplied from the depth image generation unit 521 on the basis of the human map supplied from the human detection unit 193. The human determination unit 542 compares a threshold corresponding to the extracted pixel values of the human area of the depth image with the size of the human area to determine perspective intensity of the human area. The human determination unit 542 supplies the determined perspective intensity to the imaging angle of view conversion unit 544 as human base perspective intensity.

The object determination unit 543 extracts pixel values of an object area of the depth image supplied from the depth image generation unit 521 for each object on the basis of the object map supplied from the saliency detection unit 194. The object determination unit 543 compares a threshold corresponding to the extracted pixel values of the object area of the depth image with the size of the object area for each object to determine perspective intensity of the object area. The object determination unit 543 supplies the determined perspective intensity as object base perspective intensity for each object to the imaging angle of view conversion unit 544.

The imaging angle of view conversion unit 544 calculates total perspective intensity by using following Mathematical Formula (11) on the basis of the face base perspective intensity received from the face determination unit 541, the human base perspective intensity received from the human determination unit 542, the object base perspective intensity received from the object determination unit 543, and the perspective intensity received from the perspective detection unit 523.

$$\text{All\_Pers} = Wf \times F\_\text{Pers} + Wh \times H\_\text{pers} + Wo \times O\_\text{Pers} + Wv \times V\_\text{Pers} \quad \text{[Mathematical Formula 11]}$$

wherein $$Wf + Wh + Wo + Wv = 1.0 \quad (11)$$

In Mathematical Formula (11), All_Pers indicates total perspective intensity, F_Pers indicates face base perspective intensity, and H_Pers indicates human base perspective intensity. In addition, in Mathematical Formula (11), O_Pers indicates object base perspective intensity for each object, while V_Pers indicates perspective intensity. Furthermore, in Mathematical Formula (11), Wf, Wh, Wo, and Wv are weighting coefficients. The weighting coefficients Wf, Wh, and Wo are determined on the basis of likelihoods of corresponding areas (face area, human area, and object area) in accordance with the number of the areas and the pixel values in the maps (face map, human map, and object map), for example. In addition, the weighting coefficient Wv is determined on the basis of the number of vanishing points or vanishing lines indicated by vanishing information, for example.

In Mathematical Formula (11), the total perspective intensity is a weighted average of the face base perspective intensity, the human base perspective intensity, the object base perspective intensity, and the perspective intensity.

In addition, the imaging angle of view conversion unit 544 estimates an imaging angle of view on the basis of the total perspective intensity, and determines the estimated imaging angle of view as perspective intensity base imaging angle of view. In addition, the imaging angle of view conversion unit 544 further estimates an imaging angle of view on the basis of a background portion definition signal supplied from the background measurement unit 524 illustrated in FIG. 33, and determines the estimated imaging angle of view as a depth of field base imaging angle of view.

Thereafter, the imaging angle of view conversion unit 544 determines a final estimated value of the imaging angle of view corresponding to the characteristics of the input image by using following Mathematical Formula (12) on the basis of the perspective intensity base imaging angle of view and the depth of field base imaging angle of view.

[Mathematical Formula 12]

$$\text{Est\_angle} = Wp \times P\_\text{angle} + Wb \times B\_\text{angle}$$

wherein $$Wp + Wb = 1.0 \quad (12)$$

In Mathematical Formula (12), Est_angle is a final estimated value of the imaging angle of view corresponding to the characteristics of the input image, P_angle is a perspective intensity base imaging angle of view, and B_angle is a depth of field base imaging angle of view. In addition, in Mathematical Formula (12), Wp and Wb are weighting coefficients.

According to Mathematical Formula (12), the final estimated value of the imaging angle of view corresponding to the characteristics of the input image is a weighted average of the perspective intensity base imaging angle of view and the depth of field base imaging angle of view. The imaging angle of view conversion unit 544 supplies the determined imaging angle of view (final estimated value of imaging angle of view corresponding to characteristics of input image) to the determination unit 502 illustrated in FIG. 32.

(Description of Face Base Perspective Intensity)

Figure 35:
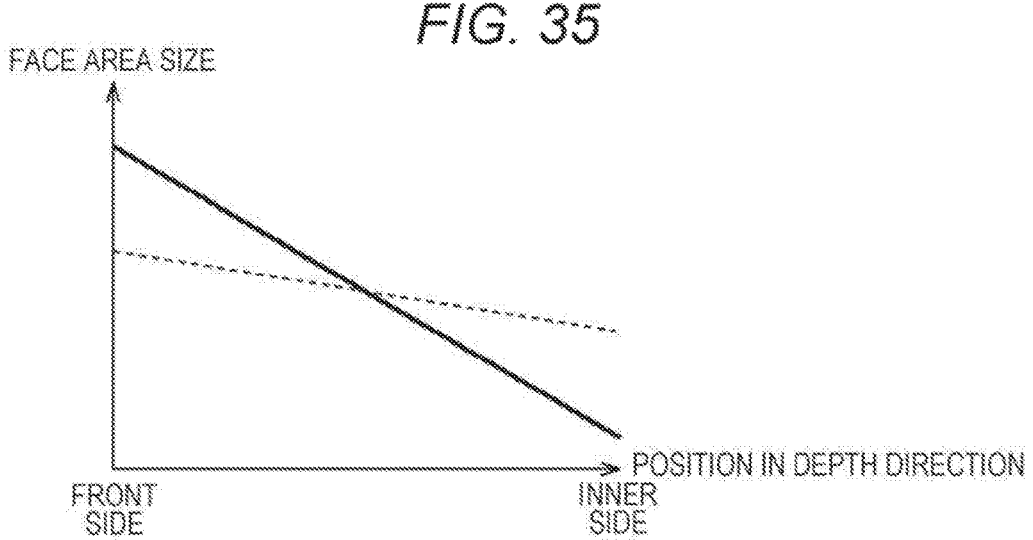
FIG. 35 is a view illustrating face base perspective intensity.

FIG. 35 is a view illustrating face base perspective intensity.

In FIG. 35, a horizontal axis represents a position of a subject indicated by pixel values of a face area in a depth image in the depth direction, while a vertical axis represents a size of the face area.

The face determination unit 541 determines face base perspective intensity on the basis of a threshold which decreases with predetermined inclination as the position of the face area in the depth direction shifts inward, such that face base perspective intensity increases as the position of the face area in the depth direction becomes smaller than the threshold, and decreases as the position of the face area becomes larger than the threshold, on the assumption that the position of the face area in the depth direction is located on the inner side. On the other hand, the face determination unit 541 determines face base perspective intensity such that face base perspective intensity increases as the position of the face area in the depth direction becomes larger than the threshold, and decreases as the position of the face area in the depth direction becomes smaller than the threshold, on the assumption that the position of the face area in the depth direction is located on the front side.

Accordingly, when face base perspective intensity is high, a line showing the relationship between the position of the face area in the depth direction and the size of the face area has relatively large inclination as indicated by a solid line in FIG. 35, for example. In addition, when face base perspective intensity is low, a line showing the relationship between the position of the face area in the depth direction and the size of the face area has relatively small inclination as indicated by a dotted line in FIG. 35, for example.

The difference between the sizes of the faces located on the front side and the face located on the inner side increases as the imaging angle of view increases. In other words, the inclination of the line showing the relationship between the position of the face area in the depth direction and the size of the face area increases as the imaging angle of view increases. According to the determination of face base perspective intensity as discussed above, the face base perspective intensity increases as the angle for imaging the face area of the input image becomes wider.

(Description of Human Base Perspective Intensity)

Figure 36:
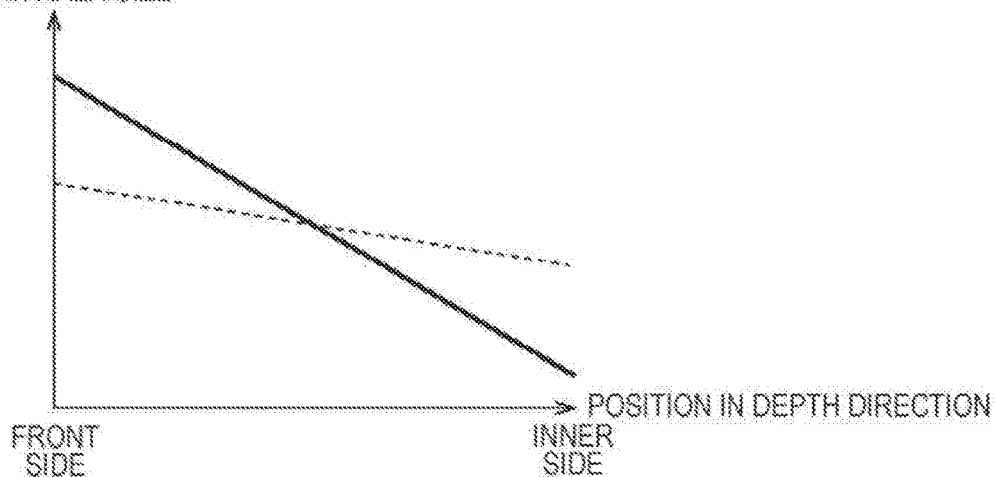
FIG. 36 is a view illustrating human base perspective intensity.

FIG. 36 is a view illustrating human base perspective intensity.

In FIG. 36, a horizontal axis represents a position of a subject indicated by pixel values of a human area in a depth image in the depth direction, while a vertical axis represents a size of the human area.

The human determination unit 542 determines human base perspective intensity on the basis of a threshold which decreases with predetermined inclination as the position of the human area in the depth direction shifts inward, such that human base perspective intensity increases as the position of the human area in the depth direction becomes smaller than the threshold, and decreases as the position of the human area becomes larger than the threshold, on the assumption that the position of the human area in the depth direction is located on the inner side. On the other hand, the human determination unit 542 determines human base perspective intensity such that human base perspective intensity increases as the position of the human area in the depth direction becomes larger than the threshold, and decreases as the position of the human area in the depth direction becomes smaller than the threshold, on the assumption that the position of the human area in the depth direction is located on the front side.

Accordingly, when human base perspective intensity is high, a line showing the relationship between the position of the human area in the depth direction and the size of the human area has relatively large inclination as indicated by a solid line in FIG. 36, for example. In addition, when human base perspective intensity is low, a line showing the relationship between the position of the human area in the depth direction and the size of the human area has a relatively small inclination as indicated by a dotted line in FIG. 36, for example.

The difference between the sizes of the human located on the front side and the human located on the inner side increases as the imaging angle of view increases. In other words, the inclination of the line showing the relationship between the position of the human area in the depth direction and the size of the human area increases as the imaging angle of view increases. According to the determination of human base perspective intensity as discussed above, the human base perspective intensity increases as the angle for imaging the human area of the input image becomes wider.

(Description of Object Base Perspective Intensity)

Figure 37:
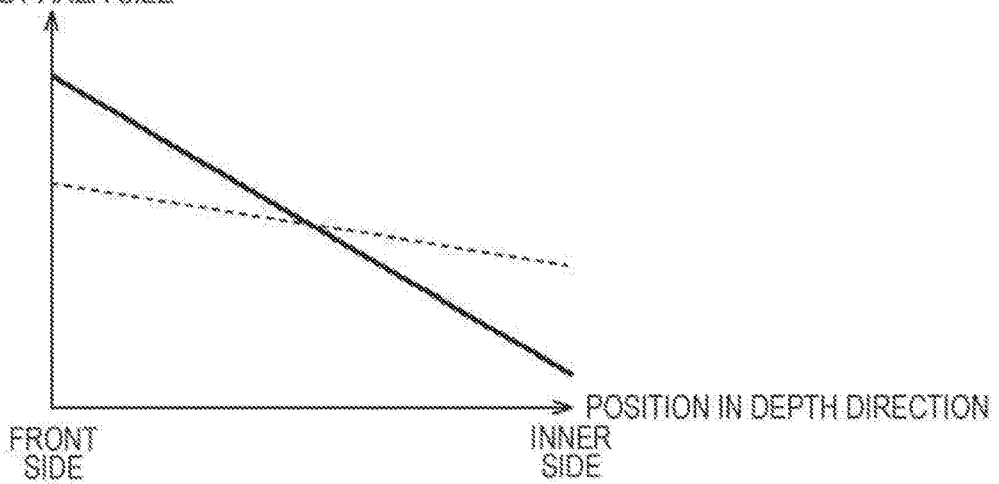
FIG. 37 is a view illustrating object base perspective intensity.

FIG. 37 is a view illustrating object base perspective intensity.

In FIG. 37, a horizontal axis represents a position of a subject indicated by pixel values of an object area in a depth image in the depth direction, while a vertical axis represents a size of the object area.

The object determination unit 543 determines object base perspective intensity for each object on the basis of a threshold which decreases with predetermined inclination as the position of the object area in the depth direction shifts inward, such that object base perspective intensity increases as the position of the object area in the depth direction becomes smaller than the threshold, and decreases as the position of the object area becomes larger than the threshold, on the assumption that the position of the object area in the depth direction is located on the inner side.

On the other hand, the object determination unit 543 determines object base perspective intensity such that object base perspective intensity increases as the position of the object area in the depth direction becomes larger than the threshold, and decreases as the position of the object area in the depth direction becomes smaller than the threshold, on the assumption that the position of the object area in the depth direction is located on the front side.

Accordingly, when object base perspective intensity is high, a line showing the relationship between the position of the object area in the depth direction and the size of the object area has relatively large inclination as indicated by a solid line in FIG. 37, for example. In addition, when object base perspective intensity is low, a line showing the relationship between the position of the object area in the depth direction and the size of the object area has relatively small inclination as indicated by a dotted line in FIG. 37, for example.

The difference between the sizes of the object located on the front side and the object located on the inner side increases as the imaging angle of view increases. In other words, the inclination of the line showing the relationship between the position of the object area in the depth direction and the size of the object area increases as the imaging angle of view increases. According to the determination of object base perspective intensity as discussed above, the object base perspective intensity increases as the angle for imaging the object area of the input image becomes wider.

(Description of Perspective Intensity Base Imaging Angle of View)

Figure 38:
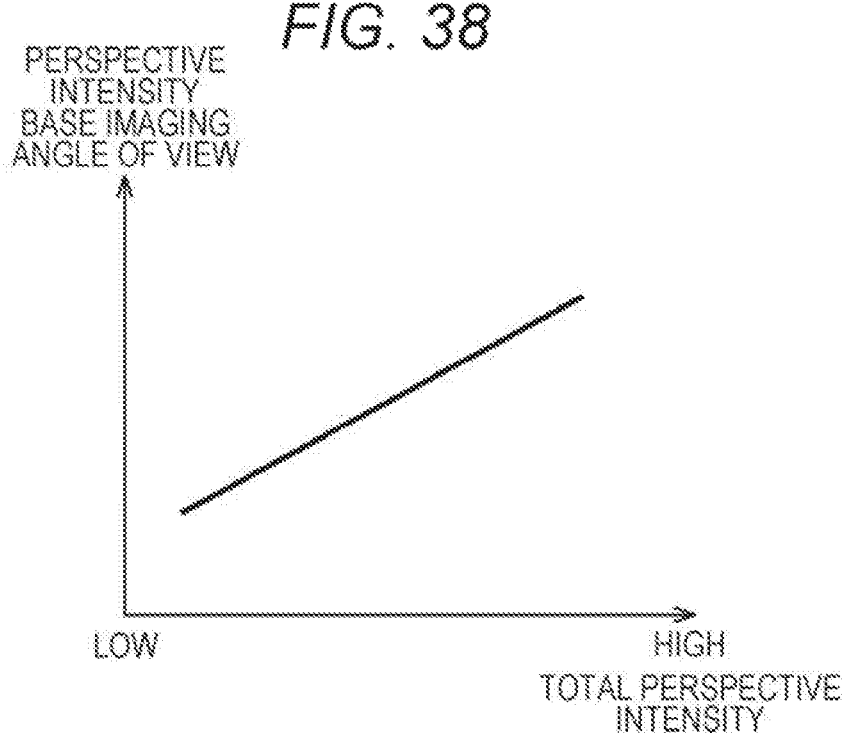
FIG. 38 is a view illustrating perspective intensity base imaging angle of view.

FIG. 38 is a view illustrating a perspective intensity base imaging angle of view.

In FIG. 38, a horizontal axis represents total perspective intensity, while a vertical axis represents perspective intensity base imaging angle of view determined on the basis of the total perspective intensity.

The imaging angle of view conversion unit 544 estimates wider angle imaging, i.e., a larger imaging angle of view as total perspective intensity increases. Accordingly, the perspective intensity base imaging angle of view is so determined as to increase as the total perspective intensity increases as illustrated in FIG. 38.

(Description of Depth of Field Base Imaging Angle of View)

Figure 39:
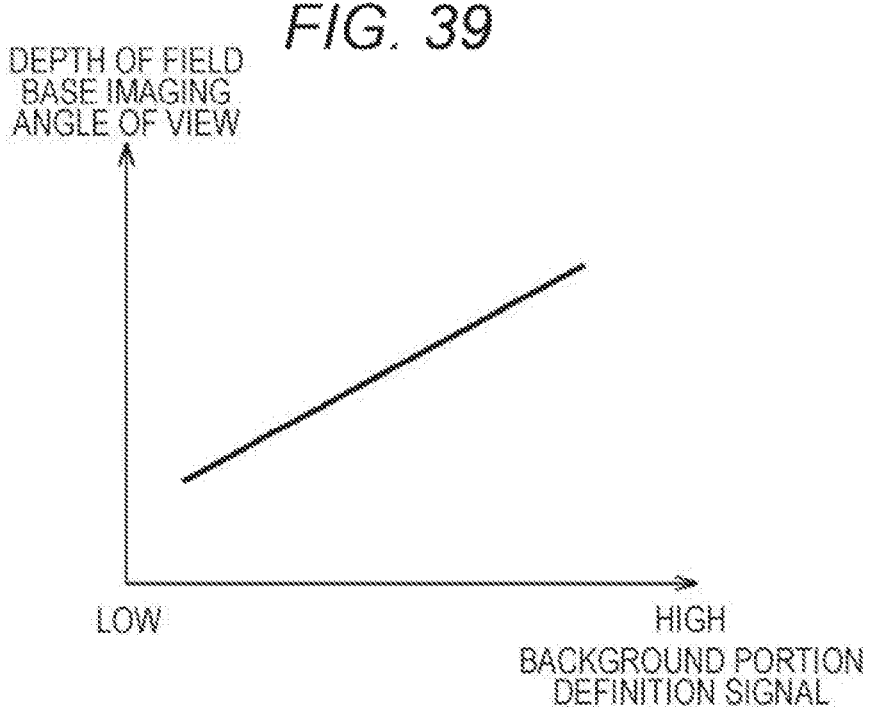
FIG. 39 is a view illustrating a depth of field base imaging angle of view.

FIG. 39 is a view illustrating a depth of field base imaging angle of view.

In FIG. 39, a horizontal axis represents a background portion definition signal, while a vertical axis represents a depth of field base imaging angle of view determined on the basis of the background portion definition signal.

The imaging angle of view conversion unit 544 estimates a larger imaging angle of view as the background portion definition signal increases, i.e. a blur of the background decreases. Accordingly, the depth of field base imaging angle of view is so determined as to increase as the background portion definition signal increases as illustrated in FIG. 39.

(Configuration Example of Determination Unit)

Figure 40:
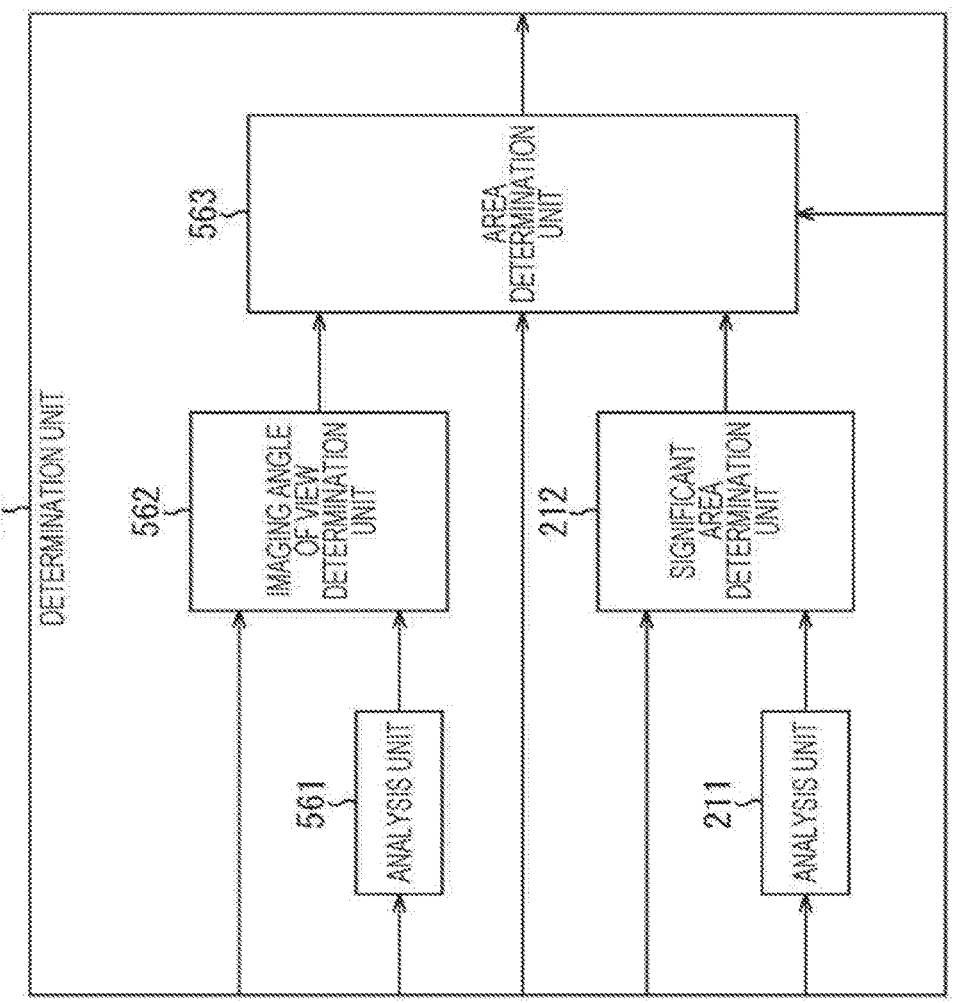
FIG. 40 is a block diagram illustrating a configuration example of a determination unit in FIG. 32.

FIG. 40 is a block diagram illustrating a configuration example of the determination unit 502 in FIG. 32.

In the configuration illustrated in FIG. 40, parts similar to the corresponding parts in FIG. 14 have been given similar reference numbers. Similar explanation of these parts is omitted where appropriate.

The determination unit 502 illustrated in FIG. 40 is constituted by the analysis unit 211, the significant area determination unit 212, an analysis unit 561, an imaging angle of view determination unit 562, and an area determination unit 563.

The analysis unit 561 of the determination unit 502 determines an imaging angle of view on the basis of a focal distance exhibited at the time of imaging of an input image and input as an imaging angle of view attribute signal from the outside, and on the basis of the size of an image sensor. Note that the analysis unit 561 may determine the imaging angle of view on the basis of Exif information or the like created by JPEG (Joint Photographic Experts Group) and obtained from the outside. The analysis unit 561 supplies the determined imaging angle of view to the imaging angle of view determination unit 562.

The imaging angle of view determination unit 562 determines a final imaging angle of view by using following Mathematical Formula (13) on the basis of the imaging angle of view supplied from the imaging angle of view conversion unit 544 illustrated in FIG. 34, and the imaging angle of view supplied from the analysis unit 561.

[Mathematical Formula 13]

$$\text{Final\_angle} = W\_\text{est} \times \text{Est\_angle} + (1.0 - W\_\text{est}) \times \text{Meta\_angle} \quad (13)$$

In Mathematical Formula (13), Final_angle is a final imaging angle of view, Est_angle is an imaging angle of view supplied from the imaging angle of view conversion unit 544, and Meta_angle is an imaging angle of view supplied from the analysis unit 561. In addition, in Mathematical Formula (13), W_est indicates a weighting coefficient determined in a range from 0 to 1. The imaging angle of view determination unit 562 supplies the final imaging angle of view to the area determination unit 563.

The area determination unit 563 calculates a viewing angle of view on the basis of an actual view distance contained in viewing environment information input from the outside, and on the basis of the size of the display. The area determination unit 563 selects an area having the same aspect ratio as that of the screen and in a predetermined size and at a predetermined position in the screen on the basis of the viewing angle of view, the final imaging angle of view supplied from the imaging angle of view determination unit 562, and final significant area information generated by the significant area determination unit 212, and sets the selected area as a screen central area.

More specifically, the area determination unit 563 determines a screen relative ratio corresponding to a ratio of the screen central area to the screen such that the imaging angle of view of the screen central area becomes identical to the viewing angle of view. In addition, the area determination unit 563 further determines the position of the screen central area such that the significant area indicated by the final significant area information falls within the central field of vision of the viewer. The area determination unit 563 supplies information indicating the screen relative ratio and the position of the screen central area as screen central area information to the center generation unit 503 and the periphery generation unit 504 illustrated in FIG. 32. This structure generates, as an image of the screen central area, a pseudo image corresponding to a predicted value of a captured image captured at such an imaging angle of view which equalizes the imaging angle of view of the screen central area and the viewing angle of view.

(Imaging Angle of View Determination Method Based on Attribute Signal)

Figure 41:
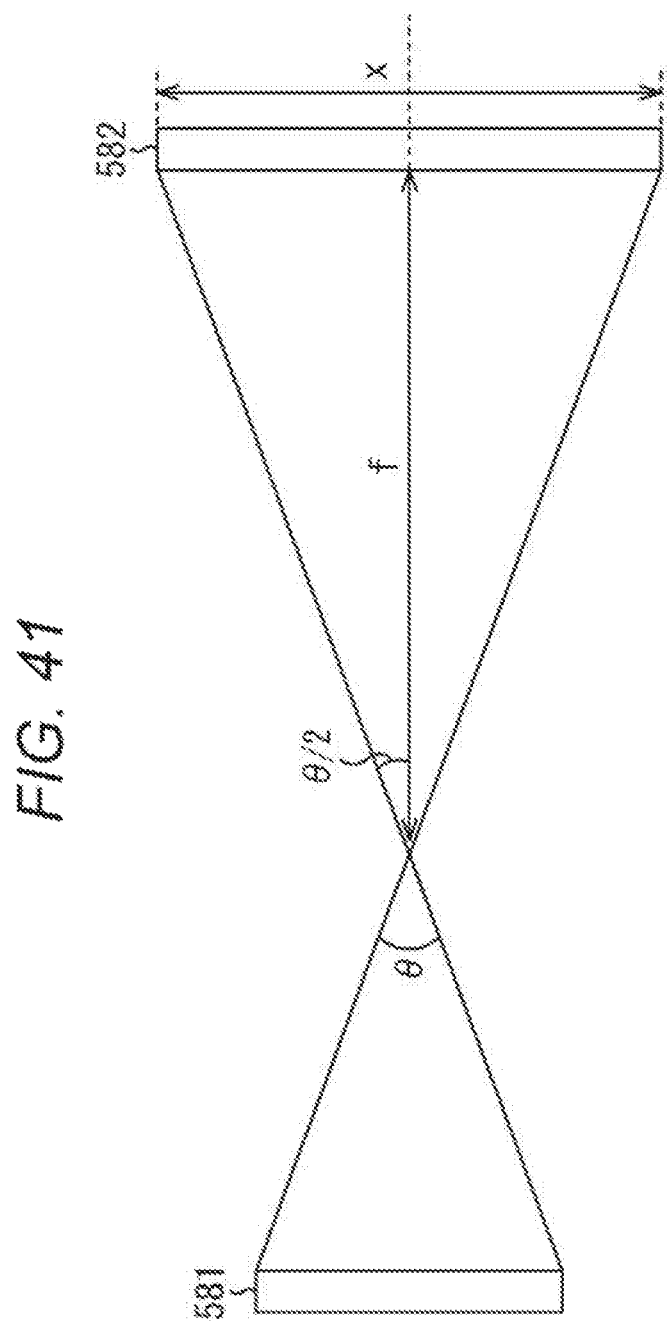
FIG. 41 is a view illustrating an imaging angle of view determination method performed by an analysis unit in FIG. 40.

FIG. 41 is a view illustrating an imaging angle of view determination method performed by the analysis unit 561 in FIG. 40.

When an image sensor 582 images a subject 581 and generates an input image of the subject 581 as illustrated in FIG. 41, a relationship between an imaging angle of view θ of the input image, a size x of the image sensor 582, and a focal distance f at the time of imaging is expressed by following Mathematical Formula (14).

[Mathematical Formula 14]

$$\tan(\theta/2)=(x/2)/f \qquad (14)$$

Accordingly, the analysis unit 561 calculates the imaging angle of view θ by using following Mathematical Formula (15) on the basis of the focal distance f at the time of imaging of an input image input as an imaging angle of view attribute signal, and the size x of the image sensor.

[Mathematical Formula 15]

$$\theta=2\times\tan^{-1}(x/2f) \text{ [rad]} \qquad (15)$$

(Configuration Example of Center Generation Unit)

Figure 42:
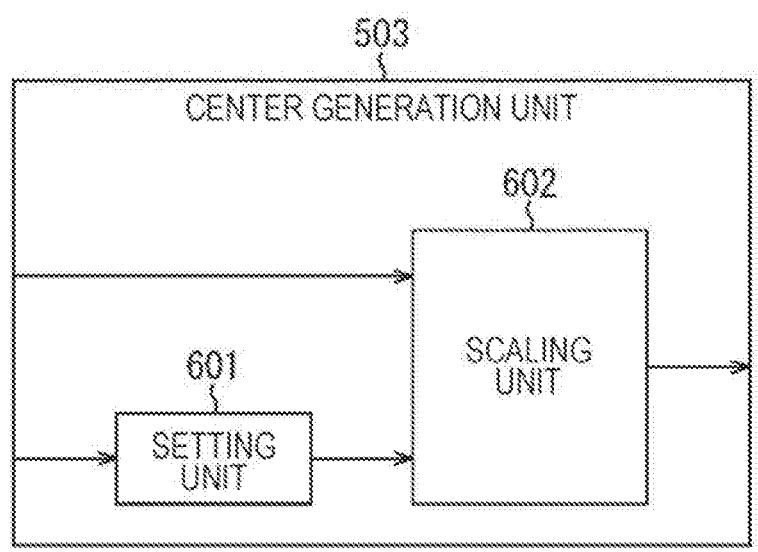
FIG. 42 is a block diagram illustrating a configuration example of a center generation unit in FIG. 32.

FIG. 42 is a block diagram illustrating a configuration example of the center generation unit 503 in FIG. 32.

The center generation unit 503 illustrated in FIG. 42 is constituted by a setting unit 601 and a scaling unit 602.

The setting unit 601 of the center generation unit 503 sets a scaling ratio by using following Mathematical Formula (16) on the basis of a screen relative ratio contained in screen central area information supplied from the area determination unit 563 illustrated in FIG. 40, and supplies the set scaling ratio to the scaling unit 602.

[Mathematical Formula 16]

$$\text{Scale} = (W\_disp * CentralPartRatio)/W\_in \qquad (16)$$
$$= (H\_disp * CentralPartRatio)/H\_in$$

In Mathematical Formula (16), Scale is a scaling ratio, while W_disp and H_disp are the size of the screen in the lateral direction (horizontal direction) and the size of the screen in the longitudinal direction (vertical direction), respectively. In addition, in Mathematical Formula (16), CentralPartRatio indicates a screen relative ratio, while W_in and H_in indicate the size of the input image in the horizontal direction and the size of the input image in the vertical direction, respectively.

The scaling unit 602 scales the input image on the basis of the scaling ratio supplied from the setting unit 601 such that the size of the input image becomes equivalent to that of the screen central area. When the scaling ratio is larger than 1, the scaling becomes an enlarging process. This enlarging process may be performed by using bilinear interpolation technology, bicubic interpolation technology, Lanczos interpolation, or so-called super-resolution technology, for example.

The scaling unit 602 supplies the scaled input image to the periphery generation unit 504 and the synthesis unit 505 illustrated in FIG. 32 as a screen central area.

(Configuration Example of Periphery Generation Unit)

FIG. 43 is a block diagram illustrating a configuration example of the periphery generation unit 504 illustrated in FIG. 32.

The periphery generation unit 504 illustrated in FIG. 32 is constituted by a setting unit 621, an extrapolation unit 622, and an adjustment unit 623.

The setting unit 621 of the periphery generation unit 504 determines a screen peripheral area on the basis of screen central area information supplied from the area determination unit 563 illustrated in FIG. 40. Thereafter, the setting unit 621 supplies screen peripheral area information specifying a screen peripheral area to the extrapolation unit 622 and the adjustment unit 623.

The extrapolation unit 622 extrapolates an image of the screen peripheral area specified in the screen peripheral area information supplied from the setting unit 621 by using an image of the screen central area supplied from the scaling unit 602 illustrated in FIG. 42, and an image supplied from the outside. Note that the extrapolation unit 622 may perform extrapolation by using a method similar to the method employed by the extrapolation unit 31 illustrated in FIG. 2.

In addition, the image supplied from the outside may be an image stored in an external recording medium, an image provided via a network, an image of Computer Graphics (CG) database, for example. When a matching method is adopted as the extrapolation method, the extrapolation unit 622 performs extrapolation with reference to an image having high similarity with an input image concerning an image, an imaging position, an imaging date or the like contained in the image supplied from the outside.

The extrapolation unit 622 therefore performs extrapolation by using not only the image of the screen central area, but also the image supplied from the outside. Accordingly, the extrapolation unit 622 is capable of performing extrapolation prediction for an input image, which is included in a scene for which extrapolation prediction is difficult to perform only on the basis of an input image, by using a similar image concerning included image, imaging position, and imaging date. In addition, when the image of the screen peripheral area is an image of typical texture, such as wood and grass, the image quality of the image in the screen peripheral area improves by extrapolation using the image of CG database.

The extrapolation unit 622 supplies the image of the screen peripheral area generated by extrapolation to the adjustment unit 623. In addition, the extrapolation unit 622 generates extrapolation reliability indicating likelihood of an extrapolation result. For example, the extrapolation unit 622 indicates accuracy of matching in extrapolation by using a value ranging from 0 to 1, and sets the value to extrapolation reliability. The extrapolation unit 622 supplies the generated extrapolation reliability to the adjustment unit 623.

The adjustment unit 623 adjusts the image of the screen peripheral area on the basis of the extrapolation reliability supplied from the extrapolation unit 622, and supplies the adjusted image of the screen peripheral area to the synthesis unit 505 illustrated in FIG. 32.

Note that, according to this example, the extrapolation unit 622 selects an image having high similarity from the image of the screen central area and the image supplied from the outside, and uses the selected image for extrapolation. However, the extrapolation unit 622 may perform extrapolation by using a captured image supplied from the outside and showing a wall behind the display providing a wide-field image.

Figure 44B:
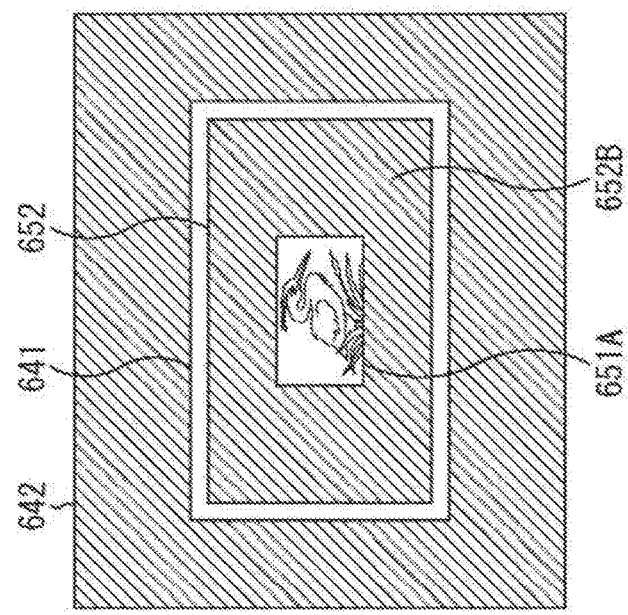
FIG. 44A and FIG. 44B are views illustrating an example of a wide-field image.
Figure 44A:
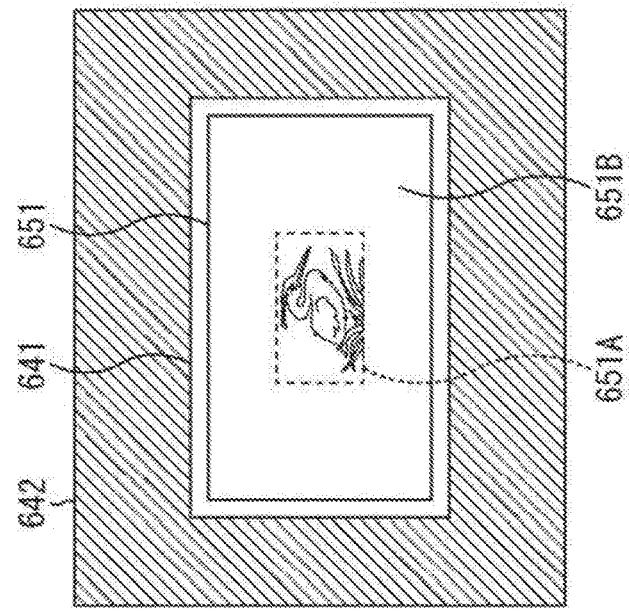

When extrapolation is performed by using an image having high similarity selected from the image of the screen central area and the image supplied from the outside as illustrated in FIG. 44A, a wide-field image 651 containing a screen central area 651A and a screen peripheral area 651B connected with each other is shown on a display 641. Accordingly, the viewer views the wide-filed image 651 in the screen size of the display 641.

However, when extrapolation is performed by using a captured image supplied from the outside and showing a wall 642 behind the display 641 as illustrated in FIG. 44B, shown on the display 641 is a wide-field image 652 constituted by the screen central area 651A and a screen peripheral area 652B where an image of the wall 642 behind the display 641 is disposed. In this case, the image of the screen peripheral area 652B is integrated with the wall 642, in which condition the viewer feels as if he or she were viewing the image of the screen central area 651A from a far position through a small window. Accordingly, the senses of reality and presence provided by the wide-field image improve.

Note that the extrapolation unit 622 may perform extrapolation only by using the image of the screen central area.

(Explanation of Process by Image Processing Apparatus)

Figure 45:
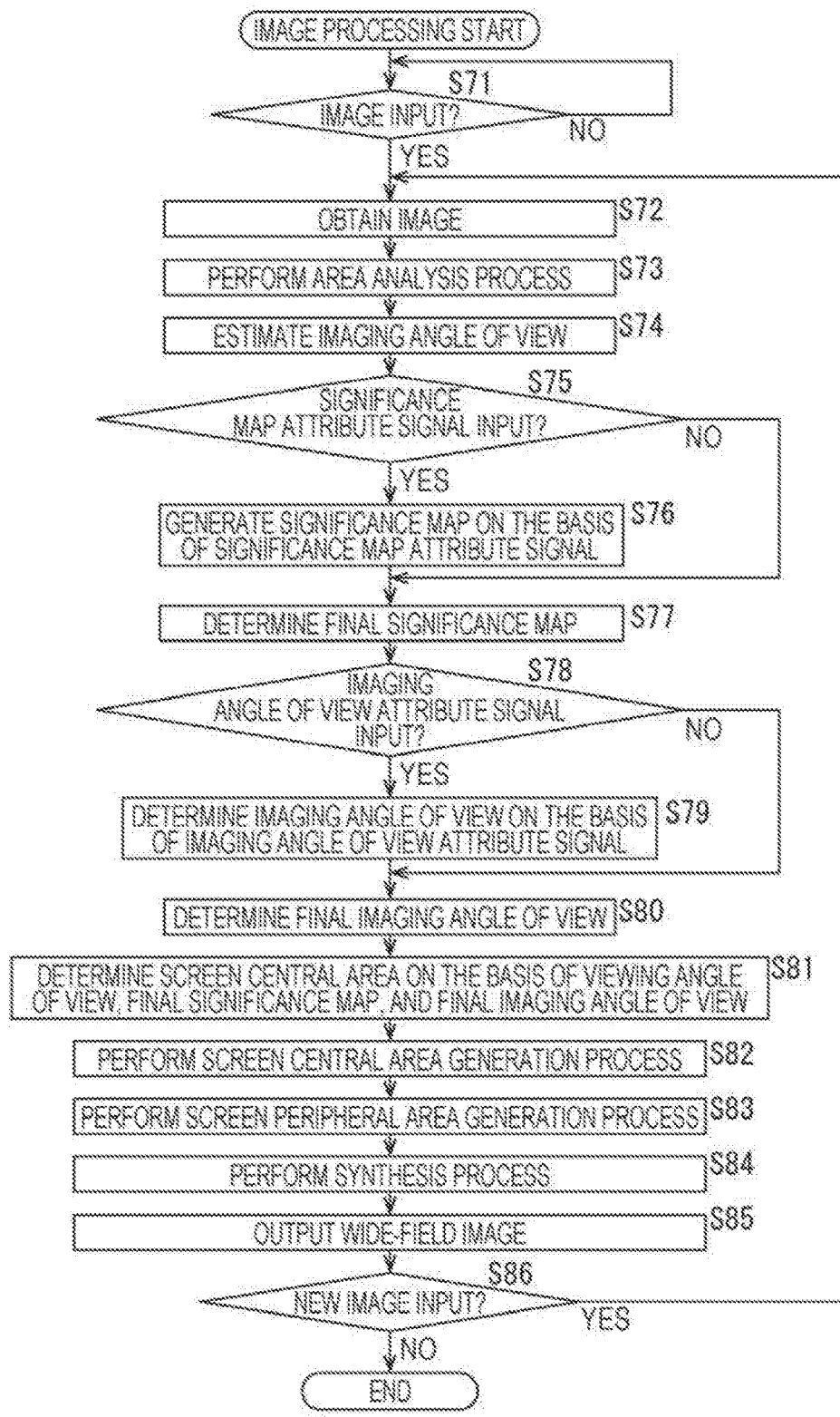
FIG. 45 is a flowchart showing image processing performed by the image processing apparatus in FIG. 32.

FIG. 45 is a flowchart showing image processing performed by the image processing apparatus 500 illustrated in FIG. 32.

Processing in steps S71 through S73 in FIG. 45 is similar to the processing in steps S11 through S13 in FIG. 22, and therefore is not repeatedly explained herein.

In step S74, the analysis unit 501 estimates an imaging angle of view. In step S75, the determination unit 502 determines whether or not a significance map attribute signal has been input from the outside. When it is determined in step S75 that a significance map attribute signal has been input, the process proceeds to step S76.

In step S76, the analysis unit 211 of the determination unit 502 (FIG. 40) generates a significance map on the basis of EPG program category information or the like input as a significance map attribute signal from the outside. The analysis unit 211 supplies the generated significance map to the significant area determination unit 212, whereafter the process proceeds to step S77.

When it is determined in step S75 that no significance map attribute signal has been input, the process proceeds to step S77.

In step S77, the significant area determination unit 212 determines a final significance map on the basis of the significance map received from the analysis unit 501 and the significance map generated by the analysis unit 211. The significant area determination unit 212 generates significant area information on the basis of the significance map, and supplies the generated significant area information to the area determination unit 563.

In step S78, the determination unit 502 determines whether or not an imaging angle of view attribute signal has been input from the outside. When it is determined in step S78 that an imaging angle of view attribute signal has been input, the process proceeds to step S79.

In step S79, the analysis unit 561 of the determination unit 502 (FIG. 40) determines an imaging angle of view on the basis of the imaging angle of view attribute signal received from the outside. The analysis unit 561 supplies the determined imaging angle of view to the imaging angle of view determination unit 562, whereafter the process proceeds to step S80.

When it is determined in step S78 that no imaging angle of view attribute signal has been input, the process proceeds to step S80.

In step S80, the imaging angle of view determination unit 562 determines a final imaging angle of view on the basis of the imaging angle of view supplied from the analysis unit 501, and the imaging angle of view supplied from the analysis unit 561. The imaging angle of view determination unit 562 supplies the final imaging angle of view to the area determination unit 563.

In step S81, the area determination unit 563 determines a screen central area on the basis of a viewing angle of view, the final significant area information, and the final imaging angle of view. Note that the viewing angle of view is calculated on the basis of viewing environment information input from the outside. The area determination unit 563 supplies information indicating a screen relative ratio and the position of the screen central area as screen central area information to the center generation unit 503 and the periphery generation unit 504.

In step S82, the center generation unit 503 performs a screen central area generation process for scaling an input image on the basis of the screen central area information received from the determination unit 502 and generating an image of the screen central area. The center generation unit 503 supplies the generated image of the screen central area to the periphery generation unit 504 and the synthesis unit 505.

In step S83, the periphery generation unit 504 performs a screen peripheral area generation process on the basis of the screen central area information received from the determination unit 502. The screen peripheral area generation process is a process which generates an image of the screen peripheral area by extrapolation using the image of the screen central area or an image supplied from the outside on the basis of the screen central area information, and adjusts the generated image on the basis of extrapolation reliability. The periphery generation unit 504 supplies the adjusted image of the screen peripheral area to the synthesis unit 505.

In step S84, the synthesis unit 505 performs a synthesis process which synthesizes the image of the screen central area received from the center generation unit 503, and the image of the screen peripheral area received from the periphery generation unit 504. In step S85, the synthesis unit 505 outputs a synthesis image obtained by the synthesis process as a wide-field image.

In step S86, the image processing apparatus 500 determines whether or not a new image has been input. When it is determined in step S86 that a new image has been input, the process returns to step S72. The processing in steps S72 through S86 is repeated until input of a new image stops.

When it is determined in step S86 that no new image has been input, the process ends.

As described above, the image processing apparatus 500 estimates an imaging angle of view of an input image on the basis of the input image and a depth image. Thereafter, the image processing apparatus 500 generates, as a pseudo image, a predicted value of a captured image captured at an imaging angle of view identical to a viewing angle of view of the pseudo image from the input image, on the basis of the estimated imaging angle of view and the viewing angle of view. Accordingly, the image processing apparatus 10 is capable of changing an imaging method of an input image in a pseudo manner by using the depth image.

DESCRIPTION OF ADVANTAGEOUS EFFECTS

FIG. 46 is a view showing advantageous effects produced by the image processing apparatus 10, the image processing apparatus 400, and the image processing apparatus 500.

As can be seen from FIG. 46, the image processing apparatus 10 generates a pseudo image while shifting the position of a virtual viewpoint of an input image in the horizontal direction or the vertical direction such that a significant area falls within a central field of vision. This pseudo image is an image including motion parallax produced by track imaging of a subject in a synthesis image. Accordingly, the pseudo image is regarded as a pseudo track image captured by track imaging of the subject in the synthesis image in a pseudo manner.

The pseudo track image has improved a sense of presence, visibility, and a sense of depth in comparison with an input image. When the pseudo track image is an image captured by track imaging of a subject in a synthesis image in the horizontal direction in a pseudo manner, for example, motion parallax is produced in the horizontal direction as in a state of viewing the outside scenery from a running train. Accordingly, a sense of depth improves.

Moreover, the image processing apparatus 10 generates a pseudo image while shifting a virtual view distance of an input image forward such that a significant area falls within a central field of vision and has at least an occupation ratio of a threshold in the central field of vision. This pseudo image is an image including motion parallax captured by dolly-in imaging of a subject in a synthesis image. Accordingly, the pseudo image is regarded as a pseudo dolly-in image captured by dolly-in imaging of the subject in the synthesis image in a pseudo manner.

The pseudo dolly-in image has improved a sense of presence, visibility, and a sense of depth in comparison with an input image. For example, this method produces motion parallax as produced in a state of viewing a small significant area difficult to recognize at a position shifted forward and close to the significant area. Accordingly, a sense of depth improves.

Furthermore, the image processing apparatus 10 generates a pseudo image while shifting a virtual view distance of an input image backward such that a significant area falls within a central field of vision. This pseudo image is an image including motion parallax captured by dolly-out imaging of a subject in a synthesis image. Accordingly, the pseudo image is regarded as a pseudo dolly-out image captured by dolly-out imaging of the subject in the synthesis image in a pseudo manner.

The pseudo dolly-out image has improved a sense of presence, visibility, and a sense of depth in comparison with an input image. For example, this method produces motion parallax as produced in a state of viewing a significant area at a far position in the backward direction when the significant area is difficult to recognize at a position excessively close to the significant area. Accordingly, a sense of depth improves.

The image processing apparatus 500 reduces an input image such that a viewing angle of view and an imaging angle of view are equalized when the viewing angle of view is larger than the imaging angle of view. The image processing apparatus 500 is therefore capable of generating a wide-field image having the imaging angle of view and the viewing angle of view equal to each other. In this case, a viewer viewing a wide-field image views a scene as viewed by a person taking this image at the same viewing position.

Accordingly, a wide-field image formed in this manner has improved senses of presence and reality in comparison with an input image. When an input image is captured by telephoto imaging, for example, a viewer views an image of a scene as a wide-field image at an imaging position of a person taking the image located at a position far away from a subject. In this case, senses of presence and reality improve.

On the other hand, the image processing apparatus 500 enlarges an input image such that a viewing angle of view and an imaging angle of view are equalized when the viewing angle of view is smaller than the imaging angle of view. The image processing apparatus 500 is therefore capable of generating a wide-field image having the imaging angle of view and the viewing angle of view equal to each other. In this case, a viewer viewing a wide-field image views a scene as viewed by a person taking this image at the same viewing position, for example.

Accordingly, a wide-field image formed in this manner has improved senses of presence and reality and visibility in comparison with an input image. When an input image is captured by wide-angle imaging, for example, a viewer views an image of a scene as a wide-field image at an imaging position of a person taking the image located at a position close to a subject. In this case, senses of presence and reality and visibility improve.

The image processing apparatus 400 generates a pseudo image while changing the position of a virtual viewpoint on the basis of a camera angle at the time of imaging of an input image to emphasize the camera angle. This pseudo image corresponds to a predicted value of a captured image of a subject in a synthesis image captured while further emphasizing the camera angle in comparison with the camera angle of the input image. Accordingly, the pseudo image is regarded as a pseudo camera angle image of the subject in the synthesis image captured while emphasizing the camera angle in a pseudo manner.

The pseudo camera angle image emphasizes an impression of structure intended by a person taking the image. Accordingly, impressiveness of a scene improves in comparison with the input image.

The image processing apparatus 10 further generates a pseudo image by smoothing pixel values in a front part and an inner part of a significant area while increasing a scaling ratio of an input image such that the significant area falls within a central field of vision. This pseudo image is an image having a narrow imaging angle of view and a small depth of field for zoom-in imaging of a subject in a synthesis image. Accordingly, this pseudo image is regarded as a pseudo zoom-in image captured by zoom-in imaging of the subject in the synthesis image in a pseudo manner.

The pseudo zoom-in image has improved visibility and a sense of depth in comparison with the input image. Accordingly, this method of imaging improves visibility and a sense of depth like a method of zoom-in imaging of a small significant area difficult to recognize in a synthesis image.

In addition, the image processing apparatus 10 generates a pseudo image by performing a deblur process for a blurred area at a reduced scaling ratio of an input image. This pseudo image is an image having a wide imaging angle of view and a large depth of field for zoom-out imaging of a subject in a synthesis image. Accordingly, this pseudo image is regarded as a pseudo zoom-in image captured by zoom-in imaging of the subject in the synthesis image in a pseudo manner.

The pseudo zoom-out image has improved visibility in comparison with the input image. In other words, this imaging method increases the depth of field like a method of wide-angle imaging of a subject in a synthesis image. Accordingly, visibility improves.

Furthermore, the image processing apparatus 10 generates a pseudo image while changing the angle of the visual line direction of an input image such that a significant area falls within the central field of vision. This pseudo image corresponds to a predicted value of a captured image captured by panning (tilt) imaging of a subject in a synthesis image. Accordingly, this pseudo image is regarded as a pseudo panning (tilt) image captured by panning (tilt) imaging of the subject in the synthesis image.

The pseudo panning (tilt) image has improved visibility in comparison with the input image. For example, the visibility improves like visibility at the time of imaging while rotating surroundings of a subject in an input image when the input image is a wide-view panoramic image.

Note that a depth image need not be used for generation of a wide-field image having an imaging angle of view and a viewing angle of view equal to each other, and for generation of a pseudo panning (tilt) image. In addition, vanishing information need not be used for generation of a pseudo camera angle image.

Fourth Embodiment (Description of Computer According to Present Disclosure)

A series of processes described above may be executed either by hardware or by software. When the series of processes is executed by software, programs constituting the software are installed into a computer. Examples of the computer used herein include a computer incorporated in dedicated hardware, and a general-purpose personal computer capable of executing various types of functions under various types of installed programs.

FIG. 47 is a block diagram illustrating a configuration example of hardware of a computer which executes the series of processes discussed above under programs.

A central processing unit (CPU) 901, a read only memory (ROM) 902, and a random access memory (RAM) 903 of a computer 900 are connected with each other via a bus 904.

An input/output interface 905 is further connected to the bus 904. An input unit 906, an output unit 907, a memory unit 908, a communication unit 909, and a drive 910 are connected to the input/output interface 905.

The input unit 906 is constituted by a keyboard, a mouse, a microphone and the like. The output unit 907 is constituted by a display, a speaker and the like. The memory unit 908 is constituted by a hard disk, a non-volatile memory or the like. The communication unit 909 is constituted by a network interface or the like. The drive 910 drives a removable medium 911 such as a magnetic disk, an optical disk, a magneto-optical disk, or a semiconductor memory.

According to the computer 900 thus constructed, the CPU 901 loads programs stored in the memory unit 908 into the RAM 903 via the input/output interface 905 and the bus 904, and executes the loaded programs to perform the series of processes discussed above.

The programs executed by the computer 900 (CPU 901) may be provided in a form recorded in the removable medium 911 constituting a package medium, for example. Alternatively, the programs may be provided via a wired or wireless transmission medium, such as a local area network, the Internet, and digital satellite broadcasting.

According to the computer 900, the programs may be installed from the removable medium 911 attached to the drive 910 into the memory unit 908 via the input/output interface 905. Alternatively, the programs may be received by the communication unit 909 from a wired or wireless transmission medium, and installed into the memory unit 908. The programs may be installed beforehand in the ROM 902 or the memory unit 908.

Note that programs executed by the computer 900 may execute processes in time series in the order described in the present specification, or may execute processes in parallel or at necessary timing such as the timing of calls.

In addition, advantageous effects described in the present specification are presented only by way of example. Other advantageous effects may be offered.

Furthermore, embodiments according to the present disclosure are not limited to the respective embodiments described herein. Various modifications may be made without departing from the scope of the present disclosure.

For example, the present disclosure may have a structure of cloud computing which shares one function with a plurality of devices to perform the function by cooperation of the devices.

In addition, the respective steps discussed with reference to the foregoing flowcharts may be shared and executed by multiple devices rather than executed by one device.

Furthermore, when multiple processes are contained in one step, the multiple processes contained in the one step may be shared and executed by multiple devices rather than executed by one device.

In addition, the present disclosure may include the following configurations.

(1)

An image processing apparatus including a pseudo image generation unit that generates, as a pseudo image, a predicted value of a captured image of a subject captured by a predetermined imaging method from an image on the basis of a value of a parameter determined in accordance with a characteristic of the image, and a depth image indicating a position of the subject in the image in a depth direction.

(2) An image processing apparatus according to (1) noted above, wherein the value is determined such that a significant area of the image falls within a central field of vision of a viewer viewing the pseudo image.

(3) An image processing apparatus according to (2) noted above, wherein the pseudo image generation unit gradually changes the value of the parameter from a predetermined value to the determined value, and generates the pseudo image on the basis of the changed value and the depth image.

(4) An image processing apparatus according to (3) noted above, wherein
the parameter is a position of a virtual viewpoint of the pseudo image, and
the predetermined imaging method is track imaging.

(5) An image processing apparatus according to (3) or (4) noted above, wherein
the parameter is a virtual view distance of the pseudo image, and
the predetermined imaging method is dolly-in imaging or dolly-out imaging.

(6) An image processing apparatus according to any one of (3) through (5) noted above, wherein
the parameter is a scaling ratio of the image, and
the predetermined imaging method is zoom-in imaging or zoom-out imaging.

(7) An image processing apparatus according to (6) noted above, further including an adjustment unit that adjusts, on the basis of the predetermined imaging method, a depth of field of the pseudo image generated by the pseudo image generation unit.

(8) An image processing apparatus according to (7) noted above, wherein the adjustment unit adjusts the depth of field by smoothing a front part and an inner part of the subject in the significant area of the pseudo image with respect to the position of the subject in the depth direction when the predetermined imaging method is zoom-in imaging.

(9) An image processing apparatus according to (7) or (8) noted above, wherein the adjustment unit adjusts the depth of field by performing a deblur process for a blurred area of the pseudo image when the predetermined imaging method is zoom-out imaging.

(10) The image processing apparatus according to any one of (3) through (9) noted above, wherein
the parameter is an angle of a visual line direction of the pseudo image, and
the predetermined imaging method is panning imaging or tilt imaging.

(11) An image processing apparatus according to (1) noted above, wherein
the parameter is a position of a virtual viewpoint of the pseudo image, and
the predetermined imaging method is imaging above or below an imaging position of the image.

(12) An image processing apparatus according to any one of (1) through (11) noted above, wherein the pseudo image generation unit generates the pseudo image from a synthesis image synthesizing an extrapolated peripheral image and the image, on the basis of the value, and a synthesis depth image synthesizing extrapolated peripheral depth image and the depth image.

(13) An image processing apparatus according to (12) noted above, further including:
a periphery generation unit that extrapolates the peripheral image by using the image, and extrapolates the peripheral depth image by using the depth image; and
a synthesis unit that generates the synthesis image by synthesizing the peripheral image extrapolated by the periphery generation unit and the image, and generates the synthesis depth image by synthesizing the peripheral depth image extrapolated by the periphery generation unit and the depth image.

(14) An image processing apparatus according to (13) noted above, further including a cutout unit that deletes at least a part of the pseudo image generated by the pseudo image generation unit.

(15) An image processing method including a pseudo image generation step that generates, as a pseudo image, a predicted value of a captured image of a subject captured by a predetermined imaging method from an image on the basis of a value of a parameter determined in accordance with a characteristic of the image, and a depth image indicating a position of the subject in the image in a depth direction.

(16) An image processing apparatus including:
an imaging angle of view estimation unit that estimates an imaging angle of view of an image on the basis of the image, and a depth image indicating a position of a subject in the image in a depth direction; and
a generation unit that generates, as a pseudo image from the image, a predicted value of a captured image captured at the same angle of view as a viewing angle of view of a pseudo image, on the basis of the imaging angle of view estimated by the imaging angle of view estimation unit, and the viewing angle of view.

(17) An image processing apparatus according to (16) noted above, wherein the generation unit generates the pseudo image by reducing the image when the viewing angle of view is larger than the imaging angle of view.

(18) An image processing apparatus according to (16) or (17) noted above, wherein the generation unit generates the pseudo image by enlarging the image when the viewing angle of view is smaller than the imaging angle of view.

(19) An image processing apparatus according to any one of (16) through (18) noted above, further including:
a periphery generation unit that extrapolates an image of a peripheral area of the pseudo image by using the pseudo image generated by the generation unit or an image input from the outside; and
a synthesis unit that synthesizes the image of the peripheral area extrapolated by the periphery generation unit, and the pseudo image.

(20)

An image processing method including:
an imaging angle of view estimation step that estimates an imaging angle of view of an image on the basis of the image, and a depth image indicating a position of a subject in the image in a depth direction; and
a generation step that generates, as a pseudo image from the image, a predicted value of a captured image captured at the same angle of view as a viewing angle of view of a pseudo image, on the basis of the imaging angle of view estimated by the imaging angle of view estimation step, and the viewing angle of view.

REFERENCE SIGNS LIST

10 Image processing apparatus
12 Periphery generation unit
13 Synthesis unit
15 Determination unit
311 Transformation unit
312 Cutout unit
400 Image processing apparatus
402 Determination unit
500 Image processing apparatus
503 Center generation unit
504 Periphery generation unit
505 Synthesis unit
526 Imaging angle of view estimation unit

The invention claimed is:

1. An image processing apparatus, comprising:
circuitry configured to:
control a camera to capture an input image based on an imaging method;
generate a depth image from the input image, wherein the depth image indicates a position of a subject in the input image in a depth direction;
receive interpolation area information from an external device;
generate a peripheral image from the input image based on the interpolation area information;
generate a peripheral depth image from the depth image based on the interpolation area information;
synthesize a synthesis image, from the peripheral image and the input image;
extract an area from the input image based on input image information;
determine a significance map based on the extracted area of the input image, wherein the significance map indicates levels of significance of each of a plurality of pixels in the extracted area of the input image;
determine a value of a parameter based on the significance map; and
generate a pseudo image from the synthesis image based on the determined value of the parameter, wherein:
the pseudo image corresponds to the subject in the input image, and
the value of the parameter is at least one of:
a range for a viewing angle of the pseudo image,
a position of a virtual viewpoint of the pseudo image,
a virtual view distance of the pseudo image, or
a scaling ratio of the input image.

2. The image processing apparatus according to claim 1, wherein the pseudo image falls within a central field of vision of a viewer who views the pseudo image.

3. The image processing apparatus according to claim 2, wherein the circuitry is further configured to:
gradually change the value of the parameter from a specific value to the value of the parameter; and
generate the pseudo image further based on the gradually changed value.

4. The image processing apparatus according to claim 3, wherein
the imaging method is track imaging method.

5. The image processing apparatus according to claim 3, wherein
the imaging method is one of dolly-in imaging method or dolly-out imaging method.

6. The image processing apparatus according to claim 3, wherein
the imaging method is one of zoom-in imaging method or zoom-out imaging method.

7. The image processing apparatus according to claim 6, wherein the circuitry is further configured to adjust a depth of field of the pseudo image based on the imaging method.

8. The image processing apparatus according to claim 7, wherein the circuitry is further configured to adjust the depth of field of the pseudo image by a smoothing operation of a front part and an inner part of the subject in a significant area of the pseudo image in the significance map, based on the position of the subject in the depth direction, and
wherein the imaging method is the zoom-in imaging method.

9. The image processing apparatus according to claim 7, wherein the circuitry is further configured to adjust the depth of field by a debluring operation of a blurred area of the pseudo image, and
wherein the imaging method is the zoom-out imaging method.

10. The image processing apparatus according to claim 3, wherein
the imaging method is one of panning imaging method or tilt imaging method.

11. The image processing apparatus according to claim 1, wherein
the imaging method is one of imaging above or imaging below an imaging position of the input image.

12. The image processing apparatus according to claim 1, wherein the circuitry is further configured to generate the pseudo image from the synthesis image by synthesis of an extrapolated peripheral image and an extrapolated peripheral depth image.

13. The image processing apparatus according to claim 12, wherein the circuitry is further configured to:
extrapolate the peripheral image based on the input image, and extrapolate the peripheral depth image based on the depth image; and
generate the synthesis image by synthesis of the extrapolated peripheral image, and a synthesis depth image by synthesis of the extrapolated peripheral depth image.

14. The image processing apparatus according to claim 13, wherein the circuitry is further configured to delete at least a part of the pseudo image.

15. An image processing method, comprising:
capturing an input image based on an imaging method;
generating a depth image from the input image, wherein the depth image indicates a position of a subject in the input image in a depth direction;
receiving interpolation area information from an external device;
generating a peripheral image from the input image based on the interpolation area information;

generating a peripheral depth image from the depth image based on the interpolation area information;

synthesizing a synthesis image, from the peripheral image and the input image;

extracting an area from the input image based on input image information;

determining a significance map based on the extracted area of the input image, wherein the significance map indicates levels of significance of each of a plurality of pixels in the extracted area of the input image;

determining a value of a parameter based on the significance map; and generating a pseudo image from the synthesis image based on the determined value of the parameter, wherein:

the pseudo image corresponds to the subject in the input image, and the value of the parameter is at least one of:
a range for a viewing angle of the pseudo image,
a position of a virtual viewpoint of the pseudo image,
a virtual view distance of the pseudo image, or
a scaling ratio of the input image.

16. An image processing apparatus, comprising:
circuitry configured to:
estimate an imaging angle of view of an input image based on:
horizontal line information of the input image, and
a depth image that indicates a position of a subject in the input image in a depth direction;

extract an area from the input image based on input image information;

determine a significance map based on the extracted area of the input image, wherein the significance map indicates levels of significance of each of a plurality of pixels in the extracted area of the input image;

determine a value of a parameter based on the significance map; and generate a pseudo image from the input image based on the determined value of the parameter, wherein:

the pseudo image corresponds to the subject in the input image, the value of the parameter is at least one of:
a range for a viewing angle of the pseudo image,
a position of a virtual viewpoint of the pseudo image,
a virtual view distance of the pseudo image, or
a scaling ratio of the input image, and the input image is captured at the viewing angle of the pseudo image.

17. The image processing apparatus according to claim 16, wherein the circuitry is further configured to generate the pseudo image by reduction of the input image based on the viewing angle of the pseudo image larger than the imaging angle of view of the input image.

18. The image processing apparatus according to claim 16, wherein the circuitry is further configured to generate the pseudo image by enlargement of the input image based on the viewing angle of the pseudo image smaller than the imaging angle of view of the input image.

19. The image processing apparatus according to claim 16, wherein the circuitry is further configured to:
extrapolate a peripheral image of the pseudo image based on one of the pseudo image or the input image; and
synthesize the extrapolated peripheral image and the pseudo image.

20. An image processing method, comprising:
estimating an imaging angle of view of an input image based on:
horizontal line information of the input image, and
a depth image indicating a position of a subject in the input image in a depth direction;

extracting an area from the input image based on input image information;

determining a significance map based on the extracted area of the input image, wherein the significance map indicates levels of significance of each of a plurality of pixels in the extracted area of the input image;

determining a value of a parameter based on the significance map; and generating a pseudo image from the input image based on the determined value of the parameter, wherein:

the pseudo image corresponds to the subject in the input image, the value of the parameter is at least one of:
a range for a viewing angle of the pseudo image,
a position of a virtual viewpoint of the pseudo image,
a virtual view distance of the pseudo image, or
a scaling ratio of the input image, and the input image is captured at the viewing angle of the pseudo image.

* * * * *